United States Patent
Khan

(10) Patent No.: US 12,463,932 B2
(45) Date of Patent: Nov. 4, 2025

(54) REGISTERED ENCRYPTED ELECTRONIC MESSAGE AND SELECTED CONTENT VIEW PROOF SYSTEM

(71) Applicant: Zafar Khan, Redondo Beach, CA (US)

(72) Inventor: Zafar Khan, Redondo Beach, CA (US)

(*) Notice: Subject to any disclaimer, the term of this patent is extended or adjusted under 35 U.S.C. 154(b) by 420 days.

(21) Appl. No.: 17/653,923

(22) Filed: Mar. 8, 2022

(65) Prior Publication Data

US 2022/0329558 A1    Oct. 13, 2022

Related U.S. Application Data

(63) Continuation-in-part of application No. 16/866,135, filed on May 4, 2020, now Pat. No. 11,711,347.

(60) Provisional application No. 62/833,022, filed on Apr. 12, 2019.

(51) Int. Cl.
    *H04L 51/234* (2022.01)
    *H04L 51/23* (2022.01)
    *H04L 51/42* (2022.01)

(52) U.S. Cl.
    CPC ............ *H04L 51/234* (2022.05); *H04L 51/23* (2022.05); *H04L 51/42* (2022.05)

(58) Field of Classification Search
    CPC ........ H04L 51/234; H04L 51/23; H04L 51/42
    See application file for complete search history.

(56) References Cited

U.S. PATENT DOCUMENTS

| | | |
|---|---|---|
| 2002/0026487 A1 | 2/2002 | Ogilvie et al. |
| 2009/0150675 A1 | 6/2009 | Cook |
| 2010/0229246 A1 | 9/2010 | Warrington et al. |
| 2011/0239113 A1 | 9/2011 | Hung et al. |
| 2014/0344382 A1 | 11/2014 | Schmid |
| 2017/0223037 A1 | 8/2017 | Singh et al. |
| 2019/0020687 A1* | 1/2019 | Noon ............... G06F 21/604 |
| 2019/0036859 A1 | 1/2019 | Everton et al. |

OTHER PUBLICATIONS

WIPO, International Preliminary Report on Patentability, Sep. 28, 2021.
EPO, Extended European Search Report, Oct. 27, 2023, Application No. 20787064.3.
IPO, First Examination Report, May 9, 2023, Application No. 202127045235.

* cited by examiner

*Primary Examiner* — Esther B. Henderson
(74) *Attorney, Agent, or Firm* — Fitzgerald IP Law; John K Fitzgerald, Esq.

(57) ABSTRACT

A method and system for processing an email having encrypted content and/or redacted content, and/or where the message content has been encrypted and recorded as encrypted, is provided.

6 Claims, 53 Drawing Sheets

Redacted Reply™ - Workflow

③ RPost Networks could be software at the sender, sender email server, sender gateway, or an intermediate server as shown above.

Redacted Reply™ - Sender Settings

Option 1: System attaches Redacted Reply content to the outbound message as an text file
(Option to Select File Type (i.e. HTML) and option to separately encrypt attachment file separately Option 2: System inserts a link to the Redacted Reply text inside the email body.

A. Browser Option: Open a browser window with the Redacted Reply text when the link is clicked.

B. Image Option: System removes content and displays image inside email, image containing redacted content;

FIG. 6

② The email is sent securely to the RPost Networks with the Redacted Reply text:
　1. In the body of the email inside the two ^ symbols, or,
　2. In the encrypted data file sent by the R Post App.

Redacted Reply™ - RPost Networks

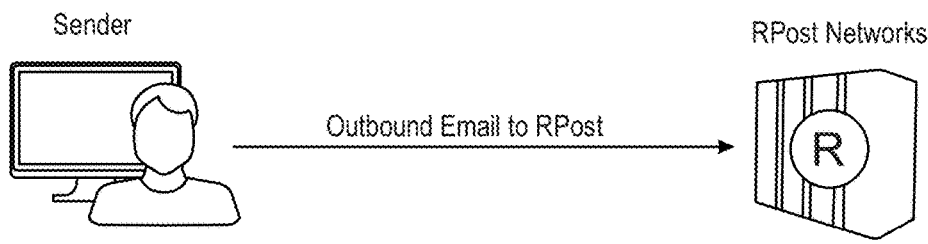

The RPost Networks extracts the Redacted Reply text from inside the two ^ symbols (configurable)
or the data file sent from the R Post App and processes the email according to the customer or user settings.

Settings
Option 1: Attach Redacted Reply content to the outbound message as an text file.
Option 2: Insert a link to the Redacted Reply text inside the email body.

FIG. 11

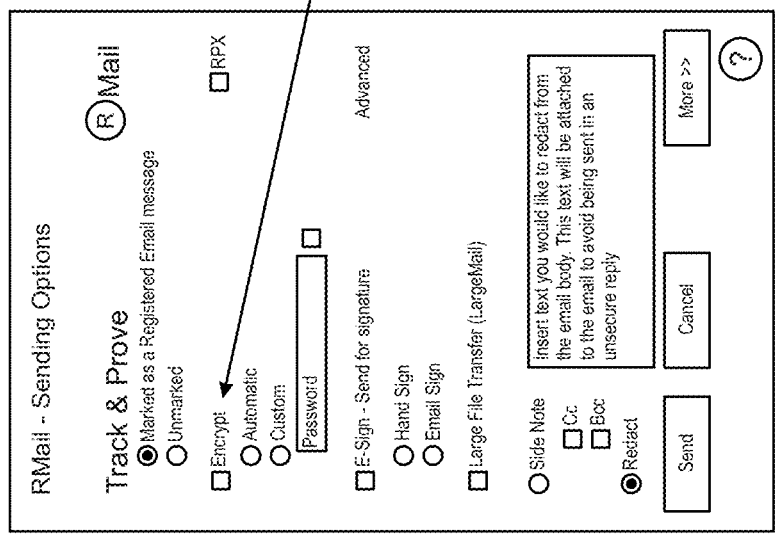
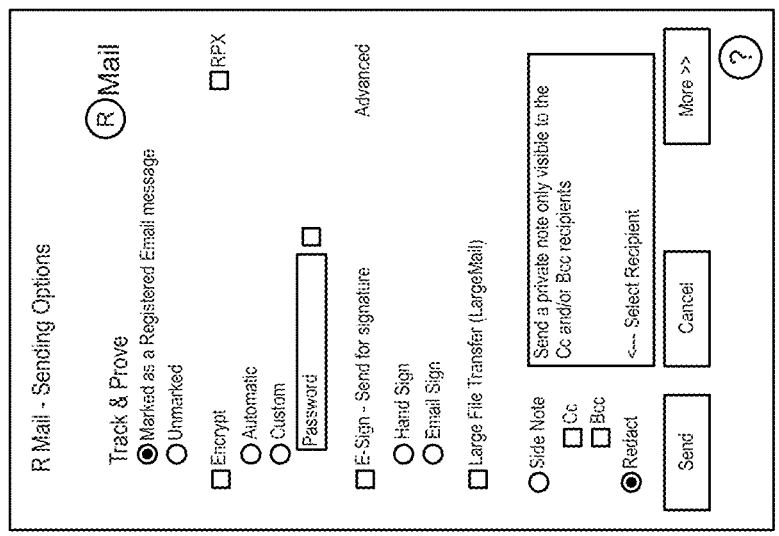
FIG. 17

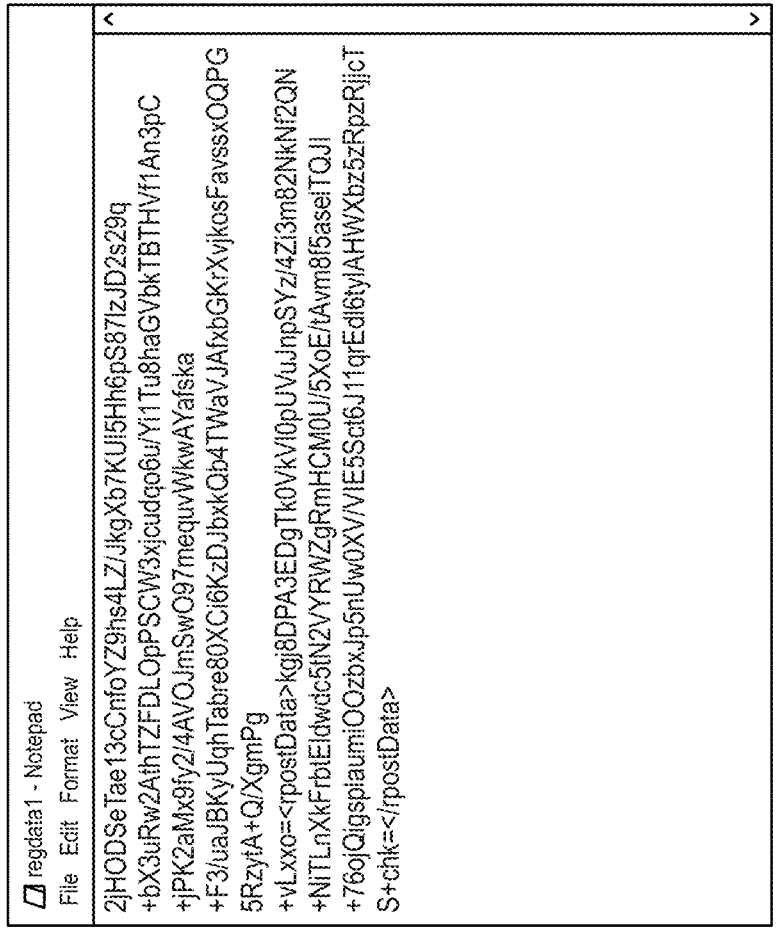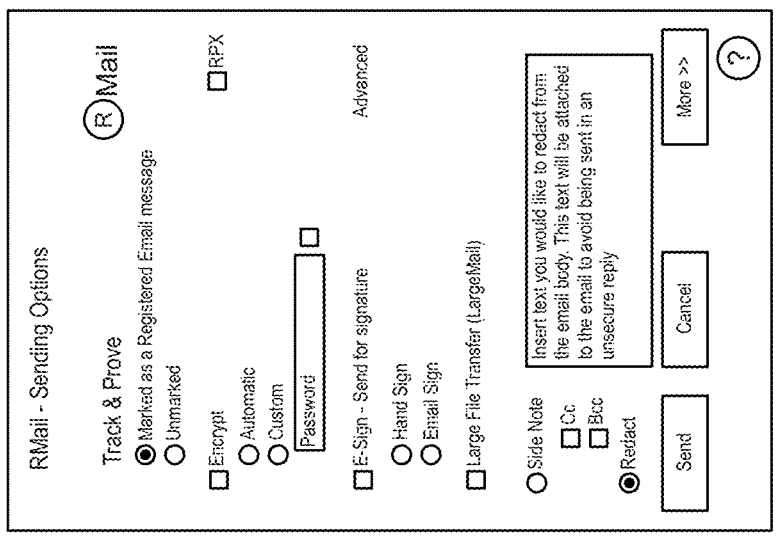
FIG. 18

Received: from abc.luxsci.com ([1.1.1.1])
    by def.luxsci.com (8.14.4/8.13.8) with ESMTP id r7JEfLgH003867
    (version=TLSv1/SSLv3 cipher=DHE-RSA-AES256-SHA bits =256 verify=NOT)
    for <user-xyz@def.luxsci.com>; Mon, 19 Aug 2013 10:41:21 -0400

Received: from abc.luxsci.com (localhost.localdomain [127.0.0.1])
    by abc.luxsci.com (8.14.4/8.13.8) with ESMTP id r7JEfK0Z030182
    for <user-xyz@def.luxsci.com>; Mon, 19 Aug 2013 09:41:20 -0500

Received: from (mail@localhost)
    by abc.luxsci.com (8.14.4/8.13.8/Submit) id r7JEfKXD030178
    for user-xyz@def.luxsci.com; Mon, 19 Aug 2013 09:41:20 -0500

FIG. 22

Example 1. If:

(received from sender) = Best (sent to recipient) = Acceptable

Result = Acceptable

Example 2. If:

(received from sender) = Best (sent to recipient) = Fail

Result = Fail

Example 3. If:

(received from sender) = Acceptable (sent to recipient) = Acceptable

Result = Acceptable

FIG. 23

Registered Encryption™ Report for Sender

| Original Sender | Inbound Sent Secure Identifier | Inbound Received Secure Identifier | Time Accepted | Status | End Recipient | Outbound Sent Secure Identifier | Outbound Received Secure Identifier | Time Accepted | Subject, Message Ids, Times, etc. | Status |
|---|---|---|---|---|---|---|---|---|---|---|
| bob@company.com | FQDN Domain, IP | TLSv1.2@server1 | 10:01:10 UTC | Best | sue@network.com | TLSv1.2 | IP FQDN & Recipient | 10:01:15 UTC | Other TransactionData | Best |
| bob@company.com | Sender+FQDN+1 | RPPKI+ TSLv1.1@Server2 | 10:05:25 UTC | Acceptable | jim@home.com | PDF-AES256+TLSv1.0 | Recipient Mailbox | 10:05:30 UTC | Other TransactionData | Best |
| bob@company.com | Sender+FQDN+1 | RPPKI+ TSLv1.1@Server3 | 10:10:15 UTC | Fail | jim@home.com | PDF-AES256+TLSv1.0 | Recipient Mailbox | 10:10:20 UTC | Other TransactionData | Best |

Hash of Report, Digital Signature of Report, Metadata embedded in report

FIG. 24

Registered Encryption™ Report for Sender

605 — SENDER TO RPOST    610

| Status | Origin Sender | End Recipient | Sent Secure Identifier, Last Hop | Received Secure Identifier | Time Accepted |
|---|---|---|---|---|---|
| Best | Bob@company.com | Sue@network.com | FQDN Domain, IP | TLS1.2@Server 1 | 10:01:10 UTC |
| Fail | Bob@company.com | Jim@home.com | Sender+FQDN+IP | RPPkI+TLS1.2@Server 3 | 10:02:15 UTC |

RPOST TO RECIPIENT

| Status | Origin Sender | End Recipient | Sent Secure Identifier, Last Hop | Received Secure Identifier | Time Accepted |
|---|---|---|---|---|---|
| Best | Bob@company.com | Sue@network.com | TLS1.2 | IP FQDN & Recipient | 10:02:10 UTC |
| Best | Bob@company.com | Jim@home.com | PDFAEs256+TLS1.0 | Recipient Mailbox | 10:04:15 UTC |

650 —

| SECURITY REPORT | | |
|---|---|---|
| Bob to Sue |  | Subject, Message ID, Time |
| Bob to Jim |  | Subject, Message ID, Time |
| Hash of Report, Digital Signature of Report | | |
| Metadata embedded in report | | |

FIG. 25

| Outbound Details: Sender to RMail Cloud | | | | | | | Inbound Details: RMail Cloud to Recipient | | | | |
|---|---|---|---|---|---|---|---|---|---|---|---|
| Original Sender | Internet Hop ID | Security Details | | Time Inducted | Encryption Status | | End Recipient | Security Details | | Time Received | Encryption Status |
| | | Message Level | Trans-mission | | | | | Message Level | Trans-mission | | |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | | siwilliams @aol.com | PDF-AES256 | | 01/13/2022 10:50:10 PM (UTC) | Best+ |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | | dranderson @ezconx.com | | | 01/13/2022 10:50:10 PM (UTC) | Best |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | | leah_smith @yahoo.com | | TLSv1.2 | 01/13/2022 10:50:10 PM (UTC) | Acceptable |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | | lrsmutz @hotmail.com | | TLSv1.2 | 01/13/2022 10:50:10 PM (UTC) | Fair |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | | powell.samuel @lorbit.com | | | 01/13/2022 10:50:10 PM (UTC) | Fail |

```
for (int i=0; i<email.NumHeaderFields; i++
        {
            var headerFieldName=email.GetHeaderFieldName(i).ToLower();
if (!string.IsNullOrEmpty(headerFieldName))
{
   If(headerFieldName.Contains(xOrignalToHdrKey) || headerFieldName.
Contains(xreceiverHdrKey))
            {
                destinationAddress = GetEmailAddressWithoutDomainExtension
(email.GetHeaderFieldValue(i));
            }
            else if (headerFieldName.Contains(receivedHdrKey))
            {
                receivedHeaderLoopcounter = receivedHeaderLoopcounter + 1;
                msgReceivedHeaderValue = email.GetHeaderFieldValue(i);
                If (!string.IsNullOrEmpty(msgReceivedHeaderValue)
                && !string.IsNullOrWhiteSpace(msgReceivedHeaderValue))
                {
          msgReceivedHeaderLoglist.Add(new MessageReceivedHeaderLog()
                    {
                        Id = Guid.NewGuid(),
                        MessageId = messageId,
                        FieldName = fileName,
                        ReceivedHeader = msgReceivedHeaderValue,
                        Sequence = receivedHeaderLoopcounter,
                        DestinationAddress = destinationAddress,
                        CreateDate = System.DateTime.UtcNow,
                        SenderAddress = senderAddress,
                        AppName = appName
                    }
                    };
                }
            }
        }
```

FIG. 30

```
private List<MessageReceivedHeader> GetMessageReceivedHeaders
  (List<MessageReceivedheaderLog> msgRcvdHeaderLogList, string messageId)
{
   //Regex pattern to determing from, by, with , tls, cipher and date sectionsin the
emailbody of eml file
   string emailHeaderparsingPattern = "(?<=(Received:).* |\\G(?!|\\A))"+
            "\\s*(?<=(from).*|by|with|tls|^.*,cipher= |ARC-Seal:|;|x-MS)"+
            "\\s*(\\S+?(?:\\s+\\S+?)*?)\\s*"+
            "(?=Received:| from| by|with| tls|^.*,,cipher=ARC-Seal:|;|X-MS|\\z)"
   var messageReceivedHeaderList = new List<MessageReceivedHeader>();
   try
   {
      int innerloopCounter = 0;
      int outerLoopcounter = 0;
      var receivedHeader = stringEmpty;
      var receivedHdrKey = _rcsHeaderLogGlobalconfig.Value.ReceivedHdrKey;
      var fromValue = String.Empty;
      var byValue = String.Empty;
      var withValue = String.Empty;
      var tlsValue = String.Empty;
      var cipherValue = String.Empty;
      var dateValue = String.empty;
      foreach(var itemin msgRcvdHeaderLogList)
      }
         innerLoopCounter = 0;
         outerLoopCounter = outerLoopcounter +1;
         if(!string.IsNullOrEmpty(receivedHdrKey)
         && !string.IsNullOrWhiteSpace(receivedHdrKey))
         {
            receivedHeader = (item.ReceivedHeader.Contains(receivedHeaderKey))
?item.ReceivedHeader:
         }
         else
         }
            receivedHeader = (item.ReceivedHeader.Contains("Received:"))
? item.ReceivedHeader : "Received:" + item.ReceivedHeader;
         }
         for each (Match match in Regex.Matches(receivedHeader,emailHeader
ParsingPattern,RegexOptions.IgnoreCase | RegexOptions.Singleline))
         {
```

FIG. 31

```
private List<MessageReceivedHeader>GetMessageReceivedHeaders
   (List<MessageReceivedHeaderLog> msgRcvdHeaderLogList,string messageId)
{
   //Regex pattern to determining from by, with tls.cipher and date sectionsin the en
   string emailHeaderParsingPattern = "(?<=(Received:).*|\\G[?!\\A))" +
               "\\s*(?<=(from).*|by|with|tls|^.*,cipher=|ARC Seal:|;|X-MS)" +
               "\\s*(\\S+?(?:\\s+\\S+?)*?)\\s*" +
               "(?=Received:|from|by|with|tls|^.cipher=|ARC-Seal:|;|X-MS|\\z)";
```

```
private string GetTLSValueFromSmtpLogs(string smtpLog)
{
    var tlsValue = string.Empty;
    try
    {
        var tlsRegExPattern = @"(?<=tls:).*(.*?)(?=connected|\z)";

foreach (Match match in Regex.Matches(smtpLog, tlsRegExPattern, RegexOptions.IgnoreCase | RegexOptions.Singleline))
        {
            tlsValue = match.Value;

}
    }
    catch(Exception ex)
    {
```

End to End Security Summary

| Original Sender | Original Recipient | Overall Encryption Status | Status Description |
|---|---|---|---|
| john.sanders@z-insure.com | s.williams@aol.com | ★★★★★ | Best+ encryption from sender device to recipient inbox |
| john.sanders@z-insure.com | dr.anderson@ezconx.com | ★★★★☆ | Best+ encryption from sender device, best to recipient gateway |
| john.sanders@z-insure.com | leah_smith@yahoo.com | ★★★☆☆ | Best+ encryption from sender device, acceptable to recipient gateway |
| john.sanders@z-insure.com | hrsmultz@hotmail.com | ★★☆☆☆ | Best+ encryption from sender device, fare to recipient gateway |
| john.sanders@z-insure.com | powell.samuel@orbit.com | ★☆☆☆☆ | Best+ encryption from sender device, no encryption to recipient |

| Status | | Overall Status | MORE DESCRIPTIVE OPTION | LESS DESCRIPTIVE OPTION |
|---|---|---|---|---|
| Sender To RMail Cloud | RMail Cloud to Recipient | Overall Status | Summary Desc (Outlook Plugin Used, ONLY with Local Encryption Mode) | Summary Desc (Outlook Plugin Used, ONLY with Local Encryption Mode) |
| Best+ | Best+ | Best+ | | |
| Best+ | Best | Best | Encrypted from sender device into recipient inbox | Best+ encryption from sender device into recipient inbox |
| Best+ | Acceptable | Acceptable | Encrypted from sender device into recipient gateway | Best+ encryption from sender device, acceptable to recipient gateway |
| Best+ | Fair | Fair | Encrypted from sender device, no encryption to recipient | Best+ encryption from sender device, fair to recipient gateway |
| Best+ | Fail | Fail | Encrypted from sender device, no encryption to recipient | Best+ encrypted from sender device, no encryption to recipient |
| Best+ | | incomplete | Encrypted from sender device, no transmission to recipient | Best+ encrypted from sender device, no transmission to recipient |
| Sender To RMail Cloud | RMail Cloud to Recipient | Overall Status | Summary Desc (sender gateway, Outlook without Local Encryption Mode, other methods) | Summary Desc (sender gateway, Outlook without Local Encryption Mode, other methods) |
| Best | Best+ | Best | Encrypted from sender gateway into recipient inbox | Best encryption from sender gateway, best+ to recipient inbox |
| Best | Best | Best | Encrypted from sender gateway into recipient gateway | Best encryption from sender gateway, to recipient gateway |
| Best | Acceptable | Acceptable | Encrypted from sender gateway, into recipient gateway | Best encryption from sender gateway, acceptable to recipient gateway |
| Best | Fair | Fair | Encrypted from sender gateway, no encryption to recipient | Best encryption from sender gateway, fair to recipient gateway |
| Best | Fail | Fail | Encrypted from sender gateway, no encryption to recipient | Best encryption from sender gateway, no encryption to recipient |
| Best | | incomplete | Encrypted from sender gateway, no transmission to recipient | Best encrypted from sender gateway, no transmission to recipient |
| Sender To RMail Cloud | RMail Cloud to Recipient | Overall Status | Summary Desc (Outlook Plugin Used, ONLY with Local Encryption Mode) | Summary Desc (Outlook Plugin Used, ONLY with Local Encryption Mode) |
| Best | Best+ | Best | Encrypted from sender gateway into recipient inbox | Best encryption from sender device, best+ to recipient inbox |
| Best | Best | Best | Encrypted from sender gateway to recipient gateway | Best encryption from sender device to recipient gateway |
| Best | Acceptable | Acceptable | Encrypted from sender gateway to recipient gateway | Best encryption from sender device, acceptable to recipient gateway |
| Best | Fair | Fair | Encrypted from sender gateway, no encryption to recipient | Best encryption from sender device, fair to recipient gateway |
| Best | Fail | Fail | Encrypted from sender gateway, no encryption to recipient | Best encrypted from sender device, no encryption to recipient |
| Best | | incomplete | Encrypted from sender gateway, no transmission to recipient | Best encrypted from sender device, no transmission to recipient |
| Sender To RMail Cloud | RMail Cloud to Recipient | Overall Status | Summary Desc (Outlook Plugin Used, ONLY with Local Encryption Mode) | Summary Desc (Outlook Plugin Used, ONLY with Local Encryption Mode) |
| Acceptable | Best+ | Acceptable | Encrypted from sender gateway into recipient inbox | Acceptable encryption from sender gateway, best+ to recipient inbox |
| Acceptable | Best | Acceptable | Encrypted from sender gateway to recipient gateway | Acceptable encryption from sender gateway, best to recipient gateway |

FIG. 40

```
--_009_BYAPR13MB4278CB394B695737EE3B8FAF24C9BYAPR13MB4278namp_
Content-Type: application/octet-stream;
    name="f9e1f6ec4b054987bcb7989a90dc3daf.rsec"
Content-Description: f9e1f6ec4b054987bcb7989a90dc3daf.rsec
Content-Disposition: attachment;
    filename="f9e1f6ec4b054987bcb7989a90dc3daf.rsec"; size=359663;
    creation-date="Thu, 06 Jan 2022 21:27:37 GMT";
    modification-date="Thu, 06 Jan 2022 21:27:38 GMT"
Content-Transfer-Encoding: base64
```
FIG. 43

FIG. 44A

| (A) | (B) | (C) | (D) | (E) | (F) | (G) | (H) | (I) | (J) | (K) | (L) |
|---|---|---|---|---|---|---|---|---|---|---|---|
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | dranderson @ezconx.com | | TLSv1.2 | 01/13/2022 10:50:10 PM (UTC) | Best |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | leah_smith @yahoo.com | | | 01/13/2022 10:50:10 PM (UTC) | Acceptable |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | trsmultz @hotmail.com | | TLSv1.2 | 01/13/2022 10:50:10 PM (UTC) | Fair |
| john.sanders @z-insure.com | BYAPR13M B4278.namp rd13.prod.ou tlook.com (2603:10b6: a03:a4::20) | RSA-AES256 | TLSv1.2 | 01/13/2022 10:50:16 PM (UTC) | Best+ | powell.samuel @lorbit.com | | | 01/13/2022 10:50:10 PM (UTC) | Fail |

End to End Security Summary

| Original Sender | Original Recipient | Encryption State | Status Description |
|---|---|---|---|
| john.sanders@z-insure.com | skwilliams@aol.com | Best+ ★★★★★ | Best+ encryption from sender device from sender device, best to recipient inbox |
| john.sanders@z-insure.com | dranderson@ezconx.com | Best+ ★★★★☆ | Best+ encryption from sender device, best to recipient gateway |
| john.sanders@z-insure.com | leah_smith@yahoo.com | Best+ ★★★☆☆ | Best+ encryption from sender device, acceptable to recipient gateway |
| john.sanders@z-insure.com | trsmultz@hotmail.com | Best+ ★★☆☆☆ | Best+ encryption from sender device, fair to recipient gateway |
| john.sanders@z-insure.com | powell.samuel@lorbit.com | Best+ ★☆☆☆☆ | Best+ encryption from sender device, no encryption to recipient |

FIG. 45B

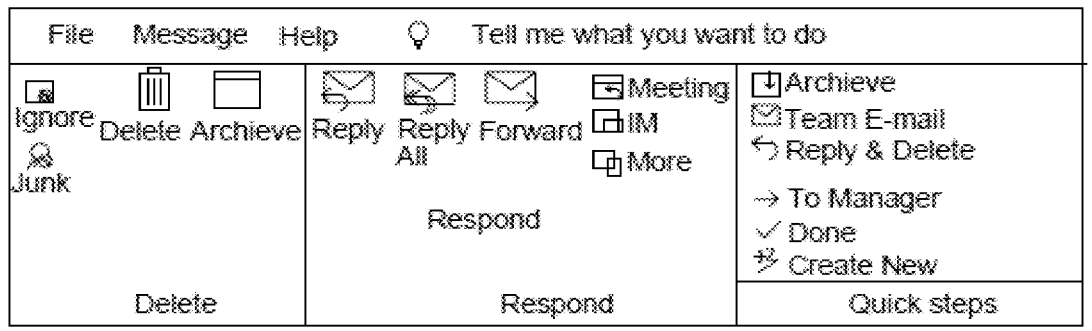

Notice of Lien and Foreclosure

Your unit 054 at 2150E 3300 SMilcreek UT 84109 is past due. To prevent your property from going to auctio, please make a payment now.

If you have any questions regarding the auction status of your unit please call your store manager at 9852920798

[ PAY BY PHONE ]   [ PAY ONLINE ]

| | |
|---|---|
| AUCTION DATE: | 07/08/2021 |
| AUCTION TIME : | 10:00AM |
| AUCTION ADDRESS : | 2150 E 3300S |

| | |
|---|---|
| Unpaid Rent: | $260.30 |
| Unpaid Fees: | $139.80 |
| LIEN AMOUNT: | $400.10 |
| Unpaid Insurance: | $22.00 |
| TOTAL DUE: | $422.10 |
| DUE DATE: | 05/17/2021 |

 NOTICE OF LIEN

Your rent is now atleast thirty (30) days past due and you have not responded to our attempts to contact you. your right to use Storage unit 0.54 in which you stored boxes, personal items, household goods, memorbilia bicycles has been terminated and access to your untill will continue to be denied. the store property is subject to a lien. the current amount of the lien is the lien amount set forth above which includes a pre foreclosure fee of $85.00. The Lien Amount will continue to increase if rent is not paid if lien is not paid. As of this data , you will owe the lien Amount plus your insurance premium If any.If you want to keep your

| Outbound Details: Sender to RMail Cloud | | | | | Inbound Details: RMail Cloud to Recipient | | | | |
|---|---|---|---|---|---|---|---|---|---|
| Original Sender | Internet Hop ID | Security Details | | Time Inducted | Encryption Status | End Recipient | Security Details | | Time Received | Encryption Status |
| | | Message Level | Trans-mission | | | | Message Level | Trans-mission | | |
| aw.com | mail-01-1173 google.com (mail-i1173 google.com [209.85.166.173]) | | | 02/10/2022 10:19:16 PM (UTC) | Fail | @gmail.com | | TLSv1.2 | 01/13/2022 10:50:10 PM (UTC) | Best+ |

| End to End Security Summary | | | |
|---|---|---|---|
| Original Sender | Original Recipient | Overall Encryption Status | Status Description |
| aw.com | @gmail.com | ★☆☆☆☆ | No encryption from sender, next to recipient gateway |

FIG. 51

REGISTERED ENCRYPTED ELECTRONIC MESSAGE AND SELECTED CONTENT VIEW PROOF SYSTEM

CROSS-REFERENCE TO RELATED APPLICATIONS

This application is a continuation-in-part of U.S. patent application Ser. No. 16/866,135, filed May 4, 2020, and claims priority to the earlier filed U.S. Provisional Application No. 62/833,022, filed on Apr. 12, 2019, entitled "Verification of Encrypted Electronic Message Delivery and Preventing Accidental Disclosure of Sensitive Message Parts in Replies" which is incorporated reference herein in its entirety.

FIELD

This disclosure relates to electronic message security within the category of private delivery of electronic messages, and the sub-category of privacy compliance. More particularly, the disclosure relates to electronic message security within the category of private delivery of electronic messages, and the sub-category of privacy compliance in terms of protecting a sender or sender organization against claims of a data breach due to a claim that a sent message was not sent securely in terms of privacy; and to provide audit-ready records to verify secure delivery of electronic messages in case of a data privacy compliance audit.

BACKGROUND

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email (electronic message transmission systems and protocols) are often relied on for important communications among people and used to instruct people to do things or transmit sensitive financial, health-related, strategic, or legal information that a sender may not want to be available to parties other than the email recipient.

In many states, countries, and industries, there are regulations that require senders of certain information to send the information using systems that transmit the electronic message in a manner more private than standard email transmissions. One example is the US health care privacy regulation entitled, Health Insurance Portability and Accountability Act of 1996 (HIPAA) in the United States, which provides data privacy and security provisions for safeguarding medical information. Another example is the European General Data Protection Regulation (GDPR) which includes provisions for email privacy compliance. GDPR defines what is to be achieved with compliance rather than how the requirements should be fulfilled. Consequently, it does not state a requirement to use a specific method of encrypting email, but it does require the handler of consumer non-public and personal information to maintain not only the privacy of that information but also the ability to demonstrate compliance with the privacy requirements. These requirements are discussed in detail in GDPR Article 5 Clause 1(f) and 2, and Article 32 Clause 1(a) and 1(d), which focus on the requirement to protect personal data during transmission with the ability to demonstrate the fact of protection of personal data.

While a normal email and electronic message system user knows how to send, receive, read, reply-to, and forward an electronic message (email refers to any electronic message transmitted using electronic message transmission protocols), a normal email user neither knows how to transmit an email in a more secure or private manner, nor knows how to verify if a message is to be sent or was sent using a more secure or private manner as compared to a standard email. Upon receiving an email, a normal email user would not know how to verify if that email was received using a secure transmission or encrypted transmission. A normal email user will not know how to prevent a recipient of their sent secure transmission, from replying insecurely and, thereby, exposing their originally sent content that may be in the email thread.

More advanced email users may configure their email program to automatically filter email to be placed in certain folders or mark email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operators may install third-party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner than using standard messaging protocols. Some users may opt to upload their message to a secure server that would send a link to retrieve or view the message, and some may opt to compose their message in a secure program accessed securely in a web browser and then transmit. Some systems may send a message using secure application programming interfaces using protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, and the like, with or without sending with a secure connection like TLS, SSL, or HTTPS. There are other protocols in secure messaging systems, including EDI, SMS, MMS, and the like.

What is needed is a means for a sender or sending organization, or for a receiver, or for a receiver replying to a sender, to have a means to have (1) assurance of private transmission from a sending point to a receiving point (the sending end-point and receiving end-point may be different in different circumstances), (2) record fact of private transmission end-to-end, (3) provide a means for third-party verification of fact of private transmission, end-to-end, on a message-by-message basis, and (4) redacting and optionally additionally recording the redaction of message content or part of the message content upon a recipient reply (for example, a reply by the recipient will not transmit the designated private information in the recipient reply). The present invention satisfies these and other needs.

SUMMARY OF THE INVENTION

In its most general aspect, the disclosure provides a system and method for protecting a sender or sender organization from the potential of breaches in information privacy policies that require certain messages or certain parts of messages to be transmitted in an encrypted manner or in a manner that minimizes the likelihood of accidental exposure of private information. In another aspect, the disclosure provides a system and method for protecting the sender or sender organization from a third-party claim that a message or a part of a message was not transmitted in an encrypted manner.

In another aspect, the disclosure sets forth a system and method that provides a sender or sender organization visibility and proof of fact of encrypted delivery for peace of mind or protection in the case of privacy compliance audit, and visibility and proof of fact of receipt of an inbound message having been transmitted with encrypted delivery from the sender or sender agent. In one exemplary aspect, the sender may be protected when a recipient receives a message using a secure message transmission process that permits the recipient to reply to the message, potentially exposing the originally received message content if the reply includes the message thread and is returned without a secure transmission process. In another aspect, the disclosure sets forth a system and method to provide a sender or sender organization a verifiable proof of encrypted transmission and delivery of their email message, to be used during a Privacy Compliance Audit and for their peace of mind. In another aspect, the discloser sets forth a method to protect the sender when the receiver of a securely transmitted message replies to the message without encrypting it, thereby exposing the sender's original message over the internet during its transmission.

In still another aspect, the disclosure provides audit-ready records to verify secure delivery of electronic messages to better manage messaging policies and to provide readily accessible information in case of a data privacy compliance audit. In another aspect, the disclosure provides that the systems and methods set forth herein may have portions that may be implemented individually, each implemented partially or implemented together.

In another aspect, the disclosure provides a sender or sending organization (or a receiver or a receiver replying) with a record of fact of encrypted delivery of an electronic message from one endpoint to a receiving endpoint. In another aspect, the disclosure further provides creating a record that includes sufficient information related to the private delivery such that it can be relied on as proof of fact of encrypted delivery.

In yet another aspect, the disclosure provides a means for third parties to authenticate the record of fact of private delivery. In still another aspect, the disclosure creates a record to provide the sender of a message opportunities to make a reply to the sender's message returned in a more private manner (so as not to expose the content or a part of the sender's original information sent if contained in the reply message thread).

In yet another aspect, the disclosure provides a means for the sender or third parties to authenticate the record of fact of certain content sent having been redacted or removed from a recipient's reply message thread.

In another aspect, the disclosure provides a system for providing a redacted reply service for an email message, comprising a server remote from a recipient programmed to: receive a message containing content marked by a sender for redaction, determine that the message contains content marked for redaction, determine if there are any settings established by the sender of the message that are to be used in processing the received message, remove content marked for redaction in accordance with the determined settings, reformat the message according to the determined settings, transmit the reformatted message, and information associated with the removed content to the recipient. In another aspect, the server is further programmed to store the removed content in a database stored in a memory. In still another aspect, the server is programmed to add a viewing limitation to the removed content to limit various parameters associated with the viewing of the stored removed content. In another aspect, the transmitted information associated with the removed content is a link providing access to the removed content stored in the database.

In yet another aspect, the server is further programmed to add a link to the transmitted reformatted message that includes reply control information that limits the content that a reply message based on the transmitted reformatted message may contain. In one aspect, the control information prevents the reply from including the information associated with the removed content. In another aspect, the control information includes information established by the sender.

In still another aspect, the disclosure provides a system for providing a registered encryption service for an email system, comprising a server remote from a recipient programmed to receive a message from a sender, parse one or more headers of the received message, store information associated with the one or more parsed headers in a database according to a security level or other data provided by the sender, secure the received message for transmission to an intended recipient, transmit the secured message, and information associated with the secured message, to the recipient. After, process the information stored in the database to determine the security level of the message, and generate a report related to the transmitted secured message and including an indication of the determined security level. In one aspect, the generated report is an authentication-ready report. In another aspect, the authentication-ready report is transmitted to the sender.

In yet another aspect, the server is further programmed to store a record of a method used to secure the received message in a database stored in a memory. In another aspect, the server is further programmed to store a record including a portion of a transmission protocol used to transmit the secured message to the recipient in a database stored in a memory. In yet another aspect, the server is further programmed to store a record of a method used to secure the message delivered to the recipient in a database stored in a memory. In still another aspect, the server is further programmed to store a record of a method used by the sender or sender server to secure the message received from the sender and the method used to secure the message sent to recipient, in a database stored in a memory. In another aspect, the server is further programmed to record the enablement of the redaction of content from the message sent to the recipient. In yet another aspect, the server is further programmed to record the enablement of the redaction of content in the message sent from the sender to the recipient In yet another aspect, the present disclosure includes a system for tracking encrypted delivery of a message from a sender to a recipient, comprising: an intermediate server configured to receive a message from a sender, the intermediate server including a translator, the translator determining, based on indicators contained in the message received at the intermediate server, the type of encryption or non-encryption of the message sent from the sender as it is received at the intermediate server. In one alternative aspect, the indicators are contained in a message header of the received message. In another alternative aspect, the indicators of the level of security used are based on the format of the received message. In yet another alternative aspect, the indicators are contained in a message header and are based on the format of the received message.

In still another aspect, the present disclosure includes a system for tracking encrypted delivery of a message from a sender to a recipient, comprising: an intermediate server configured to receive a message from a sender, the intermediate server including a translator, the translator analyzing values of indicators contained in a server dialog between the intermediate server and the recipient's server or device, the server dialog being received at the intermediate server, and determining from that analysis the type of encryption or non-encryption of the message sent from the intermediate server to the recipient. In one alternative aspect, the indicators are contained in the server communication dialog. In yet another alternative aspect, the indicators analyzed by the translator are based on the method of transmitting the message or the format of the message. In still another alternative aspect, the indicators analyzed are contained in the server communication dialog and are based on the method of transmitting the message or the format of the message. In yet another alternative aspect, the indicators analyzed by the translator are included in messages received at the intermediate server, and the type of encryption or non-encryption of the message sent from the sender as it is received at the intermediate server is determined by the translator as a result of that analysis.

In yet another aspect, the present disclosure includes a system for tracking overall encrypted delivery from a sender to a recipient via an intermediate server disposed between the sender and the recipient, comprising: an intermediate server configured to receive a message from a sender via a first transmission path, and also configured to transmit the received message to a recipient via a second transmission path, the intermediate server including a translator, the translator programmed using programming commands to: analyze the message sent along the first transmission path to determine values of first indicators contained in the message to determine the type of encryption or non-encryption of the message sent from the sender as it is received at the intermediate server, and analyze a server dialog received at the intermediate server, the server dialog generated during the second transmission path between the intermediate server and the recipient's server or device, the server dialog containing values of second indicators, to determine, from the values of the second indicators, the type of encryption or non-encryption of the message sent from the intermediate server to the recipient. In one alternative aspect, the first indicators are contained in a header of the message. In another alternative aspect, the first indicators are based on a format of the message. In yet another alternative aspect, the first indicators are contained in a message header and are based on a format of the message. In still another alternative aspect, the second indicators are contained in a server communication dialog. In yet another alternative aspect, the second indicators are based on the method of transmitting the message to the recipient or a format of the message. In still another alternative aspect, the second indicators are contained in a server communication dialog, the second indicators being based on the method of transmitting the message or a format of the message.

In yet another aspect, the present disclosure includes a system for tracking overall encrypted delivery from a sender to a recipient via an intermediate server disposed between the sender and the recipient, comprising: an intermediate server configured to receive a message including original content from a sender via a first transmission path, and also configured to transmit the received message to a recipient via a second transmission path, the intermediate server including a translator, the translator programmed using programming commands to: analyze message headers or message format received at the intermediate server, a method of transmitting or format of transmission sent to the intermediate server, to determine overall encryption status of the message, cryptographically or otherwise associate the overall encryption status of the message with the original content of the message, and generate an encryption status report at the intermediate server. In one alternative aspect, the encrypted status report is determined to be associated with the original message content through the cryptographic association. In another alternative aspect, the encrypted status report is determined to be associated with the original message content through association in a database. In an alternate aspect, the encryption status report is returned to the sender, receiver or sender's or receivers designee, or displayed for view by the sender, sender, receiver or sender's or receivers designee, with or without a representation of the original message content for the message associated with the encryption status report.

In another aspect, the present disclosure includes a system for tracking encrypted delivery of a message from a sender to a recipient, comprising: an intermediate server configured to receive a message from a sender, the intermediate server including a translator, the translator analyzing first indicators contained in the message received at the intermediate server and second indicators generated at the intermediate server upon receipt of the message at the intermediate server, the translator determining by using the first indicators to identify corresponding second indicators, the second indicator determining the type of encryption or non-encryption of the message sent from the sender as it is received at the intermediate server. In one alternate aspect, the first indicators are contained in a message header of the received message. In another alternative aspect, the second indicators are contained in the raw server message received logs at the intermediate server. In still another alternative aspect, the first indicators are contained in a message header and are based on a format of the received message.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The following detailed description and examples are provided for the purpose of non-exhaustively describing some, but not necessarily all, examples or embodiments of the disclosure, and shall not limit the scope of the disclosure in any way.

FIG. 6. depicts exemplary sender settings used in accordance with the various embodiments of the disclosure.

FIG. 11 is a schematic diagram of one aspect of the embodiment of FIG. 7.

FIG. 17 is a graphical view of menus of sender settings in accordance with the various embodiments of the disclosure.

FIG. 18 is a graphical view of a menu used in a system in accordance with the various embodiments of the disclosure.

FIG. 22 is a schematic view of one aspect of the embodiment of FIG. 21.

FIG. 23 is a schematic view of one aspect of the embodiment of FIG. 21.

FIG. 24 is a graphical view of a report generated in accordance with the present disclosure.

FIG. 25 is a graphical view of a report generated in accordance with the present disclosure.

FIG. 28 is a graphical view of a report generated in accordance with the present disclosure.

FIG. 29 is a listing of information extracted from a header of a message.

FIG. 30 is a listing of exemplary codes illustrating an embodiment of the present disclosure.

FIG. 31 is a listing of exemplary code illustrating one embodiment of the present disclosure providing for parsing of header data.

FIG. 32 is a listing of exemplary code illustrating an embodiment of the present disclosure for parsing of header data.

FIG. 33 is a listing of exemplary code illustrating an embodiment of the present disclosure for analyzing header data.

FIG. 34 is a listing of exemplary code illustrating an embodiment of the present disclosure for determining the encryption status of a message.

FIG. 35 is a graphical illustration of results for an analysis in accordance with the code of FIG. 36.

FIG. 36 is a listing of exemplary code illustrating an embodiment of the present disclosure for determining level of encryption of a message.

Figure 37:
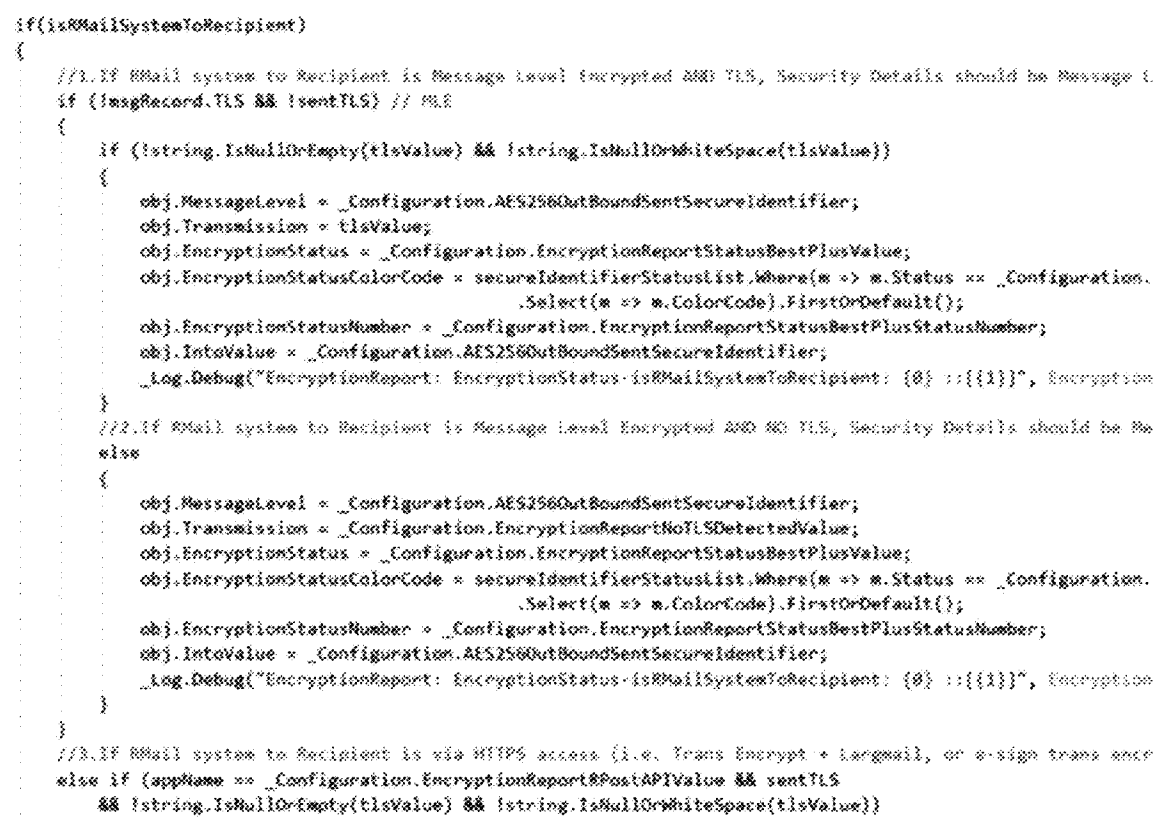

FIG. 37 is a listing of exemplary code illustrating an embodiment of the present disclosure for determining an encryption status of a message.

FIG. 38 is a graphical illustration of a report related to an end-to-end summary of the encryption status of a message.

FIG. 39 is a listing of exemplary code illustrating an embodiment of the present disclosure for generating the report of FIG. 38.

FIG. 40 is a graphical illustration of a report of an overall encryption status of a message.

FIG. 43 is an exemplary illustration of a portion of an excerpt of dialog in accordance with the present disclosure.

FIG. 44A is an exemplary report illustrating a transmission dialog in accordance with the present disclosure.

FIG. 45B is a continuation of FIG. 45A illustrating an encryption tracking report in accordance with the present disclosure.

FIG. 46 illustrates one embodiment for use in identifying information that is considered confidential or sensitive in accordance with various embodiments of the disclosure.

FIG. 50 illustrates an embodiment of reports generated in accordance with embodiments of the present disclosure.

FIG. 51 is a graphical illustration of a report generated in accordance with embodiments of the disclosure.

DETAILED DESCRIPTION OF THE PREFERRED EMBODIMENTS

Figure 1:
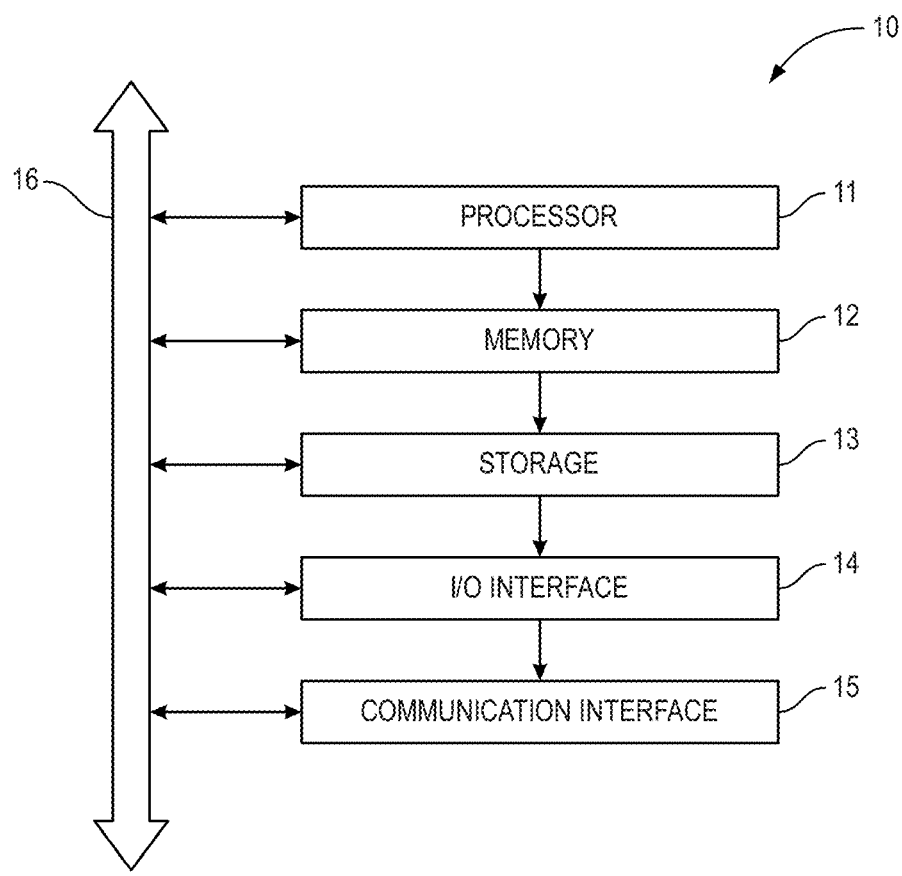
FIG. 1 is a schematic diagram of a computer or processing system that may be specifically modified by the various embodiments of the present disclosure to carry out a registered redaction or registered encryption of a message sent by a sender to a recipient via a network.

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email is often relied upon for important communications among people and used to instruct people to do things or transmit sensitive financial, health-related, strategic, or legal information that a sender may not want to be available to parties other than the email recipient.

In many states, countries, and industries, some regulations require that senders of a certain type of information send the information using systems that transmit the electronic message in a manner more private than standard email transmissions. One example is the US health care privacy regulation entitled, Health Insurance Portability and Accountability Act of 1996 (HIPAA) in the United States that provides data privacy and security provisions for safeguarding medical information. Another example is the European General Data Protection Regulation (GDPR) which includes provisions for email privacy compliance. GDPR defines what is to be achieved with compliance rather than how the requirements should be fulfilled. Consequently, it does not state a requirement to use a specific method of encrypting email, but it does require the handler of consumer non-public and personal information to maintain not only privacy of that information, but also the ability to demonstrate compliance with the privacy requirements. These requirements are discussed detail in GDPR Article 5 Clause 1(f) and 2, and Article 32 Clause 1(a) and 1(d) which focus on the requirement to protect personal data during transmission with the ability to demonstrate fact of protection of personal data.

While a normal email and electronic message system user knows how to send, receive, read, reply-to, and forward an electronic message (email refers to any electronic message transmitted using electronic message transmission protocols), a normal email user neither knows how to transmit an email in a more secure or private manner, nor knows how to verify if a message is to be sent or was sent using a more secure or private manner as compared to a standard email. Upon receiving an email, a normal email user would not know how to verify if that email was received using a secure transmission or encrypted transmission. A normal email user will not know how to prevent a recipient in receipt of the content of their sent secure transmission, to prevent them from replying insecurely and exposing their originally sent content that may be in the email thread.

More advanced email users may configure their email program to automatically filter email to be placed in certain folders, or mark the email with various levels of importance. Even more advanced email users may set up systems to transmit email in a more private manner than in a standard email transmission; a standard email transmission being defined as an electronic message transmission sent using electronic messaging protocols such as SMTP, ESMTP, SMS, SMPP, MMS, HTTP, HTTPS, and combinations such as with SSL, TLS, and others.

Some of these email users or their email operators may install third-party programs or encryption keys inside their existing email program to assist them in dealing with the various known and common security threats associated with email. Users (senders of email and/or recipients) or email system administrators may add software or enable settings at the email server, email gateway, or email user interface (commonly referred to as "Email Client"). These add-on software programs may add options to transmit messages in a more private manner than using standard messaging protocols. For example, some users may opt to upload their message to a secure server that would send a link to retrieve or view the message, and some may opt to compose their message in a secure program accessed securely in a web browser and then transmit. Some systems may send messages using secure application programming interfaces including using protocols such as SOAP, REST, EDI exchange protocols, among others.

There are a variety of methods of transmitting messages in a more private manner than using standard email transmission protocols. Some of these methods use PGP, PKI, AES 256-Bit PDF, Link-Retrieval, HTML Wrappers, and the like, with or without sending with a secure connection like TLS, SSL, or HTTPS. There are other protocols in secure messaging systems, including EDI, SMS, MMS, and the like. This discussion focuses on certain types of email system implementation, but the problems and the application of the invention is not limited to those.

Some common methods of encrypting electronic messages are summarized as follows:

A. PKI: Exchange of public encryption keys generated by sender and receiver's digital certificates, shared between sender and receiver prior to sending messages. These "keys" are often stored in the Microsoft Outlook program. Use generally requires sender and reviver to have an advanced email program such as Microsoft Outlook full desktop installation or Lotus Notes; generally, not Gmail, Outlook-.com, or web email programs.

B. PGP: Exchange of keys generated by sender and receiver. Generally, sender and receiver need email programs that are configured to manage the key exchange, or sophistication among users to deal with this type of encryption. Some services attempt to make this easier to use.

C. PDF: AES 128-bit or 256-bit PDF encryption, where the message is printed into PDF format, the attachments are embedded in their native format, and the PDF serves as an encrypted wrapper for the message body and all attachments. The encrypted PDF file is attached to the email delivered to the recipient, and the message remains encrypted inside the recipient inbox while it is in the encrypted PDF file attachment.

D. TLS: Transport layer security, connecting from sender server to recipient server via a secure encrypted transmission. This only secures the message to the recipient server and requires recipient servers to be configured to operate with this option (which is not ubiquitous or certain). Further, there are various iterations of TLS, starting with the predecessor protocol Secure Sockets Layer (SSL), TLS 1.0, TLS 1.1, TLS 1.2, and TLS 1.3, and higher.

E. Link Retrieval: Store and forward systems where the sender sends an email, it is stored at an intermediate server, and that intermediate server sends an email with a link to retrieve the message; the link often includes a request for the recipient to sign-up for an account, go through several required steps, all needed to view and download the sent message. This requires storage of the message by third parties while waiting for the recipient to download and go through the steps to retrieve it.

F. HTML Wrapper: The sender sends an email, it is stored at an intermediate server and that intermediate server sends an email with an HTML file attached, the HTML file being large as it contains the message and all attachments encrypted. When a recipient clicks on the HTML file, it often brings the recipient to a webpage to sign-up for an account. After going through several required steps, the message is transmitted back from the recipient (from the HTML Wrapper file) to the sending server (or intermediate server) and then displayed in a browser from the sending server (or intermediate server) for the recipient to view and download the originally sent message.

G. File Sharing: Systems that require the user/sender to upload a document to an online storage area, and then invite a recipient to have access to the online folder to view and download the file, often with a required recipient password or account access.

The above methods of transmitting an electronic message in a more secure manner than a standard email message is a short summary of a variety of methods used and is not intended to be an exhaustive description of any one protocol or method, and there are others that may be used.

With heightened awareness of information privacy breaches, and government concern for protecting sensitive non-public consumer information, regulators have created data privacy regulations that require senders or sending organizations to use methods of transmission that protect the transmitted information from inadvertent disclosure to unintended recipients, eavesdroppers, or Internet thieves.

While these regulations generally do not specify a specific method of delivery, they generally do speak to the need to use methods to ensure the privacy of transmitted information, and some to maintain audit-ready records to demonstrate methods were used to ensure the privacy of transmitted information.

One of the main Federal data privacy regulations in the United States is HIPAA. In Europe, the General Data Protection Regulation (GDPR), Regulation ((EU) 2016/679) goes further, emphasizing the importance of maintaining a record of 'proof of data privacy compliance'; better yet, automated, demonstrable proof on a message by message basis (as described in GDPR Article 5 Clause 1 & 2 and Article 32 Clause 1) as accountability is an important requirement of the GDPR directive. There is a trend of US state regulators and lawmakers in other countries outside of Europe adopting new privacy regulations modeled on Europe's GDPR regulations.

Due to regulations, more and more, businesses dealing with consumer information will be compelled not only to transmit information securely, but also to retain auditable proof of compliant, secure email delivery. For many businesses, new requirements will require them to change email encryption services altogether. Auditable proof of encryption compliance will be needed to deal with compliance audits and the potential of accusations of data breach; particularly when the fines prove to be as steep as the regulators have declared they will be.

Due to the heightened sophistication of internet eavesdroppers and internet criminals, in their abilities to micro-target users or companies, businesses dealing with non-public strategic or regulated private (health-related or financial) data will be compelled not only to transmit information securely but also to retain the ability to track and verify whether the systems designed to transmit information more securely did, in fact, transmit the message securely; and maintain auditable proof of compliant secure delivery. Users will desire to have visibility to the fact of encrypted delivery, receipt, or redaction of important content, as will compliance officers and system administrators. For many businesses, new requirements will require them to change email encryption services altogether. Auditable proof of encryption compliance will be needed to deal with compliance audits and the potential of accusations of a data breach; particularly when the fines prove to be as steep as the regulators have declared they will be.

The main industries that will be targeted are those dealing with third-party consumer financial or health information— broadly speaking, those businesses dealing in consumer health care and financial services (banking, lending, investment advisory, insurance, residential real estate, etc.), and in functional business areas, such as, human resources, finance, accounting, and customer service. Additionally, lawyers should be interested in the functionality of the redaction of content from the email reply, as it will protect from exposure of sensitive information and they generally are familiar with the term "redaction" from use redacting content in documents.

In particular, parts of GDPR emphasize the importance of maintaining records of encrypted delivery: Article 5 for security, confidentiality, and accountability, and Article 32 for encrypting and assessing the effectiveness of technical measures to ensure security.

Article 5 Clause 1(f) calls for maintaining the confidentiality of personal data, stating, "personal data shall be processed in a manner that ensures appropriate security of the personal data . . . using appropriate technical or organizational measures ('integrity and confidentiality')". Article 5 Clause 2 creates the need to maintain demonstrable proof of compliance with the confidential treatment of personal data, stating, "The controller shall be responsible for, and be able to demonstrate compliance with, paragraph 1 ('accountability')".

Article 32 Clause 1(a) specifies use of encryption to secure personal data, stating, "the controller and the processor shall implement appropriate technical and organizational measures to ensure a level of security appropriate to the risk, including inter alia as appropriate: (a) the pseudonymization and encryption of personal data". Article 32 Clause 1(d) calls for regular assessments to ensure the security of the processing, stating, "a process for regularly testing, assessing and evaluating the effectiveness of technical and organizational measures for ensuring the security of the processing."

There are many concerns one needs to consider in terms of protecting the privacy of transmitted electronic information:

A. Protect from Interception—protect the message in transit across the Internet, regardless of server, provider, or settings, at the recipient. This should also protect against common interception tactics that defeat standard TLS server sending, such as TLS Downgrade Attacks that are most successful when there is no built-in fallback to another encrypted delivery method if the recipient server always or intermittently reports that it cannot accept a TLS transmission.

B. Protect from Eavesdroppers—option to protect the message as it transfers from sender through sender organization and as it transfers through to the recipient destination. There are different categories of eavesdroppers—it could be curious staff inside a sender or receiver organization, Internet criminals, or practices of an outsourced provider that has access to email. In the latter example, consider if a recipient uses Gmail, and the sender's message is encrypted to the receiver's email provider (Gmail in this case). In this example, the receiver's provider offers a free email service that relies on marketing user information. The message content at the receiver will be analyzed by Google, with elements recorded, and a profile sold in the point of "improving" the service (aka the marketing profile of sender and/or recipient based on content of the email associated with the email addresses and other data collected).

C. Protect from Socially Engineered Leaks—a data protection plan should also consider how to protect from an imposter email received by human resources, finance, or other staff that deal in customer sensitive information, which lures them into replying with sensitive data attached. A common tactic is for an Internet criminal to pretend that they are an employee asking for benefits or tax information by email to the human resource department, and the reply email is configured so the staffs reply with the information unknowingly routes to the internet criminal. The technology industry calls this a "whaling" attack—a more socially engineered approach to "spear-phishing". The Federal Bureau of Investigation calls this a type of Business Email Compromise attack. The best solutions will detect for this type of socially engineered data leak.

D. Automated Rules—some may prefer the option for a sender to direct the server to encrypt a message before sending, by either adding content to the message, such as a keyword in the subject field or by matching content in the message to content policies added at the server. This may be useful in certain situations.

And social elements of these means of transmitting information privately must also be considered:

A. Simple Enough that it is Used—if the service is too complicated for the sender, the sender may ultimately not use the service. If the sender, for example, needs to engage in an encryption key or certificate exchange with the intended recipient, service usage will be dramatically limited. Simplicity of use is essential in today's business environment.

B. Simple for Recipient, Avoids Complaints—if the service is cumbersome for the recipient, such as mandating multiple steps to set up an account to retrieve messages, the receiver will naturally complain to the sender or may never pick up the sender's important message. Simplicity of use becomes critical when the sender is sending private information where they also need proof of delivery, for example, information related to a customer account, investment risk disclosures, etc. In these cases, uploading documents to a portal or sending a link with a complex process to retrieve will not likely deliver the information to the recipient, and may not constitute successful compliance with delivery or notification requirements.

C. Peace of Mind—providing the sender with proof of delivery, proof of fact of encrypted delivery; and providing the recipient with visible markings of the fact that the sender elected to treat the information as sensitive and transmit it securely to the recipient. Simple use of TLS, for example, does neither of these.

D. No Storage—most companies prefer there not to be another location where messages are stored in transit as this creates another risk where the message may be breached. The intermediate storage server security should be monitored, and it creates a potential point for subsequent data access depending on the intermediate server's data retention and deletion techniques. For example, if one uses a file sharing service to transmit a sensitive document, users rarely return to delete the document after transmission. The document remains accessible at the shared link for an extended period. Also, link-retrieval secure e-delivery systems often store a copy on an intermediate server until the document is retrieved (and it may never be), for extended periods of time, or even if retrieved, may not have optimal deletion processes. These can unnecessarily expose sensitive data.

E. User Carelessness—protect from recipients replying to received sensitive information that they reply to leaving the sensitive data in the email thread with the reply transmitted insecurely or without the level of security the sender would have desired for that type of message or message content part.

Considering transmitting messages in a more secure manner, if doing so for compliance reasons (compliance with data privacy rules), one should consider how they may be able to maintain records of fact of encrypted delivery; how the sender may maintain audit-ready data privacy compliance proof. The General Data Protection Regulation (GDPR), Regulation ((EU) 2016/679), for example, calls for penalties of up to 4% of global turnover with a maximum fine of 20 million Euros. Considering the potential of a fine tied to a percentage of global turnover, compliance consultants should educate their clients on the importance of maintaining a record of 'proof of data privacy compliance'; better yet, automated, demonstrable proof on a message by message basis (as described in GDPR Article 5 Clause 1 & 2 and Article 32 Clause 1) as accountability is a key requirement of the GDPR directive. US and other state and country regulators are likely to follow these guidelines in the future. Industry groups are likely to develop industry best practices for secure data transport and proof of.

With the significance of GDPR fines for a data breach, it is imperative that the sender organization has audit-ready proof of fact of encrypted delivery, on a message by message basis. Simply having a "policy" in place does not mean the policy was functioning properly. For example, a policy may automate the transmission by TLS, but that does not mean that the message went by TLS (consider a TLS Downgrade Attack). It does not mean the server was functioning properly if looked back upon months or years later, when a dispute or breach is being investigated. Audit-ready evidence on a message-by-message basis is most desirable, and preferably if this is easily demonstrated in a compliance review, compliance audit, or in case there is an accusation of a data breach by a sender (which can happen if there is a data breach at the recipient's system or after a receiver forwards a message onward).

Many companies rely on TLS delivery to secure transmission; however, many companies and email service providers use what is considered an insecure version of TLS (i.e. TLS 1.0). As Microsoft reports in their Jan. 14, 2019 blog, "as of Oct. 31, 2018, Office 365 will no longer support TLS 1.0 and 1.1," and that it "will not fix new issues that are found in clients, devices, or services that connect to Office 365 by using TLS 1.0 and 1.1." However, it stated that it would continue to deliver fixes to recipients with these levels of TLS. See, https://docs.microsoft.com/en-us/office365/securitycompliance/technical-reference-details-about-encryption#TLS11and12deprecation."

Microsoft reported on Aug. 16, 2018, "Insights point to connectors to help draw your attention to potential TLS encryption problems for the connector. The insights are: No TLS is over 25% or TLS 1.0 is above 50%. If you see these insights, you need to investigate your email servers that are associated with the connector, or reach out to your partner organization." https://docs.microsoft.com/en-us/office365/securitycompliance/mfi-outbound-and-inbound-mail-flow (Mar. 6, 2019).

On Aug. 6, 2019, Microsoft, reported the results of using it's Outbound and Inbound mail flow widget. Applying the widget to an exemplary company, the widget reported that 8458 outbound and 6292 inbound messages were protected by TLS 1.2 or higher. Microsoft utilized this data to support deprecation for TLS 1.0 and 1.1.

RPost blog written by Zafar Khan on Dec. 7, 2018, entitled, "Not All TLS is Created Equal" (https://www.rpost.com/news/not-tis-created-equal/) cites statistics from the Google Email Transparency Report data (https://transparencyreport.google.com/safer-email/overvew?hl=en), which states that Gmail Systems send a percentage of all emails without any security. This finding is similar to the conclusions of the Microsoft Insights.

Google summarizes a description of TLS encryption and its problems as: "When an email is encrypted in transit with a security protocol called transport-layer security (TLS), it is harder for others to read what you're sending. A growing number of email providers are working to encrypt email messages in transit. The data here shows the current state of email encryption in transit. Many email providers don't encrypt messages while they're in transit. When you send or receive emails with one of these providers, your messages are as open to snoopers as a postcard in the mail. A growing number of email providers are working to change that by encrypting messages sent to and from their services using Transport Layer Security (TLS). Generally speaking, the use of encryption in transit continues to increase over time as more providers enable and maintain their support. Factors such as varying volumes of email may explain other fluctuations in these encryption statistics." See https://transparencyreport.google.com/safer-, email/overview?hl=en (Mar. 6, 2019)

How encryption works:

If you mail a letter to your friend, you're hoping that she'll be the only person who reads it. But a lot could happen to that letter on its way from you to her, and there may be prying eyes who try to read it. That's why we send important messages in sealed envelopes rather than on the back of postcards. Sending and receiving email works in a similar way. But when you send or receive messages with an email provider who doesn't transmit messages via a secure connection, your emails could be open to snooping.

Transport Layer Security (TLS)

Encryption with Transport Layer Security keeps prying eyes away from your messages while they're in transit. TLS is a protocol that encrypts and delivers mail securely for both inbound and outbound mail traffic. It helps prevent eavesdropping between mail servers—keeping your messages private while they're moving between email providers. TLS is being adopted as the standard for secure email.

Encryption depends on everyone:

Your messages are encrypted only if you and the people with whom you exchange email both use email providers that support Transport Layer Security. Not every email provider uses TLS, and if you send or receive messages from a provider that doesn't, your message could be read by eavesdroppers. While TLS isn't a perfect solution, if everyone uses it, snooping on email will be more difficult and costly than it is today.

Microsoft and Google track aggregate statistics for all inbound and outbound message traffic on their hosted email offerings (i.e. Microsoft Office 365, Google Gmail, and Google G-Suite). Google reported that 92% of the inbound and outbound traffic it handled during Dec. 6, 2019, to Mar. 6, 2019, was encrypted. Further, Microsoft and Google provide the ability to track the encryption of inbound and outbound messages in aggregate per domain.

Today, as technologies advance and cybersecurity threats become more sophisticated, hackers are paying attention to details.

Here, we will try to (in a simple manner) decipher a commonly referred catch all for security, TLS, and explain why the details are important. "Not all TLS is created equal. Not all email one thinks is going by TLS, in fact, is transmitted securely," remarks Steve Anderson, an insurance technology expert & LinkedIn influencer with more than 330 thousand followers.

First, what is TLS? TLS stands for transport layer security. This is a means, in short, of encrypting communications between two participating devices. This is mainly used when you communicate from your web browser to a web server. It's simple for the browser to display "insecure" connections, pop-up warnings, or disable a page display.

But, with email, there are more challenges. For example, if you log into Gmail via your Chrome browser, the connection from your device to the Google email server is secured this way. But what about the email after you hit send when it leaves Google's Gmail server onward to the recipient? This is where "Opportunistic TLS" may or may not be used. It is used with many major email providers (Microsoft Hosted Exchange Office 365, Gmail, etc.) by default.

Let's first remind ourselves of the most important part of email for MOST users—that it gets to the intended recipient. Traditionally, whether it is seen "only" by that recipient has been an afterthought.

Enter Opportunistic TLS. Here, the sending server, Gmail in this example, tries to send first with a secure TLS email transmission (SMTP) if the "opportunity" presents itself, and second, if it cannot send securely, it reverts to less secure or insecure transmission, automatic, and invisibly.

Sounds pretty good; everyone receiving email surely has the same mindset and will accept email from Gmail through a secure connection, right? Wrong.

According to the Gmail transparency report, continuously updated as of today, 88 to 91% of inbound and outbound email to and from Gmail are sent using TLS. This means, typically, more than 10% is sent and received without any security. So, 1 in 10 messages you may send or receive via Gmail simply go out without any security. This is likely similar to Office 365 hosted email.

You might think, well, 1 in 10 insecure isn't bad. However, consider it could be far worse. According to the above report, for many recipient email domains, like Charter.net in the USA, Bigpond in Australia, Videotron via Bell in Canada; emails to and from these domains to Gmail are never encrypted (0%) and with companies like Amazon, 57% are secured. What about the gazillion smaller companies out there? Do they have better security than Amazon? (Data reported by Google in its Transparency report as of December 2018)

Here is a fallacy. None of these transparency reports make the distinction of which of the many TLS connections are considered insecure TLS. Generally, there are versions with varying security; TLS 1.0, TLS 1.1, TLS 1.2, and now TLS 1.3.

Focusing on TLS 1.0, there are known risks. In particular, a TLS downgrade attack. In short, a hacker can intercept the TLS 1.0 check preceding the server-to-server communication to trick the sending server into sending the message in an insecure manner. Security professionals have been trying to get IT administrators to upgrade from TLS 1.0 for more than a decade, but the use of this still persists en masse, and typically accounts for more than 15% of all TLS email connections. So, maybe you are at 10% sent insecure (no TLS) plus 15% sent with a version of TLS with known security issues. Now you have an issue with 25% of your email (1 in 4 emails), at the very least. If you communicate with customers in smaller companies individuals, the percentage is likely higher. The problem is, what to do?

Microsoft states in a 2018 blog post, while they will no longer support TLS 1.0, "this does not mean Office 365 will block TLS 1.0 and 1.1 connections. There is no official date for disabling or removing TLS 1.0 and 1.1 in the TLS service for customer [email] connections." And, remember, TLS 1.0 is known as not compliant in some circles (i.e. PCI financial compliance standard). What about HIPAA? PII? NPI? GDPR privacy compliance? If there are known vulnerabilities with TLS 1.0, one would believe they may not be considered a "privacy compliant" means of transmission. Time will tell.

The bottom line is that Microsoft Office 365, G-suite, and other "Opportunistic TLS" systems likely send at least 25% of email with no security or in an insecure, less than a (privacy) compliant manner. There is no easy fix for these systems, as their option (as Microsoft points out as not desirable) would be to not deliver the email at all, which would cause chaos for senders and receivers. It appears, from their blog post, they prefer to deliver insecure rather than not at all.

What to do: Opportunistic TLS with Auto-Fallback

What has been needed is an Add on to Gmail, Office 365, Zimbra, or any email, a simple to use service that, if no TLS is available or an insecure version of TLS is in place, the communication automatically reverts to an alternative method of email transmission encryption; dynamically and without bothering or burdening sender or receiver.

Figure 3:
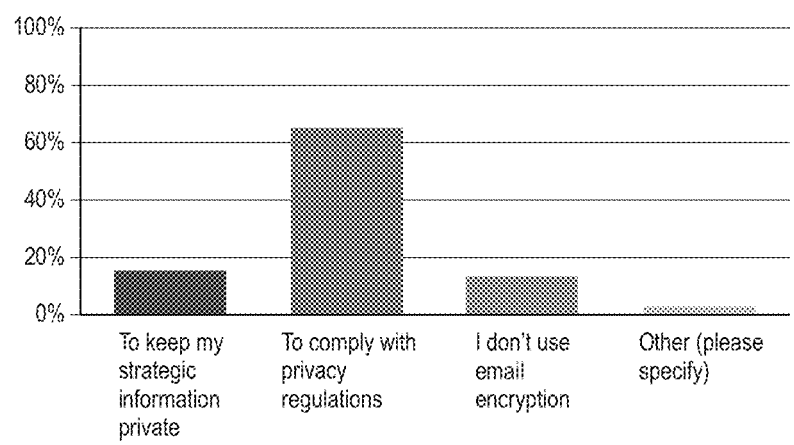
FIG. 3 is a graphical representation of results of a survey question asking why a customer uses email encryption.

The importance of third-party verifiable evidence protects the sender organization, in particular, if the recipient claims a data breach occurred. As shown in FIG. 3 a 2017-2018 RPost survey conducted by Khan with an audience of RPost service subscribers, the majority of users were using email encryption for privacy compliance reasons.

Figure 4:
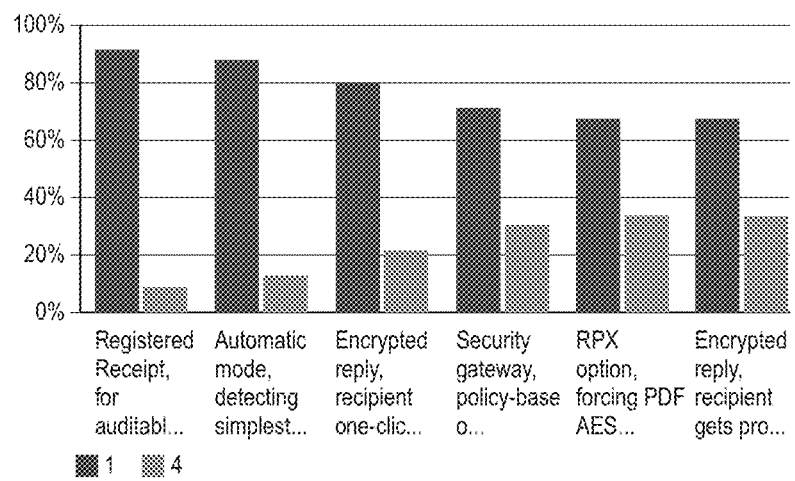
FIG. 4 is a graphical representation of results of a survey asking a customer to rank the importance of features in an email encryption service.

One of the most important features, according to survey respondents, as illustrated by the graph shown in FIG. 4, is a receipt that provides proof of delivery and privacy compliance. The RPost system receipt provides a receipt with proof of delivery. The RPost system receipt also indicates a message has been opted to have been sent with a particular encryption service. The RPost system receipt includes a portion of the server transmission history associated with the particular transmission.

If the sender organization generates meaningful worldwide revenue, and the regulator provides "whistleblower" rewards as a percentage of fines for data breaches, the sender must retain easy-to-demonstrate third party evidence that any claim of a breach must have occurred after the message was received securely at the recipient's system (or after they forwarded it on). It is preferable to have a record on a message by message basis that can authenticate that content was successfully delivered encrypted, and that can provide proof to mitigate the risk of accusations of a data breach. This may minimize the sending organization from being targeted.

For purposes of explanation, specific nomenclature is set forth to provide a thorough understanding of the present disclosure. Description of specific applications and methods are provided only as examples. Various modifications to the embodiments will be readily apparent to those skilled in the art, and the general principles defined herein may be applied to other embodiments and applications without departing from the spirit and scope of the disclosure. Thus the present disclosure is not intended to be limited to the embodiments shown but is to be accorded the widest scope consistent with the principles and steps disclosed herein.

In the following description, numerous specific details are set forth in order to provide a thorough understanding of the present disclosure. It will be apparent, however, to one of ordinary skill in the art that the present disclosure may be practiced without these specific details. In other instances, well-known components or methods have not been described in detail but rather in a block diagram, or a schematic, in order to avoid unnecessarily obscuring the present disclosure. Further specific numeric references such as "first driver" may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Throughout the description, reference will be made to various software programs and hardware components that provide and carry out the features and functions of the various embodiments of the present disclosure. Software programs may be embedded into a machine-readable medium. A machine-readable medium includes any mechanism that provides, stores or transmits information in a form readable by a machine, such as, a computer, server, or other such device. For example, a machine-readable medium includes read-only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise, as apparent from the above discussions, it is appreciated that throughout the description, discussions utilizing terms such as "processing", "computing", "calculating", "determining", or "displaying" or the like, do not refer to the action and processes of a general-purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the disclosure.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules, and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

FIG. 1 illustrates an exemplary computer system 10 which may be used with some embodiments of the present invention, which may be, for example, a server or a client computer system. Computer system 10 may take any suitable form, including but not limited to an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 10 may be a combination of multiple forms. Computer system 500 may include one or more computer systems 10, be unitary or distributed spanning multiple locations, spanning multiple systems, or residing in a cloud (which may include one or more cloud components in one or more networks).

In one embodiment, computer system 10 may include one or more processors 11, memory 12, storage 13, an input/output (I/O) interface 14, a communication interface 15, and a bus 16. Although this disclosure describes and illustrates a particular computer system having a particular number of particular components in a particular arrangement, this disclosure contemplates other forms of computer systems having any suitable number of components in any suitable arrangement.

In one embodiment, processor 11 includes hardware for executing instructions, such as those making up software. Herein, reference to software may encompass one or more applications, byte code, one or more computer programs, one or more executable modules or API, one or more instructions, logic, machine code, one or more scripts, or source code, and or the like, where appropriate. As an example and not by way of limitation, to execute instructions, processor 11 may retrieve the instructions from an internal register, an internal cache, memory 12 or storage 13; decode and execute them; and then write one or more results to an internal register, an internal cache, memory 12, or storage 13. In one embodiment, processor 11 may include one or more internal caches for data, instructions, or addresses. Memory 13 may be random access memory (RAM), static RAM, dynamic RAM, or any other suitable memory. Storage 15 may be a hard drive, a floppy disk drive, flash memory, an optical disk, magnetic tape, or any other form of storage device that can store data (including instructions for execution by a processor).

In one embodiment, storage 13 may be mass storage for data or instructions which may include, but not limited to, a Hard Disk Drive (HDD), Solid-State Drive (SSD), disk drive, flash memory, an optical disc (such as a DVD, CD, Blu-ray, and the like), magneto-optical disc, magnetic tape, or any other hardware device which stores computer-readable media, data and/or combinations thereof. Storage 13 maybe be internal or external to computer system 10.

In one embodiment, input/output (I/O) interface 304 includes hardware, software, or both for providing one or more interfaces for communication between computer system 10 and one or more I/O devices. Computer system 10 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpads, biometric input device or sensor, or the like.

In still another embodiment, a communication interface 15 includes hardware, software, or both providing one or more interfaces for communication between one or more computer systems or one or more networks. Communication interface 15 may include a network interface controller (NIC) or a network adapter for communicating with an Ethernet or other wired-based network or a wireless NIC or wireless adapter for communications with a wireless network, such as a Wi-Fi network. In one embodiment, bus 16 includes any hardware, software, or both, coupling components of a computer system 10 to each other.

Figure 2:
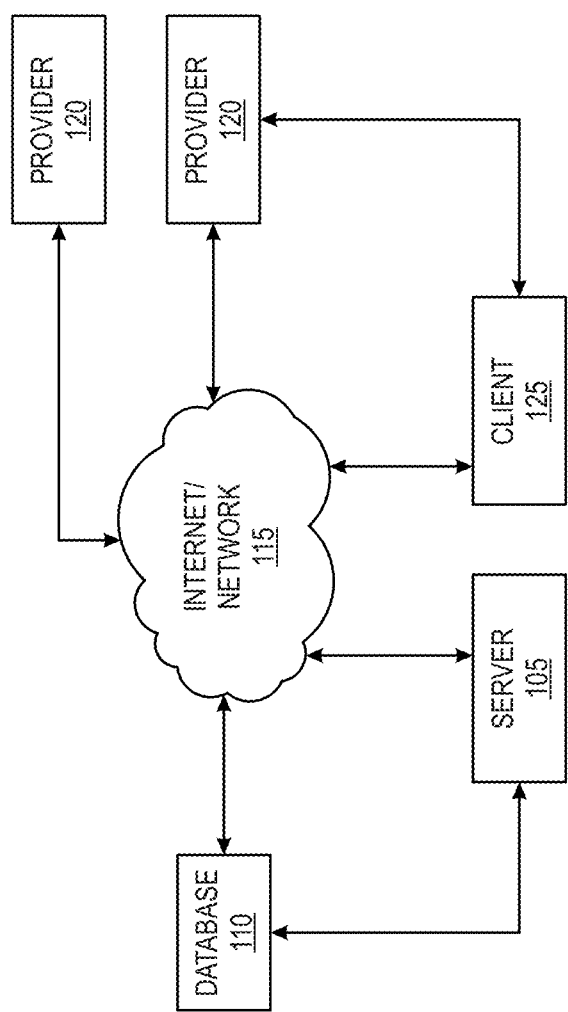
FIG. 2 is a schematic diagram of a network used in accordance with the various embodiments of the disclosure.

FIG. 2 is a graphical representation of an exemplary network 100 that may be used to facilitate the various embodiments of the present invention. Server 105 is operated by a services organization, and typically includes at least one processor, input and output equipment or devices, memory, storage, and a communication interface, as discussed above with regards to FIG. 1. The server also operates under the control of specialized software programming commands that are designed to carry out the various processes described above. It should be understood that while the exemplary network 100 is described in terms of a server operated by a services organization, the server could be operated by a third party hired by the services organization or under the control of the services organization. The server could also be operated by a third party independent of the services organization, which then provides information and/or data to the services organization from which the services organization may provide services to a client of the services organization.

A data storage device 110, which may be separate from the server, but not necessarily, may be accessible to the server 105, and may be used for storing data related to information and any other data related to operation of the various embodiments of the system and method described above. The data storage device 110 may be directly connected to the server, or it may be accessible to the server through a network or the Internet 115. The data storage device may also be a virtual storage device or memory located in the Cloud. Also connected through the network or the Internet 115 are one or more providers 120 or a client 125.

From the above, while it may be apparent that the various embodiments disclosed herein may be implemented by computers, servers, or other processors that appear to be organized in a conventional distributed processing system architecture, the various embodiments disclosed herein are not conventional because they bridge multiple remote information sources, such as legacy computer applications, legacy storage media and data resident on workstation storage, media, and also involve sophisticated analysis of various parts of an email message, as well as the methods, protocols, and communication pathways used to transmit and receive the email message. When the various embodiments of this disclosure are operated using computers, servers, and processors, those embodiments transform those computers, servers, and processors into specially programmed computers, servers, and processors in a way that improves not only the operation of the various hardware and software components of the system, but also significantly improve the transmission, receipt, and processing of email messages.

For the purposes of the invention, there are technologies known by those skilled in the art, and the methods of implementing the invention will use technology components commonly used by those skilled in the art, and this description of the invention, therefore, does not describe these component technologies. These include the use of:

1. Sender mail client
2. Sender mail server
3. Sender mail gateway
4. Email content filtering
5. Secure messaging service servers
6. Secure transmission protocols
7. Email encryption methods and protocols
8. Database logging and association
9. RPost Registered Email service technology (patented)
10. RPost Registered Receipt authentication service technology (patented)
11. Hashing, Digital Signature, and Block Chain technologies
12. RPost SideNote service technology (patented)
13. Recipient mail gateways
14. Recipient mail servers
15. Recipient mail clients such as Microsoft Outlook or Gmail
16. Parts of a message
    a. Message headers
    b. Message content
17. Message transmission protocols, including secure message transmission protocols
18. Data reports provided by email
19. Web views of data reports
20. Encryption and authentication processes and protocols
21. Replies to received electronic messages
22. Use of software tools to extract content and create images of the content
23. Use of tools to create content that may be associated with HTML links, and self-extracting HTML links inserted into an email
24. Associating information in databases
25. Operating software on web and email servers The term "email" used herein may refer to any electronic message type; the term "email protocol" may refer to any electronic data exchange protocol, and the term "electronic file" may refer to any file type.

The various embodiments described herein may be implemented as a whole or only in select parts. For the purpose of this disclosure, consider implementing for each part, in one embodiment, of which there are others that a skilled practitioner would identify as within the spirit of the invention.

A. Registered Encryption

REGISTERED ENCRYPTION is a trademark of RPOST Communications Limited. Track and Prove Encrypted Message Delivery: Delivery of encrypted message with visibility and auditable proof of fact of secure delivery to the intended recipients. This builds upon the inventions described in the Tomkow U.S. Pat. No. 7,966,372 patent, which is incorporated herein in its entirety.

The Registered Encryption system tracks and provides reports related to delivery of an encrypted message from the sender of the message to the ultimate recipient of the message through some or all of the servers and network pathways in which it travels. Such a report provides a listing of the encrypted message pathways with visibility and auditable proof of fact of secure delivery from the sender through the network to each intended recipient.

Tracking is done in two ways:

1. Recording secure inbound transmission of the message from the sender to an intermediary server and/or cloud processing service, such as, for example, and not limited to, a "RPost" server or a "RMail Cloud" using the 'Received' message header analysis and other 'Received' message format information such as message-level encryption validation as will be described in detail below; and/or 2. Recording secure outbound transmission of the message from the intermediary server or cloud processing service to each recipient.

These processes provide a means of associating the encryption validation tracking to the original message content and timestamps for sending and delivery such that the tracking record is proof that a specific message content was sent and received with or without end-to-end encryption for each intended recipient of the original sent message as well as levels or types of encryption.

Recording Secure Inbound Transmission of the Message to RPost from Sender

1. Using Received Message Header Analysis at Receiving System

An embodiment of the disclosed system includes review of received message headers. In the various embodiments set forth herein, "RPost" refers to an intermediate server or a cloud server or service, such as, for example, the RMail Cloud that a message from a sender is directed to on route to the recipient and the intermediate server that relays the sender's message to the recipient.

In one embodiment, the RPost system records whether or not a message arrived at one of RPost servers via TLS by recording information in the header of the message received. Since that header is in the received message, in effect, systems receiving an email already get information about whether the last transmission to the receiving server was conducted via TLS or not; if the receiving server or an individual with expertise were to examine each header at the recipient. In this embodiment, the RPost intermediate server system extracts the data that indicates the message was received by TLS from the message header in the message received from the sender at the RPost intermediate server, and parts of this message header are put in a database for later adding to a receipt record or report.

If the message that arrives at the RPost server travels through multiple servers before it arrives at the RPost server, even if the last hop (or server) to RPost was TLS, it may have been passed through non-TLS servers along the way. The whole history, including indications of whether each hop was TLS, may also be part of the message header when the message is received at the RPost intermediate server, but without this invention, there is no standard way of recording that the connection from the sender to the intermediate server was a TLS connection.

In one embodiment, since the information in the received message header may be written in different formats depending on each sending or relay MTA server, a list of all known MTA servers could be built, and if the system is not able to detect the TLS information due to placement in the header in an unknown format, the system does not record the TLS secure connection for that server. The system includes a process of, when there is an unknown header format, putting that message into an investigation queue for review and learning, or for machine learning analysis of that new message header type, to then add that type of secure connection protocol element to the list of known ones, to dynamically build and update the list.

Often, indeed typically, a message won't be sent TLS when it is being passed from an internal mail server to a perimeter gateway server—because TLS is slower to transmit than without TLS. That is not necessarily insecure, but to tell if that is what is going on, one needs some way of telling that a particular transfer was internal. That can usually be figured out, but it isn't always easy or foolproof. Information about the last known server and the sequence of servers, and the transmission protocols from the variety of servers that can be identified from the header can be analyzed with rules updated dynamically based on learnings.

In an embodiment, the system would, at least, record the last hop—from the sender's gateway to RPost, having been received at the RPost intermediate server via TLS (or via another secure protocol). This may entail recording the sending gateway server's name and IP address of the last hop to RPost. If an encryption option has been indicated in the received message header, the RPost system may record whether the message was received Encrypted (and by which method, TLS, TLS version, or PKI, for example). All the audit info required to determine if a message was received by RPost by way of TLS may be available given a human analysis but doing a meaningful automated real-time analysis may be very difficult and may require specialized and unconventional systems. Further, determining if the message was received securely via another method (such as, for example, PKI) but delivered without TLS would be part of the analysis.

EXAMPLE

The following text being the elements of the email header on the received inbound message from the sender at the RPost intermediate server that would be parsed and copied into the database at RPost.
Received: from abc.domain.com ([1.1.1.1])
   by abc.domain.com (8.14.4/8.13.8) with ESMTP id x8XYZfLgH003867
   (version=TLSv1/SSLv3 cipher=DRE-RSA-AES256-SHA bits=256 verify=NOT)
   for <user-xyz@ abc.domain.com>; Mon, 19 Aug. 2013 10:41:21-0400
Received: from abc.domain.com (localhost.localdomain [123.7.0.1])
   by abc.domain.com (8.14.4/8.13.8) with ESMTP id x8XYZKOZ030182
   for <user-xyz@abc.domain.com>; Mon, 19 Aug. 2013 09:41:20-0500
Received: (from mail@localhost)
   by abc.domain.com (8.14.4/8.13.8/Submit) id r7JEfKXD030178
   for user-xyz@def.domain.com; Mon, 19 Aug. 2013 09:41:20-0500

On the email received inbound from the sender at the RPost server, there will be a series of header entries in the order of the hops. (i.e. each entry will record the journey of the message from a sender to exchange server to gateway server to perimeter server service to RPost intermediate server and each may or may not have a TLS secure level of transmission and may have different TLS security protocol levels (i.e. TLS 1.0, 1.1, 1.2, 1.3). The RPost server stores the header and runs a program on it to parse it to retrieve information including at least one or more of the "Last Received From, Server Name, Secure by TSL (protocol level) from the previous hops, with the analysis moot (overridden) if received message-level encrypted (i.e. PKI encrypted from sender to RPost). Sender organizations can opt for level of view (last hop, all hops) with security determination on last-hop only or all hops.

Since the parsing of the email headers on messages received inbound from sender at the RPost server may be processor intensive, this parsing may be done after the message moves onward in the process to the recipient.

The parsed/copied content from the headers are placed in a database and categorized based on a hierarchy of what is important for sender security (i.e. Best, Acceptable, Fail).

The message is transmitted to the recipient according to the sender's secure transmission preferences.

If the message is processed for message level security, the fact of re-encrypting the message at the RPost server is recorded, associated with the message ID and method of re-encryption, timestamps, etc.

If the message is processed for secure transmission (i.e. TLS), after transmission, the SMTP/ESMTP or message transport protocol information if another protocol (i.e. HTTP) is recorded and parsed for the portions that determine the fact of secure transmission from RPost to the recipient and details about the secure transmission protocol successfully used in the transmission (i.e., TLS1.2). This parsing of the protocol information occurs after transmission of the message to the recipient in this embodiment due to the extra processing required to parse the header and other transmission data after transmission.

This protocol information is stored in a database associated with the message ID and received security transmission information.

The parsed/copied message sending protocol parts placed in a database are categorized based on a hierarchy of what is important for sender security (i.e., Best, Acceptable, Fail). For example, "Best" could mean TLS 1.2 or message-level encryption (i.e., PKI). "Acceptable" could be set by the sender organization, for example, to mean TLS 1.1. "Fail" could be set by the sender organization, for example, to mean TLS 1.0 or no TLS.

The (received from sender) and (sent to recipient) categorizations are matched, with a chart to display made available to the sender and/or sender organization with the result (interpretation) and the protocol/method data, along with a sum of the security level which may be set to be the higher of the sum of the (received from sender) and (sent to recipient) levels.

Example 1. If:
(received from sender)=Best
(sent to recipient)=Acceptable
Result=Acceptable
Example 2. If:
(received from sender)=Best
(sent to recipient)=Fail
Result=Fail
Example 3. If:
(received from sender)=Acceptable
(sent to recipient)=Acceptable
Result=Acceptable Consider the above example of the database record for an email sent from Bob@company.com to Sue@network.com and Jim@home.com. This could be stored in the database additional fields for message ID, hash of the sent message, additional sender hops extracted from headers, and the level of secure transmission at each recorded additional hop. For the example from, Bob to Jim, receiving the message at the RPost server via RPost server public key PKI applied by RPost sender app was detected therefore the system knows the message was sent secure from the sender Bob mail client (vs. the sender domain or server IP address) to RPost en route to Jim and would record fact of processing to decrypt via PKI at the RPost server after having received the PKI message transmission at the RPost server.

| SENDER TO RPOST | | | | |
| --- | --- | --- | --- | --- |
| Origin Sender | End Recipient | Sent Secure Identifier, Last Hop | Received Secure Identifier | Time Accepted |
| Bob@company.com | Sue@network.com | FQDN Domain, IP | TLS1.2@Server 1 | 10:01:10 UTC |
| Bob@company.com | Jim@home.com | Sender + FQDN + IP | RPPKI + TLS1.0@Server 3 | 10:02:15 UTC |

If the message itself is received by an HTTP protocol (via REST, SOAP, or another API protocol), at the receiving RPost Message Gateway Server, identify received by HTTP protocol and the version of the HTTP protocol used. Record in the database logically associated with the message which RPost Message Gateway Server accepted the message and record logically associated with the server information what the HTTP level of transmission was used.

If the message itself is received by an HTTP protocol (via web server or another web transfer or messaging protocol), at the receiving RPost Message Gateway Server, identify received by HTTP protocol and the version of the HTTP protocol used. Record in the database logically associated with the message which RPost Message Gateway Server accepted the message and record logically associated with the server information what the HTTP level of transmission was used.

For all of the above, include message ID, timestamp of receipt at the RPost server, and at least a portion of the message transport protocol dialog that indicates secure transmission or a portion of the server configuration metadata that confirms the server only accepts inbound message received using a certain secure transmission protocol or fact of RPost server decrypting a received PKI encrypted message at the RPost server ("Secure Transmission Forensics"); record in a database logically associated, hashed together, and/or hashed separately.

Record the Secure Transmission Forensics and optionally record in a database with a hash of the message content received.

a. Raw Server Method
Registered Encryption "Inconclusive" Status:
In some cases, an inbound SMTP transmission received at the intermediate server may not have message-level encryption detected or HTTPS transmission detected in a message from the sender to the RMail Cloud. In such a case, the system will look at the message headers of the inbound message.

There are several scenarios:
i. Last Major Hops.
If there is a mail relay or secure email gateway server that is relaying messages to the intermediate server or RMail Cloud, the Registered Encryption system may be configured to look at the prior Internet hop or hops from the message header prior to the relaying secure email gateway server in addition to verifying the security of the connection from the secure email gateway server to the RMail Cloud.

In one exemplary embodiment, a gateway server or servers may considered as the perimeter of the RMail Cloud system for traffic transmitted from the email sender via an RMail Gateway service. In this scenario, the prior Internet hop is evaluated as the last hop prior to transmitting the message to the RMail Gateway servers. In one embodiment, an analysis can be performed to determine the secure connection from a sender mail client or browser into a sender mail service to the sender mail service server, to the RMail Cloud; or to the RMail Cloud via other email gateway servers. Those senders that need such assurance can opt to use an application, such as for example, the RMail for Outlook add-in with local encryption, which establishes that the message was encrypted from the sender mail client (Outlook) and device to the RMail Cloud via Message Level Encryption (Best+).

ii. Prior Internet Hop
As described above, the prior internet hop (to the RMail Gateway or RMail Cloud, in this section together referred to as "RMail Cloud") is recorded in the Registered Encryption receipt.

Prior Hop with Published TLS Entry
In an embodiment, the first attempt by the system to determine the encryption level from this Prior Internet Hop to the RMail Cloud may be made by using the sender server (prior Internet hop server) published TLS entry which is contained in the received email header. Those of ordinary skill in the art understand that mail servers either (1) do not report TLS in the headers in their normal course of operation or (2) always indicate if TLS was used in the transmission.

The following is an example of a mail server reporting a published TLS entry in the received email headers:
Received: from MBX091-W7-CO-4.exch091.serverpod.net (10.226.17.206) by MBX091-W7-CO-1.exch091.serverpod.net (10.226.17.200) with Microsoft SMTP Server (version=TLS1_2, cipher=TLS_ECDHE_RSA_WITH_AES_256_CBC_SHA384_P521) id 15.1.2375.18; Mon, 14 Feb. 2022 11:05:01-0800

The following is an example of a server not reporting a published TLS entry in the received email headers:

Received: from mail-il1-f173.google.com (mail-il1-f173.google.com [209.85.166.173]) by server91.r1.hugopost.io (Postfix) with ESMTPS id E1E7310825E4 for <dr@gmail.com>; Thu, 10 Feb. 2022 22:19:15+0000 (UTC)

Received: by mail-il1-f173.google.com with SMTP id e11so4614490ils.3 for <dr@gmail.com>; Thu, 10 Feb. 2022 14:19:15-0800 (PST)

If a server that normally reports TLS information in the headers and later is not reporting, then either (1) the message was received without TLS, or (2) the sending server was misconfigured and in that instance for that message did not report TLS information even though it was received with TLS.

Therefore, one or ordinary skill in the art can easily understand that lack of TLS information in the headers of a message is not definitive proof that the message was not received via an encrypted transmission.

FIG. 51 illustrates an encryption report that shows no transmission security details for a message received from a sender. In this case, the analysis based on the message header was incorrect because the Google server, through which the message passed on the way to the RMail Cloud, did not publish a TLS entry in the received email headers. Accordingly, the Sender to RMail Cloud encryption status, if the received headers are used for the indication of TLS transmission, should be inconclusive rather than simply absent. Thus, this example illustrates why one cannot rely on no TLS entry in the received email headers as meaning that no encryption has been used to secure the message.

As shown below, the actual raw server log for the above-mentioned transmission from the Sender to RMail Cloud shows that, in fact, a TLS transmission of the message has occurred. This is evidence that the above header analysis should have reported "inconclusive" rather than Fail (no encryption) until at least the raw logs could be reviewed.

Feb 10 22:19:15 server91 postfix/smtpd[14317]: connect from mail-il1-f173.google.com[209.85.166.173]

Feb 10 22:19:15 server91 postfix/smtpd[14317]: Anonymous TLS connection established from mail-il1-f173.google.com[209.85.166.173]: TLSv1.2 with cipher ECDHE-RSA-AES128-GCM-SHA256 (128/128 bits)

Feb 10 22:19:15 server91 postfix/smtpd[14317]: E1E7310825E4: client=mail-il1-f173.google.com [209.85.166.173]

Feb 10 22:19:16 server91 postfix/smtpd[14317]: disconnect from mail-il1-f173.google.com[209.85.166.173]

Therefore, to conclusively determine whether TLS was used in the last hop transmission when it is not reported in the received header, in an embodiment, the intermediate server (RMail Cloud) reviews the receiving email server's raw logs when the message header analysis is inconclusive.

Challenges with Review of Raw Mail Logs:

The inventor has identified several challenges that exist with raw mail logs. For example, the raw mail logs may not contain information on each message received in a format that can be easily associated with a particular message transmission. While the raw mail log does contain the connection and TLS data (if TLS was used in the connection) associated with each connection to the mail server, the logs are often not in a particular logical order when many messages are received within the same seconds as log elements can be co-mingled among different messages.

Another challenge is that maintaining a learning or repository of server names (server domain or IP address) may provide some assurances if it is recorded that the servers transmitting from that domain are sending via TLS, and will continue to send via TLS if they are, large senders frequently change server ID, and there is no assurance that some of the servers may be properly configured on some days (sending via TLS) and on another day, misconfigured (not sending via TLS). In such a case, while the evidence of sending by TLS is in the log and any assumption of continued transmission by a server via TLS may seem reasonable, it is not dispositive evidence of encrypted transmission of a particular message.

Another challenge is that the times noted for a message received in the received message header will not exactly match the raw server log times as the raw server log times are based on the receiving server time clock (the RMail Cloud server) and the received message header times are based on the sending server time clock. In this case, using a time associator of a message received based on the header information and the raw log is not a certain match.

Another challenge is that system servers, such as, for example, a RMail Cloud server, may have multiple intake servers, so any attempt to match the received header data of a particular message to a raw server log would need to be performed across multiple servers to find the actual raw server transmission log.

A still another challenge exists in that system servers such as, for example, an RMail Cloud servers that manages email intake, often operate at high volume and have streamlined software to manage the core purpose of those servers, such as, for example, admitting legitimate email traffic and rejecting malicious traffic. Performing real-time raw log analysis on these servers may be resource-intensive or otherwise problematic.

As set forth above, the potential to have an inconclusive encrypted transmission analysis due to sending servers not including the TLS information in the received message header dictates the need to either:

(a) conduct a secondary raw mail server received log analysis when the received message header analysis is inconclusive;

(b) always conduct the raw mail server received log analysis in addition to the received message header analysis; or instead, (c) only rely on the raw mail server received log analysis.

In one embodiment, as set forth in (c) above, upon receiving the email from the sender at the RMail Cloud, a system may be configured using programming commands that, at the RMail Cloud intake gateway servers, exports the raw received server connection logs from each server receiving messages from the sender at selected time intervals to a database on another server.

The system then parses the raw received server connection logs and organizes the extracted data in a database structure that includes at least fields/columns for storing the following information 1) Timestamp, 2) Sending server address domain, 3) Sending server IP address, 4) TLS indicator, 5) From address 6) To address, 7) Message ID for each timestamped transmission connection record, in addition to the timestamped transmission connection record line. ("Logs"). For example:

Database record: Feb 10 22:19:15
Sending Server domain address: mail-il1-f173.google.com
Sending server IP address: 209.85.166.173

TLS Indicator: TLSv1.2 with cipher ECDHE-RSA-AES128-GCM-SHA256 (128/128 bits)
From address:
To address:
Message ID:
Record Text: Feb 10 22:19:15 server91 postfix/smtpd [14317]: Anonymous TLS connection established from mail-il1-f173.google.com[209.85.166.173]: TLSv1.2 with cipher ECDHE-RSA-AES128-GCM-SHA256 (128/128 bits)

Database record: Feb 10 22:19:16
Sending Server domain address: mail-il1-f173.google.com
Sending server IP address: 209.85.166.173
TLS Indicator:
From address:
To address:
Message ID:
Record Text: Feb 10 22:19:16 server91 postfix/smtpd [14317]: disconnect from mail-il1-f173.google.com [209.85.166.173]

It should be noted that, in the example set forth above, that some fields may not have values some database timestamped records.

After the system parses the raw received server connection logs and organizes them into the database structure, the system parses the received message headers and organizes them in a database structure that includes at least fields for timestamp, sending server address domain, sending server IP address, TLS indicator (if available), from address, to address, message ID for each received message from sender to the RMail Cloud ("Headers"). An example of such a database record follows:

Database record: 10 Feb. 2022 22:19:15
Sending Server domain address: mail-il1-f173.google.com
Sending server IP address: 209.85.166.173
TLS Indicator:
From address: dr@gmail.com
To address: dr@gmail.com
Message ID:
Record Text: Received: from mail-il1-f173.google.com (mail-il1-f173.google.com [209.85.166.173]) by server91.r1.hugopost.io (Postfix) with ESMTPS id E1E7310825E4 for <dr@gmail com>; Thu, 10 Feb. 2022 22:19:15+0000 (UTC) Received: by mail-il1-f173.google.com with SMTP id el1so4614490ils.3 for <dr@gmail.com>; Thu, 10 Feb. 2022 14:19:15-0800 (PST) [excerpt].

The system at the RMail Cloud server then converts the received message header timestamp format (sender server time clock format) into a format comparable to the received raw server log format (receiving server time clock format) and then develops a time band, such as, for example, +/−10 seconds of the received header timestamp, around the received header timestamp to account for many message records being created at the RMail Cloud intake server in the same second and differences between header times (from sender server time clock) and server times (from receiving server time clock).

The system will then search in the database of the Logs for the records that fall within the received Header timestamp range, and for those identified records, searches for a secondary criteria, starting with sending server domain address from the received Header to match within the selected time-band in the Logs, with a database record that includes the TLS indicator database field as not null. (If there is no match, then a third criterion in the received Header is used, and then the fourth, and so on.) If there is a match, then the analysis proceeds; if the TLS indicator database field is not null, the system then extracts that database record and logically associates it with the Registered Encryption report, and further parses the TLS indicator for the level of TLS using the same mapping process as described herein in the received header analysis, to identify the level of TLS encryption.

The system then retains (stores) the database excerpt record from the Logs in the Registered Encryption report, which then may be cryptographically associated with the original content transmitted in a database and may be additionally included in the Registered Encryption receipt so that it may serve as the underlying evidence of encrypted transmission of the particular message at a time in the future. If email addresses are detected in the excerpt record, the system may also replace the address prefix with XXXX to mask any personal data. In an embodiment, the system may periodically discard the Logs full record after completion of relevant analyses associated with the messages within the timeframe of the Log records.

In another embodiment, it may be beneficial to conduct a secondary raw mail server received log analysis when the received message header analysis is inconclusive, as described above in (a). In this embodiment, a system is programmed using software commands and running or associated with the RMail Cloud server (intermediate server) may perform the analysis by conducting the received header analysis for the TLS information, and, if the TLS information is not present in the received header, then indicate the analysis is "inconclusive" in terms of determining the level of encryption (or non-encryption) from sender to the RMail Cloud, and only then conduct the raw received server TLS analysis. If such analysis cannot be accomplished before the Registered Encryption report is generated, then the system records "inconclusive" in the report for that transmission from sender to RMail Cloud and transmits a secondary "Updated" Registered Encryption report when the raw server analysis is completed, with the update to the "inconclusive" encryption status being either "Fail" if no encryption is determined from the log, or reporting the appropriate level of encryption for that leg of the transmission otherwise.

In another embodiment, the system may include programming using software commands to analyze the headers of the message where the message has passed through servers that do not publish TLS information in the Received Message Header. In such an embodiment, when no TLS being found is reported in the received message header as a "Non-Reporting Server", the system captures the Non-Reporting Server ID/Domain, then analyzes the Non-Reporting Server TLS Status Database for a match of the Non-Reporting Server ID/Domain, and if a match is found, determines if the last verified date is within a parameter of recency that satisfies the requirement, that is, for example, that the TLS has not been verified within last 7 days and if so, reports in the Registered Encryption analysis as follows, and if not, reports "Inconclusive" as will be described further below.

If the verified date is within the parameter of recency, the system places the level of the encryption in the encryption status data field as the level of the TLS recently verified and adds a "*" after the TLS level to denote that TLS was verified based on common operations from that server versus based on the specific server transmission connection associated with that email transmission and optionally, or instead of, the "*" may include the date the sending server TLS operations were last verified. The system may then report the encryption status for that leg of the transmission and overall end-to-end encryption status as per the TLS level recorded in the Non-Reporting Server TLS Status Database.

If no match with a record in the Non-Reporting Server TLS Status Database is found, or no match with the recency required (meaning the sender server has not been adequately identified as using TLS with the raw received server log within the desired recency), then, the system places the level of the encryption status data field blank, and indicates as "Inconclusive" in grey, reports the Overall End to End 5-star scale status for that transmission as 2-stars, and indicates the overall status for that transmission leg as "Encryption level from a sender not yet determined, . . . ".

If a match with a record in the Non-Reporting Server TLS Status Database with the recency required and the match indicates that no encryption was determined (meaning the sender server has not been adequately identified as using TLS with the raw received server log within the desired recency), then, the system may place the level of the encryption status data field blank, and indicate as "Inconclusive" in grey, report the Overall End to End 5-star scale status for that transmission as 2-stars, and indicate the overall status for that transmission leg as "Encryption level from a sender based on common server options indicates not encrypted, . . . ".

The system may then conduct a new secondary review using the raw received server log analysis to determine the TLS status from messages received from the Non-Reporting Server, and, if no TLS status is detected from the raw received server log analysis, record in Non-Reporting Server TLS Status Database the server ID, no encryption, and date of no encryption verification, and send a follow-up receipt to the sender that indicates "Further analysis of the transmission (indicating the original transmission details) indicates that the transmission path from Sender to RMail Cloud was not encrypted."

If a TLS status is detected from the raw received server log analysis, then the system may record in a database the server ID, TLS level details, and date of TLS verification, send a follow-up receipt to the sender that indicates "Further analysis of the transmission (indicating the original transmission details) indicates that the transmission path from Sender to RMail Cloud was sent from a server that normally sends encrypted transmissions with TLS (indicate TLS level) and the original transmission path from Sender to RMail Cloud could be considered to have been encrypted if the sending server is functioning in its standard mode of operation."

In another embodiment, the sender who has contracted for the systems and process performed at the intermediate server or RMail Cloud server may be provided a service level agreement which specifies, for example, an offer to conduct raw server analysis if requested within five days of returning any Registered Encryption delivery status receipt if the receipt indicates "Inconclusive" as a status leg, at which time a manual or automated raw log analysis will be conducted for that particular sender server. In another embodiment, the server may store the raw logs for seven days to provide for time for such analysis.

2. Recording Secure Outbound Transmission of the Message from RPost to the Recipient.

When the message is received at the RPost server, there needs to be a determination as to how to deliver the message to the intended recipient in a secure manner.

Based on the:

A. feature request of the sender (sender or sender settings determining how the message should be transmitted securely to the recipient (with what secure transmission method, system, or protocol), the message is transmitted, or, B. availability at the recipient to accept a certain type of secure transmission, the message in a one of a select secure transmission protocols, the message should be transmitted securely to the recipient (with what secure transmission method, system or protocol).

In an example of one embodiment, if (A), the RPost server would transmit the message with message-level encryption based on the feature set by the sender or sender admin, and the message would be transmitted encapsulated inside a 256-bit encrypted PDF file.

For another message, if (B), the RPost server would transmit the message with message level encryption based on the configuration done by the sender or sender admin with the requirement of TLS 1.2 sending unless unavailable, and if unavailable, send transmitted encapsulated inside a 256-bit encrypted PDF file. For another message, if (B), the RPost server would transmit the message with message-level encryption based on the configuration done by the sender or sender admin with the requirement of TLS 1.0 or more secure, but if a recipient was able to accept TLS 1.2 and therefore TLS 1.2 protocol was used for the secure transmission.

The level of TLS transmission available can be kept in a cache stored at the RPost MTA or in a database or server associated with the RPost MTA, and only if that protocol is not available, re-test to determine available protocols, and if then the desired protocol is not available, revert to an alternative message-level encryption transmission (i.e. AES 256 bit PDF encryption). The fact of, type, and/or level of encryption from RPost to the recipient being recorded at RPost in a database.

Figure 5:
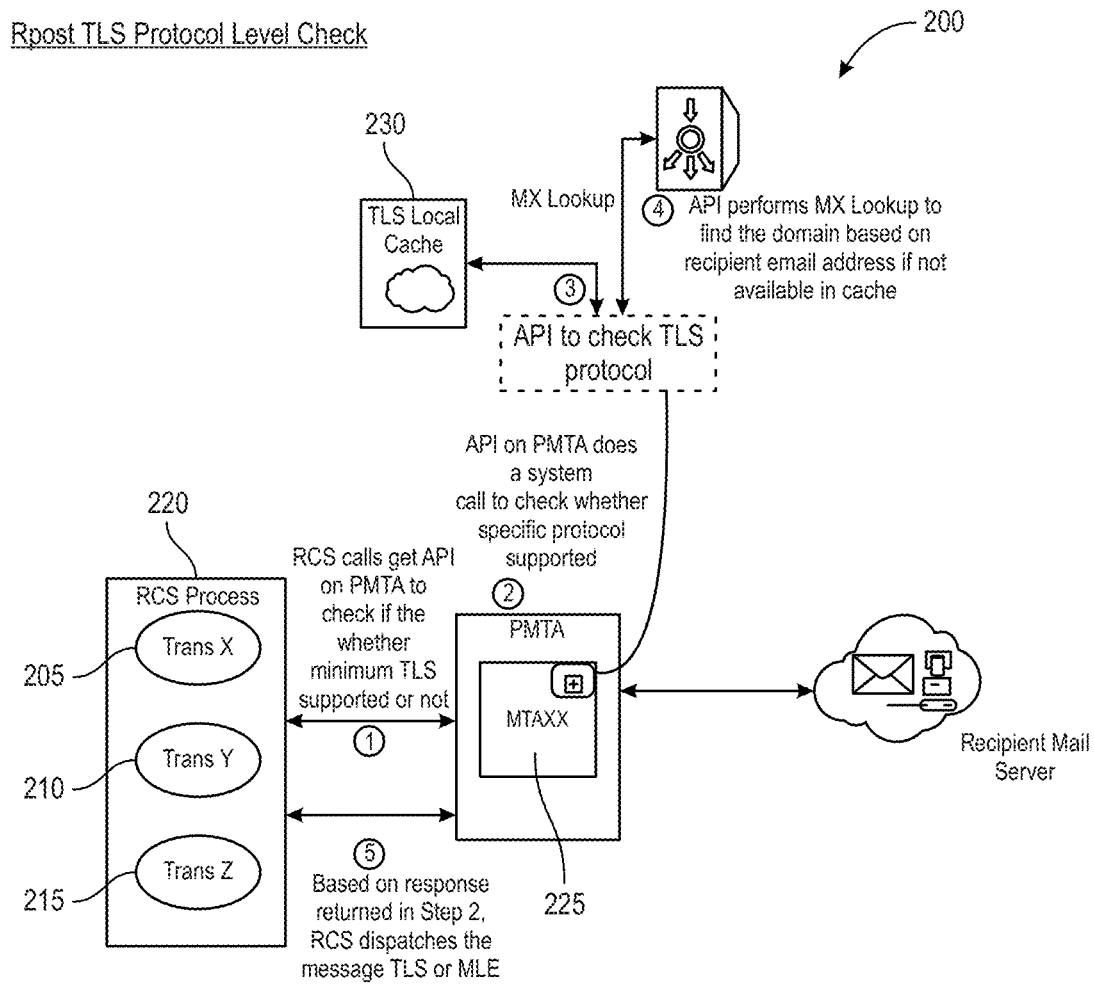
FIG. 5 is a schematic diagram of one embodiment of a process for determining an allowable encryption level that may be received by a recipient of an electronic message.

FIG. 5 illustrates an embodiment 200 of determining what level of secure transmission protocol can be received by a particular recipient, which then determines what type or level of encryption will be used to transmit a message to a recipient of the message. In this embodiment, a message is received by a server in a Registered Central Server (RCS) 220, such as servers Trans X 205, Trans Y 210, or Trans Z 215. This example assumes Trans X 205 has received the message. The RCS server Trans X calls "get API" on an MTA (Message Transport Agent) server MTAXX in step 1. In step 2, The API performs a system call to analyze the type of protocol that exists in the message. If the result is that the message is encrypted in a particular TLS protocol, the API checks in a memory such as TLS Local Cache 230 to see if the recipient is known to the system in step 3. If the recipient is known to the server, the API communicates with RCS Server Trans X 205 and instructs the server as to the proper TLS or MLE protocol with which to transmit the message to the recipient, and Trans X then transmits the message to the recipient.

If the recipient is not known to the system, then the API performs an MXLookup to find the domain based on the address contained in the received message in step 4. Once the domain is determined, a copy of the recipient's information is stored in TLS Local Cache 230, and instructions for the use of the proper protocol for transmitting the message are communicated to server Trans X 205, and the message is transmitted using the proper encryption protocol to the recipient.

In some case, however, the recipient may not be able to receive a message using a TLS protocol. In such a case, the message will not be transmitted until an appropriate protocol that can be received by the recipient is determined. In such a case, the message will be transmitted using pdf encryptions, for example.

When setting up a customer to use the disclosed system, the customer sending the electronic message to a recipient may set a minimum supported TLS protocol for message delivery. In such an example, the customer's setting can override the recipient's server settings, even if the disclosed system supports the recipient's encryption protocol. In such a case, the message, if it cannot be received by the recipient's encryption protocol, may then be sent to the recipient using, for example, a pdf encryption protocol.

The RPost server records which method of delivery was used for the actual transmission for each intended recipient. This is different than showing that there was a request to transmit encrypted. The distinction here is there is a record of secure transmission to each intended recipient with secure forensic metadata recorded.

Considering the above example of the database record for an email sent from Bob@company.com to Sue@network.com and Jim@home.com could be in summary, as follows, with additional fields for message ID, a hash of the sent message, additional sender hops extracted from headers, and the level of secure transmission at each recorded additional hop. For the example from Bob to Jim, receiving the message at the RPost server via RPost server public key PKI applied by RPost sender app was detected therefore the system knows the message was sent secure from the sender Bob mail client (vs. the sender domain or server IP address) to RPost in route to Jim.

| RPOST TO RECIPIENT | | | | |
|---|---|---|---|---|
| Origin Sender | End Recipient | Sent Secure Identifier, Last Hop | Secure Transmission to | Time Accepted |
| Bob@company.com | Sue@network.com | TLS1.2 | IP FQDN & Recipient | 10:02:10 UTC |
| Bob@company.com | Jim@home.com | PDFAES256 + TLS1.0 | Recipient Mailbox | 10:04:15 UTC |

These records would combine in the database through a common message ID, and would include a hash of the entire forensic metadata, logically associated with a hash of the content, and could be generated into a "Certificate of Security" that is digitally signed, in a manner that can prove the content originally transmitted, received, timestamps of sending, dispatch, delivery, decrypting if PKI, opening, using various methods disclosed in the Tomkow family of patents and prior art.

| SENDER TO RPOST | | | | |
|---|---|---|---|---|
| Origin Sender | End Recipient | Sent Secure Identifier, Last Hop | Received Secure Identifier | Time Accepted |
| Bob@company.com | Sue@network.com | FQDN Domain, IP | TLS1.2@Server 1 | 10:01:10 UTC |
| Bob@company.com | Jim@home.com | Sender + FQDN + IP | RPPKI + TLS1.0@Server 3 | 10:02:15 UTC |

| RPOST TO RECIPIENT | | | | |
|---|---|---|---|---|
| Origin Sender | End Recipient | Sent Secure Identifier, Last Hop | Secure Transmission to | Time Accepted |
| Bob@company.com | Sue@network.com | TLS1.2 | IP FQDN & Recipient | 10:02:10 UTC |
| Bob@company.com | Jim@home.com | PDFAES256 + TLS1.0 | Recipient Mailbox | 10:04:15 UTC |

The report could include a summary of the above using a formula or by creating a security score, for example,
If Sender to RPost=secure via PKI, 4 points
If Sender to RPost=secure TLS 1.2, 3 points
If Sender to RPost=secure TLS 1.1, 2 points
If Sender to RPost=secure TLS 1.0, 1 point
If RPost to Recipient=secure via PDF AES-256, 4 points If RPost to Recipient=secure via TLS 1.2, 3 points
If RPost to Recipient=secure via TLS 1.1, 2 points
If RPost to Recipient=secure via TLS 1.0, 1 point
If either Sender to RPost or RPost to Recipient has zero points, then create a flag to alert sender admin.

The above scores can be adjusted based on what level of security is important for the sender organization; in a management interface that additionally permits the sender administrator the ability to opt to exclude points for secure transmission for certain transmission protocols.

The "Certificate of Confidentiality" or "Certificate of Security" or "Certified Secure" record can include delivery status information, along with the portions of the message transport protocol combined with database records of certain processing having been conducted (i.e. converting the message to PDF AES-256 wrapper), and provide in a prominent manner for sender and sender organization an indication that the transmission was Certified Secure to the standards the sender organization indicates is secure enough for their purposes, and optionally display the security score. This Certificate of Security can be compiled to confirm multiple communications threads, including, as an example, a submission from sending application (via SMTP, HTTP, or other protocols) to the processing hub, to the receiver, and then (in an example of an e-sign, reply or response from the receiver) back to the sender and any copied or blind copied recipients. In this example, the information of fact of secure transmission of the replies, responses, and e-sign records, or fact of message parts being redacted in the send or from the reply (as further described herein) would be recorded in a similar manner.

It is understood that the message may be transmitted to the intended recipient via HTTP or HTTPS, HTTPS being permitted and HTTP not, depending on the sender admin rules (for link-retrieval large file sending, for example). This information would similarly be captured. Additionally, the metadata would capture whether sent by HTTPS plus Recipient Password Required or simply HTTPS.

In another embodiment of the Certificate of Security, the system will analyze the message and may include the following steps:
1. RPost system decrypts a received encrypted message sent from the sender's Outlook (i.e. PKI decryption, how RPost code verifies/records that it was, in fact, received PKI encrypted from RPost app.).
2. RPost system records receipt of an inbound message from sender SMTP via TLS (key point being how RPost code verifies/records the fact of receipt at RPost system by TLS transmission from sender).
3. RPost system records receipt of an inbound message from API connection (via HTTPS) (key point being how RPost code verifies/records the fact of receipt by secure web services HTTPS transmission from sender) [both scenarios, in send of secure large mail or receipt of a secure reply].
4. RPost system records the delivery of outbound message via TLS to recipient gateway (key point being how RPost code verifies/records the fact of successful TLS transmission to recipient gateway)
5. RPost system records fact of 256-bit encrypting and password protecting PDF message prior to transmission to the recipient.

The above being recorded in a database at RPost.

Each secure transmission defining element is recorded in an RPost database with the record appended inside the registered receipt in a text file displayed at authentication, and with the fact of 1+4, 2+4, 3+4, or 1+5, 2+5, or 3+5 being done to provide a confirmation of encrypted transmission in the receipt.

Track and Prove Encrypted Inbound Message Receipt: Receipt of an inbound message with visibility of and auditable proof of fact of secure delivery from the original sender. A recipient may also see a record that reports secure transmission from the sender, with a record to verify fact of receipt of the message via a secure transmission from the sender (via RPost).

A security gateway server could use the same elements noted for recording inbound message traffic in terms of analyzing the message headers to extract the TLS or message-level encryption data and place an indicator in the message header, subject, or body to certify secure receiving.

3. Registered Encryption Report Generation

In one embodiment, an encryption tracking report is appended to, and is identifiably logically associated with, and/or cryptographically associated with, a delivery Receipt email record or a delivery status report showing that is in itself content verifiable using digital fingerprinting or digital signature or other cryptographic techniques such that the audit trail (i.e., proof of delivery, time, transmission details) also includes the underlying data that is interpreted in the encryption tracking report (the "Registered Encryption" report).

In this embodiment, the Registered Encryption™ report is attached to the Receipt as a digitally signed PDF and can be identifiably logically associated with, and/or cryptographically associated, or its underlying data logically associated with the Receipt even if the digitally signed PDF is separated from the Receipt, and is generated based on the analysis of the received headers, SMTP data and other message attributes of the message. The data in the Registered Encryption™ report can be verified as authentic associated with the original delivery details using a comparison of original hashes of the Registered Encryption™ report and the original delivery status details. An exemplary excerpt from a registered encryption report generated when a message is sent by a sender to the RMail cloud service is depicted in FIG. 28.

1. For every message "received" by the RMail cloud service, the header in the .eml file received is recorded. This provides details on the server hops before the eml file was received at the RMail Cloud server. Key details—
[From]
[By]
[With]
[TLS]
[Cipher]
[Sequence]
[Date]
[DateUtc]
are extracted from the header record as well.

The reports list the email address of the original sender, Internet Hop ID, security details, such as the message level and transmission protocol, the time the message was received by the cloud system, and a status of the encryption of the message. The report also identifies, for messaged outbound from the RMail cloud service to the recipient, the end recipient email address, security details about the message, such as the message level and the transmission protocol, the time received at the recipient, and the encryption status of the message when it was received by the recipient.

An example of the coding that performs these processes is set forth in FIGS. 29 and 30

FIG. 31 set forth exemplary coding for parsing header data from the message

Referring again to FIG. 28, the original sender is the sender who sent the email or message. The Internet Hop Id is the last received header before the email was received at the RMail Cloud.

A. Parsing Headers

When parsing the headers to determine the encryption status from the sender to the RMail Cloud, a conversion table is built to map the different formats in which the headers may display encryption status details depending on different sender server versions and a variety of terminology patterns and formats. This table provides a translation of header values into a uniform.

For example: when parsing 'Received' headers at the RMail Cloud to determine TLS value, value would be through the translator table due to the variety of formats in how this value is displayed between different versions and terminology.

EXAMPLE

TLS1.3 translates to TLSv1.3
TLS1-3 translates to TLSv1.3

An example of coding that may be used to carry out this process is illustrated in FIG. 32.

Additionally, there may be different TLS values and combination of values for the sender to RMail Cloud transmission leg, due to the variety of send applications and sender email clients used by senders.

The parsing and translators used need to consider not only the variety of formats of the cipher levels, but other factors that may determine message-level encryption (not transmission encryptions) and time of delivery of the data package if delayed for certain recipient deliveries.

For example, encryption status may be further determined:

1. Sender to RMail Cloud—Based on security details, that is, Message Level Encryption and/or Transmission Encryption analysis, encryption status is determined. Every eml file is examined for headers and attachments with specific names or ciphers, to determine the application/Client used by the sender. Further, all received headers in the eml file(s) are scanned for a TLS value. Many integrations may use API to send an email to the RMail Cloud, which is also one of the identification areas for the encryption level analysis. An eml file may have "Received" headers without any TLS information, yet it may have been received encrypted at the Message Level, for example. The invention must account for this combination accurately and analyze how the message was sent and its TLS or other encryption method value if one exists to determine the encryption status. For example: If the sender used the RMail for Outlook app with Local Encryption enabled, the message is encrypted at the Message Level from the sender's desktop to the RMail Cloud using RSA 256-Bit AES encryption to wrap the message, and therefore, the message has a verifiable level of encryption from sender to the RMail Cloud regardless of any transmission encryption method from sender to RMail Cloud; and since the message is itself encrypted, the overall status for that leg of the transmission would be the highest level of encryption, and the status is Best+(a sample rating scale).

RMail Cloud to Recipient—In this section of security detail analysis, the encryption feature requested by the sender (how the original sender intended for the message to arrive encrypted at the recipient) is verified—it is verified that the message was actually transmitted with the intended level of encryption (versus being intended to having been sent with the intended level of encryption). For example, the SMTP log data is scanned for the TLS value and verified against the intended minimum level of TLS. In this part there are several scenarios that have to be considered in the analysis; how the message may be delivered to each intended recipient of the original sent message at the time of generating the encryption status report. For example, with sequential e-signing services, not all recipients may have received the offer to e-sign the massage in or attached to the email before the encryption tracking report is being generated or the e-sign status delivery receipt has been created. With encrypted File Share services, the email that the recipient receives may not have any of the attachments, those may be downloaded from a secure portal. The invention must not only analyze the TLS value or the original message level encryption value, but also the status of how and when the email content and attachments are received at the recipient. Encryption reports may be supplemented or otherwise updated after more details have been gathered, either in a subsequent report, and updated one, or an updated online view of the report.

Figure 33:
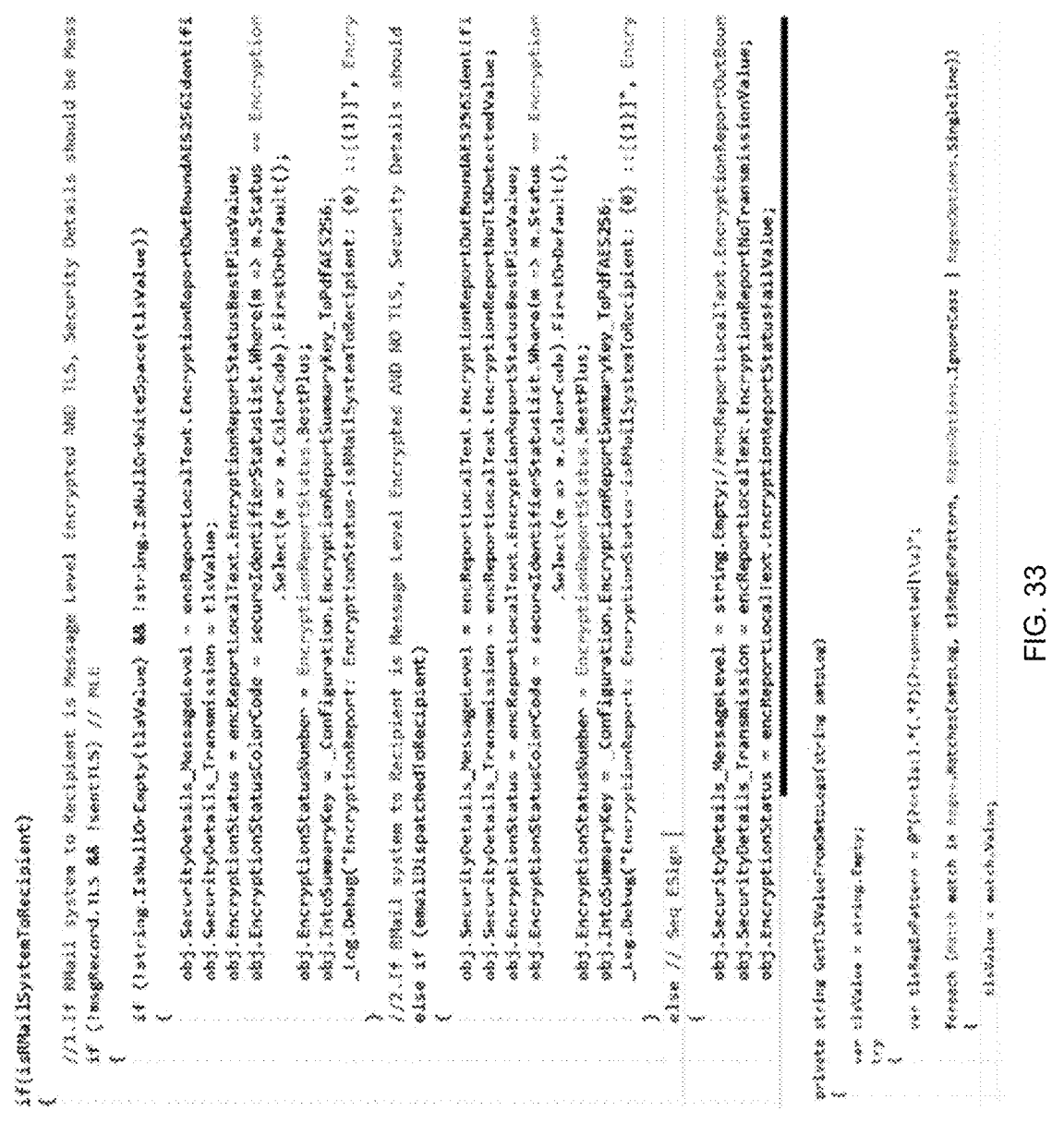

Some examples of how this is accomplished in code are illustrated in FIG. 33. The following examples illustrate how security details and encryption status may be determined. For example, if sender to RMail Cloud is via the "RMail for Outlook" app installed at the sender with the "RMail for Outlook" Local Encryption setting enabled (RSA-AES256-bit), the "RMail for Outlook" app could provide one method of encryption (RSA-AES256-bit) and the transmission might or might not additionally be encrypted (TLS) and encrypted at various levels (TLXvX.X). Security Details in this case could be "RSA-AES256+TLSvX.X". Status would be Best+ regardless of level of TLS, as the RSA-AES256 bit encryption would prevail as the strongest level of encryption over the TLS as it would indicate encryption from the sender device to the RMail Cloud vs. from the Sender Gateway to the RMail Cloud.

In such a case, the Message Path may be:

Sender Device——→Sender Mail Gateway→RMail Cloud→Recipient Mail Gateway→Recipient Device For example, in the following path:

Sender Device——→Sender Mail Gateway→RMail Cloud the message itself sent along transmission leg from the sender device to the sender mail gateway may be encrypted using RMail For Outlook RSA-AES256. The transmission leg between sender mail gateway and the RMail Cloud may be TLS, and TLS varying levels possible may be used. For example:

1. If sender to RMail Cloud is via the RMail for Outlook app with Local Encryption setting enabled AND no TLS detected in the received header at the RMail Cloud, Security Details would be "RSA-AES256". Status would be Best+ regardless of no TLS.

2. If sender to RMail Cloud is via another method (i.e., not the RMail for Outlook app) AND TLS is detected, Security Details would be based on the TLS level, TLSv1.0=Fair, TLSv1.1=Acceptable, TLSv1.2, TLSv1.3=Best. Note, the interpretation of the acceptability of the level of TLS would be a parameter that could be set by the RMail Cloud administrators or the sender administrator.

3. If sender to RMail cloud is HTTP, then if HTTPS is detected and it is at the TLS 1.2 level, Security Details="API via HTTPS TLSv1.2". The Status would be Best.

4. If sender to the RMail Cloud is via another method (i.e., not the RMail for Outlook app) AND TLS is NOT detected, Security Details would be "Not Encrypted" and the status level would be "Fail".

Figure 34:
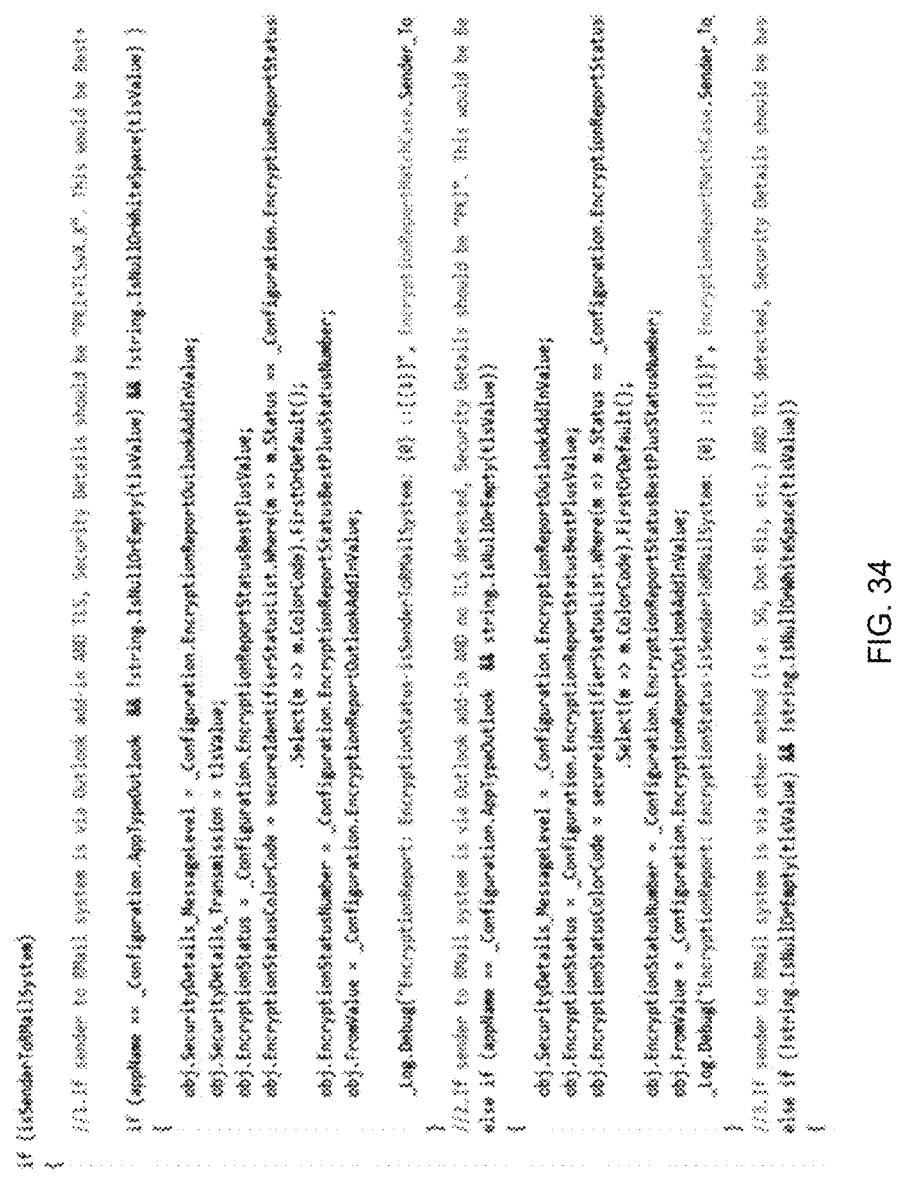

An example of this logic is illustrated in the code presented in FIG. 34.

A similar process is carried out along the message path defined by the transmission of the message from the RMail Cloud service to the intended recipients of the message. For example, where the transmission is:

Sender Device→Sender Mail Gateway→RMail Cloud→Recipient Mail Gateway→Recipient Device, RMail Cloud TLS transmission may be used when the message is transmitted between the RMail Cloud and the Recipient Mail Gateway. Alternatively, RMail Cloud Message Level Encryption PDF-AES265 along a part, or the entirety of, the message path between the RMail Cloud, the Recipient Mail Gateway, and the Recipient Device.

Figure 35:
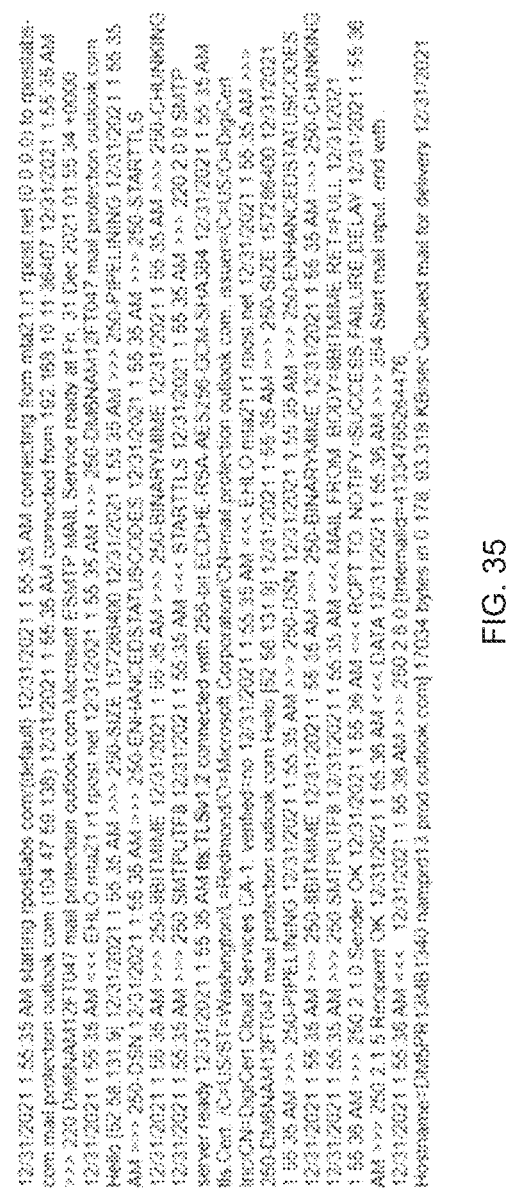

As shown in FIG. 32, the SMTP dialog is parsed and the TLS value is extracted for each message recipient record. This information is included in a Registered Receipt audit trail and Receipt Authentication portions of the report as well, as shown in FIG. 35. FIG. 36 illustrates one example of coding used to determine the level of encryption used if the email was dispatched to the recipient with an AES encrypted and password salted (protected) PDF (for example, RMail Message Level Encrypted).

Referring again to FIG. 28, the process for determining encryption status for the message transmitted from the RMail Cloud system to the Recipient will be described.

When the message is transmitted from the RMail Cloud to the Recipient, the following examples describe how the encryption status of the message as received by the Recipient is determined. For example:

1. If RMail Cloud to Recipient is Message Level Encrypted AND with TLS, Security Details would be Message Level="PDF-AES256" AND Transmission="TLSvX.X". This would be Best+ regardless of level of TLS.

2. If RMail Cloud to Recipient is Message Level Encrypted AND without TLS, Security Details would be Message Level="PDF-AES256". This would be Best+ regardless of no TLS.

3. If RMail Cloud to Recipient is via HTTPS access, Security Details would be Transmission="HTTPS TLSv1.2" and status="Best". Note, if there is no Message Level encryption then the Message Level field would be blank in the encryptions tracking report.

4. If RMail Cloud to Recipient has no message level AND TLS is detected, Security Details would be based on the TLS level, Transmission=TLSv1.0=Fair, TLSv1.1=Acceptable, TLSv1.2, TLSv1.3=Best. Note, the interpretation of the acceptability of the level of TLS would be a parameter that could be set by the RMail Cloud administrators or the sender administrator.

5. If RMail cloud to Recipient has no message level and no TLS determined, Security Details would be "Not Encrypted" This Status level would be "Fail".

The logic for this determination is illustrated in FIG. 35.

4. End to End Summary

Based on the encryption status and based on the lowest encryption level on the two message paths (to RMail Cloud and from RMail Cloud) an overall summary may be determined and is part of the encryption report, and is called the end-to-end security summary. For example, one embodiment of the report displays values for overall encryption status, and a description of the status, including a listing of the email addresses of the original sender and recipient, is illustrated in FIG. 38.

Figure 39:
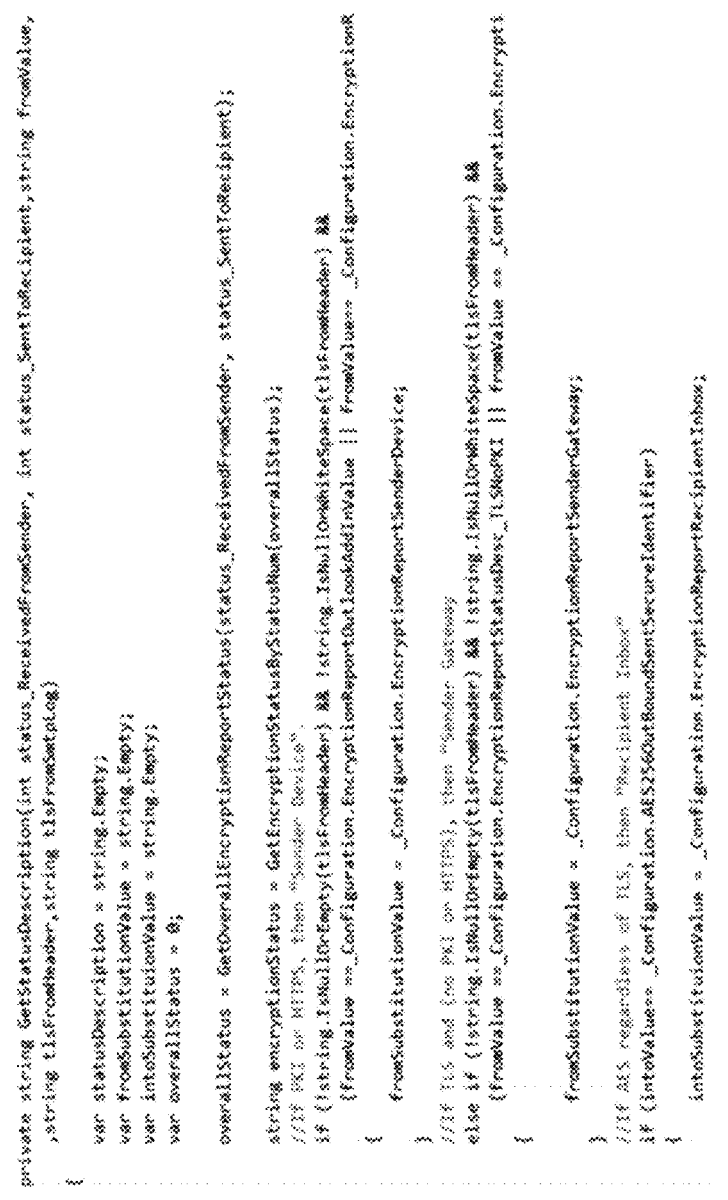

The logic, to determine the lowest security level on each message route (into RMail Cloud, out from RMail Cloud), and then there is a description interpreting what "end-to-end" means based on the type of encryption used on each path (i.e., sender gateway to RMail Cloud to recipient inbox, or sender device to RMail Cloud to recipient gateway. is illustrated in FIG. 39.

In an embodiment, the Overall Encryption Status is mapped to a 5-star system based on the lowest "Status" level of encryption on each path per send (sender to RMail Cloud, RMail Cloud to recipient) and this is reflected in the overall Star level status.

| | STATUS |
|---|---|
| BEST+ | 5 Stars |
| BEST | 4 Stars |
| ACCEPTABLE | 3 Stars |
| FAIR | 2 Stars |
| FAIL | 1 Star |

With the Fail Overall Status and Star rating, for example:

1. If there is no detected encryption from the sender to the RMail Cloud and from the RMail Cloud to the recipient, then the star rating would be zero stars.

2. If there is no detected encryption from the sender to the RMail Cloud or from the RMail Cloud to the recipient, then the star rating would be one stars.

The descriptions of the interpretation of the overall status depend on the Overall Status plus the type of method of transmission or sending application, and is illustrated in the table of FIG. 40.

B. Authentication

The encryption tracking report can be determined authentic as it is over signed in its PDF form attached to the Registered Receipt™ email record which includes a copy of the original message content and a digital fingerprinting method of verifying the original integrity of all of the data associated with the PDF encryption tracking report plus the original message content plus the original message delivery history and timestamp transmission details. The encryption tracking report additionally therefore proves the level of encryption for WHAT CONTENT when combined with the original message content (as when combined with the Registered Receipt™ email record, when authenticated, validates the raw data in this encryption report as authentic by its cryptographic association with the original content sent). The underlying encryption report data can be authenticated associated with the original content, timestamps of sending and delivery, and delivery verification data (server log excerpts, etc.). The encryption status reports may attach the the receipt, or may be viewable in a database, online report, or other datafile delivered or made accessible to the sender or the sender email administrator, or to the recipient for their received messages, or to the recipient email administrator for messages received by that administrator's users.

Figure 41:
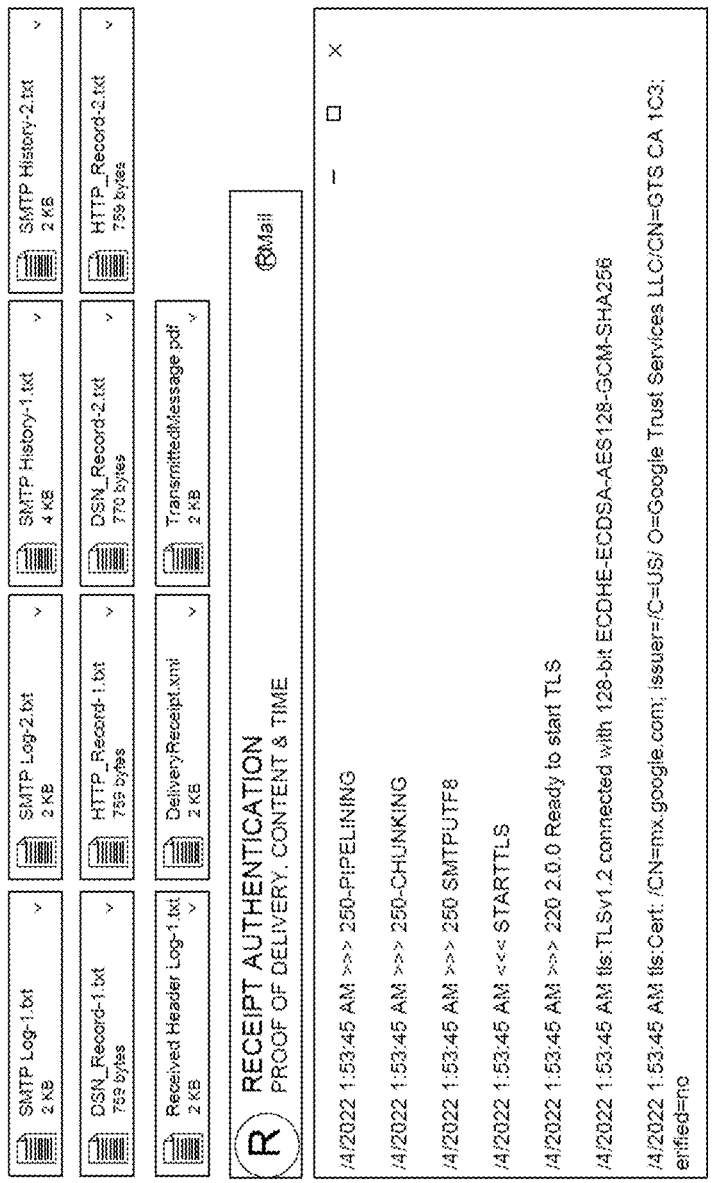
FIG. 41 is a graphical illustration of a report showing authentication information embedded in a data package with an encryption tracking report.
Figure 42:
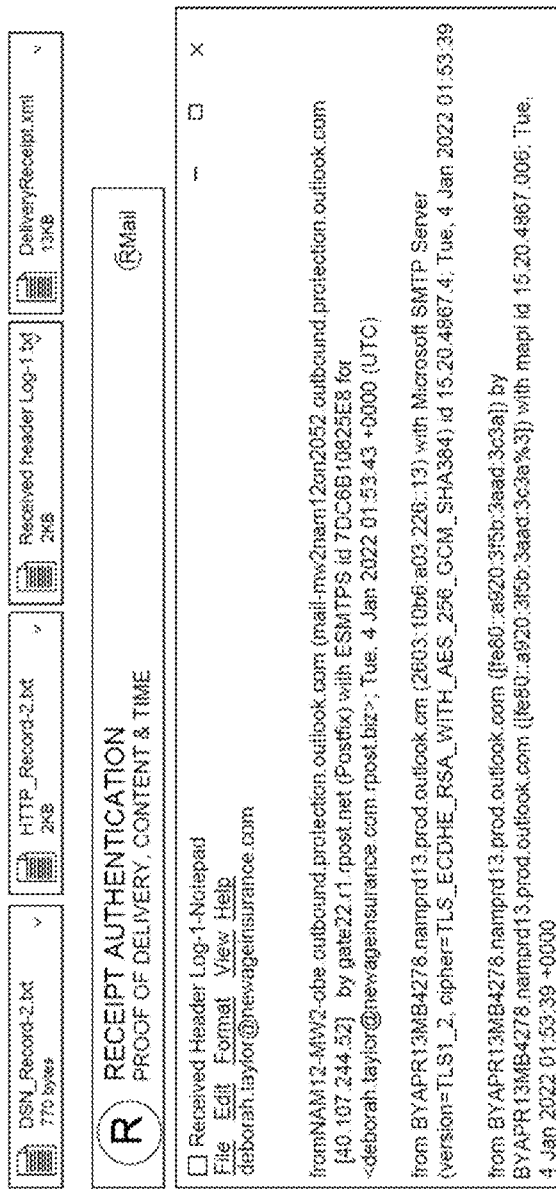
FIG. 42 is an exemplary illustration of an excerpt of a header log in accordance with the present disclosure.

This authentication information may be embedded in the data package with the encryption tracking report. For example, excerpts of SMTP Log from authentication email; the SMTP log from RMail Cloud to recipient gateway, and the like, as illustrated in the exemplary report set forth in FIG. 41. An exemplary excerpt of a Header Log from an authentication email for the transmission of the message for a recent hop from the sender to the RMail Cloud is illustrated in FIG. 42.

If the email to the RMail Cloud is received from the sender when sent from the RMail for Outlook application and has the Local Encryption setting enabled, an encrypted file and content/email body cannot be read unless it is decrypted and the record of such required activity of decrypting the message level encryption at the RMail Cloud is the record of encryption from the sender device with the RMail for Outlook application with the Local Encryption setting enabled to the RMail Cloud service. An exemplary excerpt of such a report is illustrated in FIG. 43.

Figure 44A:
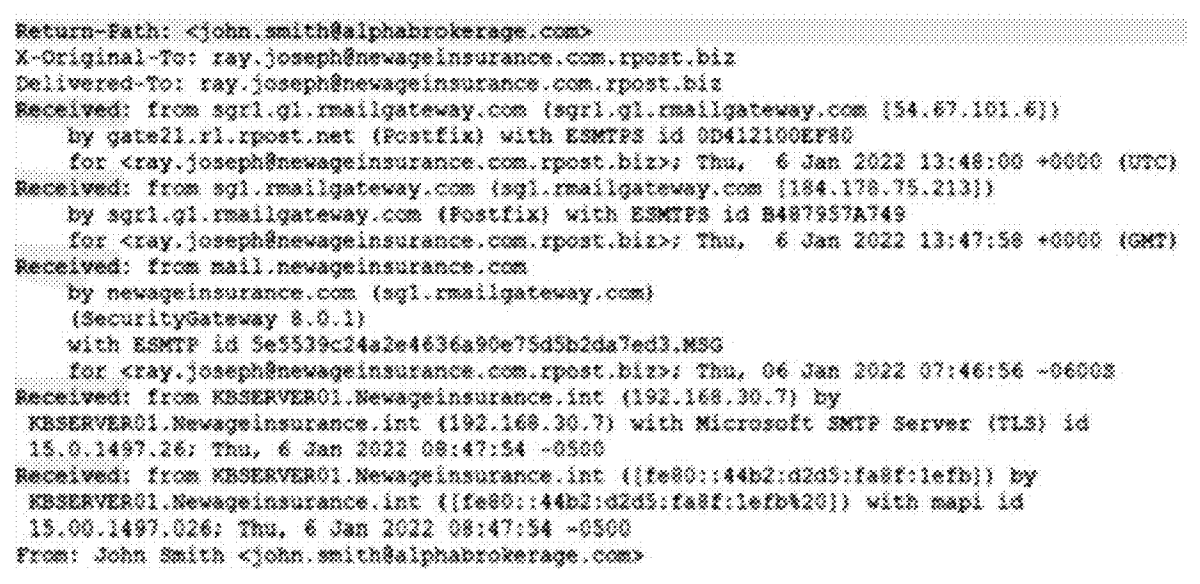

If there is an outer perimeter of the RMail Cloud that is designated to perform other functions and relay some messages for further processing in the RMail Cloud (e.g., RMail Gateway server), and the message was received into the RMail Cloud server from the perimeter RMail (Cloud) Gateway server, all hops and received headers are analyzed, and internet HOP details are pulled from the headers prior to being received by the RMail Gateway server that is the outer perimeter of the RMail Cloud. FIG. 44A illustrates a log of the transmission of a message, including all of the hops it followed. This is an example of selecting other hops in the message path from sender to the RMail Cloud to be the determination of adequate levels of or fact of sufficient transmission encryption across enough hops from sender to the RMail Cloud.

It may be useful for a sender or sender administrator to be able to easily create alerts if the overall encryption status is below their acceptable levels on any path (sender to RMail Cloud, RMail Cloud to recipient). A means of providing this ability is as follows:

The encryption tracking report file name may contain the "overall encryption status" star rating, and the encryption tracking report receipt (email) subject may contain the lowest level of overall encryption status for the message; for ease of parsing receipts to catalog less than acceptable levels of encryption on a particular message send path. This data is also available in other types of online view, database, or file delivery of summary RMail Cloud system reports for security intelligence reporting and analytics.

For example, the encryption tracking report may have an email subject that includes a statement that allows a viewer to quickly determine what level of encryption was used. For example, such a subject may appear as: Receipt: [Encryption=Best+] Projected Revenue for 2022.

Figure 44B:
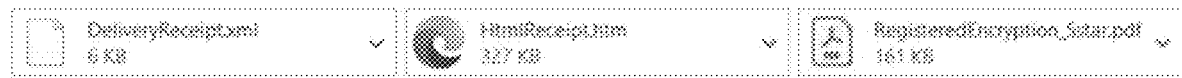
FIG. 44B is a graphical illustration of a track report filename in accordance with the present disclosure.

In an alternative embodiment, the encryption track report filename contains the name RegisteredEncryption_5star.pdf, as shown in FIG. 44B.

Figure 45A:
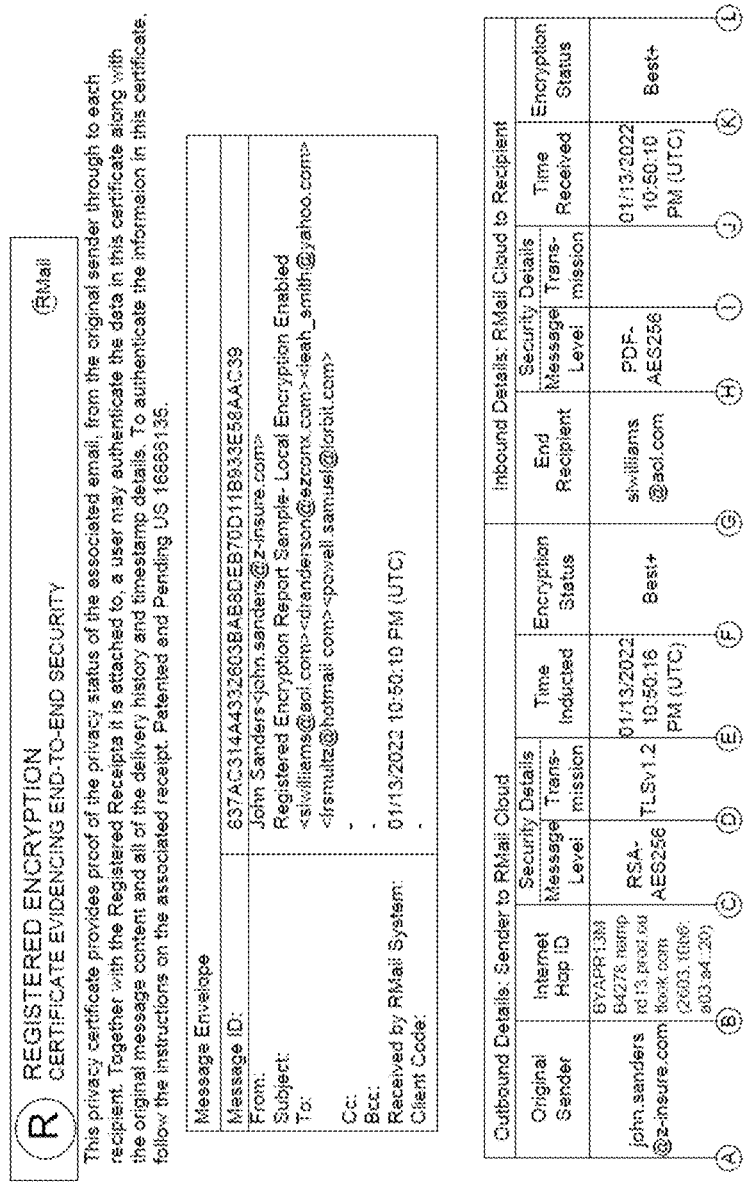
FIG. 45A is an exemplary report illustrating an encryption tracking report in accordance with the present disclosure.

A graphic illustration of one embodiment of a complete Encryption Tracking Report is shown in FIGS. 45A and B. As shown, such a report information related to the email message, including the message ID and whom it is from, as well as identifying that local encryption has been enabled, and including a list of intended recipients. The next section of the report includes the outbound details of the sender to RMail Cloud transmission leg, as well as the inbound details of the RMail Cloud to recipient transmission leg. These details, as discussed above, include information related to the security details and encryption status of the outbound and inbound transmission legs. The third section of the report includes an End-To-End Summary of the message, including the address of the original sender, the address of the original recipient, overall encryption status, and a status description.

B. REDACTED

REDACTED REPLY is a service that extracts part of a message at an intermediate server before it reaches the intended recipient so that the extracted message part does not remain in the message reply. As will be set forth in additional detail below, the instructions that the sender established when preparing the transmission of the message may instruct the intermediate server to extract a selected portion of the message and convert the extracted content into an image that is hosted at a server and then inserted into the message as a link before the intermediate server transmits the message and link for the image to the original intended recipient. The message may be configured by the intermediate server so that the image automatically extracts to display in the message when the message is opened or if the link is clicked, the image to be viewed by the original recipient just once, or to be viewed a selected number of times, after which the original intended recipient may not be able to further view the image; rather than blocking view after a selected number of views, the system may configure the message so that the image can only be viewed for a limited of time. Thus the image would be unviewable to any future recipient or forward of the message.

Alternatively, the intermediate server may convert the extracted information into an attachment which is then attached to the message for transmission to the original intended message. When replying to the original message, the original attachment would drop out of the message so that it would not be part of any reply initiated by the recipient.

Registered Redaction of Reply Message Part: This is a process for extracting a message part from the email content of the sender's message at an intermediate server disposed between a sender and a recipient, such that the extracted content remains associated with the message and can be viewed by the recipient but does not remain as part of or associated with the message after a reply or in some embodiments, after forwarding, or in other embodiments, after a period of time or number of views of the extracted message part. Further, in another embodiment, recording at the intermediate server and making available at the sender, a record that tracks whether the extracted content was viewed by the intended recipient, where the extracted content was viewed, and if viewed, whether the view happened at the same location as the initial message was opened.

In an embodiment, this is a system where an original sender can identify certain information in an email that they would like to treat differently from the rest of the content—for example, more confidentially—and send it to the original recipient, and prevent that confidential or sensitive information from being included in a reply or forward instituted by the original recipient. Such a system prevents a common problem that surfaces when an original email message becomes a long "thread" and may continue to contain sensitive information even as it is replied to and forwarded.

The email thread is, of course, part of those messages that are misshaped with paragraphs and formatting indents from all the back-and-forth replies. Sometimes these get so long that, by the time you get to the literal bottom of the thread, the margins are half-an-inch thick with the text now in some new shade of pink.

In one example, a person who, rather than typing a new email, finds the last email sent by the original sender, and just replies to it to save time—even though that new topic has nothing to do with the rest of the email thread. Rarely do people go to the bottom of the email thread to explore what history they may be transmitted along with their new email.

More often than not, some comment from some person who used to be part of the original thread whose comments perhaps should not have been exposed to all the more recent people in the thread is also included in the message.

For example, imagine the case in which an email is sent out to a recipient who then forwards that email to a third party. The original sender, after sending the original email, may want to have certain content sent to the original intended recipient to drop out of the message when the recipient forwards it so that more sensitive content originally sent to the intended recipient is not inadvertently shared in the email thread.

Another illustrative example is the case where a sender sends an email containing credit card information or other sensitive financial details to a bank or escrow company. The message itself is sent encrypted to the original recipient using a transmission encryption method, which means the message was encrypted in transmission from sender to recipient and decrypted at the recipient gateway and displayed in plain text to the recipient in their inbox. If the recipient simply replies with a "Thanks! Got it" message and they don't also have an automatic email server that is configured to transmit their email with transmission encryption, the recipient's presumably unencrypted reply contains the sender's originally encrypted transmitted financial information in the unencrypted reply email thread! And even worse, to save them time, the recipient may keep going to the prior email and re-replying to it with each reply containing the original sender's sensitive information returning unencrypted in the email thread; even the more current messages concern unrelated issues, even if forwarded to additional persons if future replies have copy addresses; each of whom will now have all of the original sender's sensitive financial details embedded in the thread.

Similar examples are the cases where a person's inbox gets hacked later on or if the inbox has cyber eavesdroppers. The original sender may want certain message parts to disappear after receipt by the recipient after a certain period of time to prevent a future hacker of the recipient inbox from being able to access that more sensitive message part.

Using the various embodiments of the present disclosure, a sender may mark certain information or images in a message as being confidential for viewing by only the original intended recipient, and such markings of those message parts could be set to not be viewed by any other future recipient of that original message thread. These embodiments of the present disclosure, as set forth in more detail below, provide a way to prevent confidential information to be inadvertently (or intentionally) transmitted to persons who are not the intended recipients of the message by allowing a sender of a message to mark or tag certain content in a message to disappear after being viewed once or after a certain number of views, or after a selected time after the message is received at the original intended recipient, or after the original recipient replies to the received message. Using these embodiments, the confidential and/or sensitive information is essentially redacted for future recipients from the message itself but accessible by the intended original recipient. In this manner, the reply from the recipient does not contain confidential and/or sensitive content. The message content marked to be extracted may be content that is not confidential where the sender may want to be able to track if that particular message content that was extracted had been viewed separately from the view tracking of the message as a whole.

The various embodiments of methods of redacting a portion of the email may include one or more of the following systems and/or processes:

1. Designating Highly Confidential Message Part

A user interface text box in the sender mail client can be, in an embodiment, a location where the sender can add certain highly sensitive text, for example, a credit card number or medical record information.

Alternatively, the sender may insert the highly sensitive information inside a certain type of bracket structure, such as ˆhighly sensitive content hereˆ.

2. Transmitting Securely to the Recipient.

The problem is profound when the sender transmits the secure message to the recipient via TLS, confidently knowing they took measures to send it securely. But, to their surprise, when the recipient replies, maybe with a casual "Thanks!" comment, their highly sensitive information was returned to them (through all of the hops and servers) possibly without any security, exposing the sender's highly sensitive information.

The message is transmitted to an intermediate server ("the RPost server") securely (PKI, TLS, etc.) from the sender, and at the RPost server, the server removes the designated highly confidential content, and either A. Creates, in an embodiment, a small image of the content and a corresponding black image of the same size or replaces the original content tagged to be extracted with some generic content;

B. An Alt-Text tag name is added, in an embodiment, to the image file that is designated by the sender, associated with the sender, or default, says, "Click for SENDER EMAIL ADDRESS Sensitive Content". This would need to be text that would not easily be spoofed by spammers, C. Places the image in the designated area of the message body via a link configured to automatically extract at the recipient in an embodiment;

D. The sender can select, in an embodiment, the number of views of the sensitive content and/or time after first viewing it remains available. This is stored at the server;

E. Places the black image in a location associated with the image of the sensitive content in an embodiment so that after the image with the sensitive content is displayed to its limit (as noted in D), the image link is redirected to the link for the corresponding black image.

3. At the recipient

The recipient opens the email transmitted securely by TLS, and sees the Alt-Text tag if the link does not automatically display the sensitive content. If it does not display, clicking the link or clicking to display images shows the sensitive content.

4. Upon Reply

The recipient sees the content, yet when they reply, the content, in an embodiment, may not be displayed after the reply (the link has a timeout after the first view, or a certain time after the first view and/or after sending, etc.

When the sensitive content times out, the content space may be replaced with a black box that says "Redacted Content" (as noted in E above).

5. Additional option.

It is expected that some senders sending to certain recipients would not want to send an email with hyperlinks due to the recipient security policies preventing such from being viewable.

A setting at the sender or sender administrator can replace the secure content image from an image stored to extracted content placed in a text box attached to the email, with the removed content replaced with black text that says "^REDACTED CONTENT ATTACHED IN TEXT FILE^". The attached file could be, in an alternative embodiment or at the option of a sender setting, a text file, HTML file, PDF, encrypted PDF, and the like.

When the recipient replies, the text file does not follow the reply, and therefore the goal is accomplished; preventing inadvertent disclosure of received highly sensitive information at or after reply.

6. Certificate of Security

In some embodiments, an added score to the Registered Encrypted report security certificate scoring could be included as part of various embodiments of this Redacted system. Additionally, there can be an indication of how many times the secure image was displayed, "displaying once"="most secure", or "expired 10 minutes after first display"="most secure", or some setting that is unlikely to display a second time inadvertently.

It is important to note that this feature is to prevent inadvertent disclosure of the sender's sensitive information by the recipient when the recipient replies. It is not intended in this embodiment to prevent the recipient from forwarding, copying, or taking a screenshot of the content, although additional known methods can be implemented to further control or restrict the display of the sensitive information.

7. Authentication of Certificate of Security

To authenticate the Certificate of Security, in various embodiments of the current disclosure, one could post a hash of the certificate, and a hash of the message together hashed, one or the other, or both in a blockchain so that if needed, the message could be rehashed and compared to the hash in the blockchain so that the private message would not need to be stored by a third party or returned in a receipt.

Alternatively, a Registered Receipt system as disclosed in the Tomkow family of patents, could include the forensic security metadata, the Certificate of Security and other elements, including the underlying message transport protocol and system processing forensics that verify the fact of message level encrypting (conversion to 256-bit AES PDF file) and or receipt and or sending by TLS and TLS level number.

If using a block chain as part of the verification, an embodiment is as follows:

There could be some value in storing a hash of the Certificate of Security ("receipt") data on the blockchain.

The receipt could be a JSON object containing all the delivery status information and message metadata along with base64 encoded strings representing the message and associated DSN, MUA, transmission protocols, server system data regarding encryption and decryption, receipts, and the like. The hash on the blockchain could be a canonicalized representation of the serialized JSON object.

The JSON object could be formatted as HTML through a template engine to produce the email receipt or accessed by customer systems on a real-time push basis through web hooks.

The hashes posted to the blockchain would be digitally signed by a documented RPost address. There would be no need to encrypt the receipt data as any tampering would invalidate the receipt.

Simple tools to perform the verification process through hashing the canonicalized JSON object and retrieving the transaction hash from the blockchain could be easily created in various languages (Node, Ruby, Python, etc.) and posted to GitHub public repos and package managers (npm, gem, pip, etc.). In addition, docker containers can be posted to the docker hub.

That way, corporate users (IT departments) could install and run their own verifiers with a few commands. The verifiers can then be easily incorporated into their business processes. RPost would still run verifiers in addition.

Use of blockchain as a verifier means RPost would not need any key escrow and/or 3rd party guarantees for ongoing support for receipt validation as all the information to validate receipts is public, and the blockchain is distributed and immutable.

The cost for a transaction would be around $0.02 per hash (not insignificant) to write to the blockchain. There is no cost to read the transactions. If this were implemented, RPost would want a private blockchain for non-paying customers and testing and only implement the public blockchain for paying users opting to pay the particular blockchain's cost.

An embodiment including a Blockchain solution may have some benefit for sales & marketing with a core value being for the service is the perpetual validity of the receipts and independent verification.

FIG. 6 is a listing of various settings available to a sender of a message using the redacted reply system. In option one, the system attaches chosen redacted reply content to the outbound message to the recipient as a text file. There is an option to select a file type, for example, an HTML file, and an option to separately encrypt an attachment file if needed.

In the various embodiments of the current disclosure, one method of identifying the information to be protected is for the sender to identify the information in some manner, and then the system, when the message is being processed for sending, extracts the identified information and turns the extracted into an attachment that is attached to the message when it is sent. In other embodiments, the extracted information is made available in a linkable database or web address that can be accessed by clicking on a link. As will be described in more detail below, in any case the tagged information is protected from being viewed by anyone whom the original sender did not intend to view the tagged information.

FIG. 46 illustrates one method for identifying information contained in a message that the sender of the message does not want any other person to view or forward other than the original recipient of the message. In this embodiment, the sender's message client includes an option to tag the information to be identified by enclosing the text within a pair of carrots (upward-directed arrows) as shown.

Figure 47:
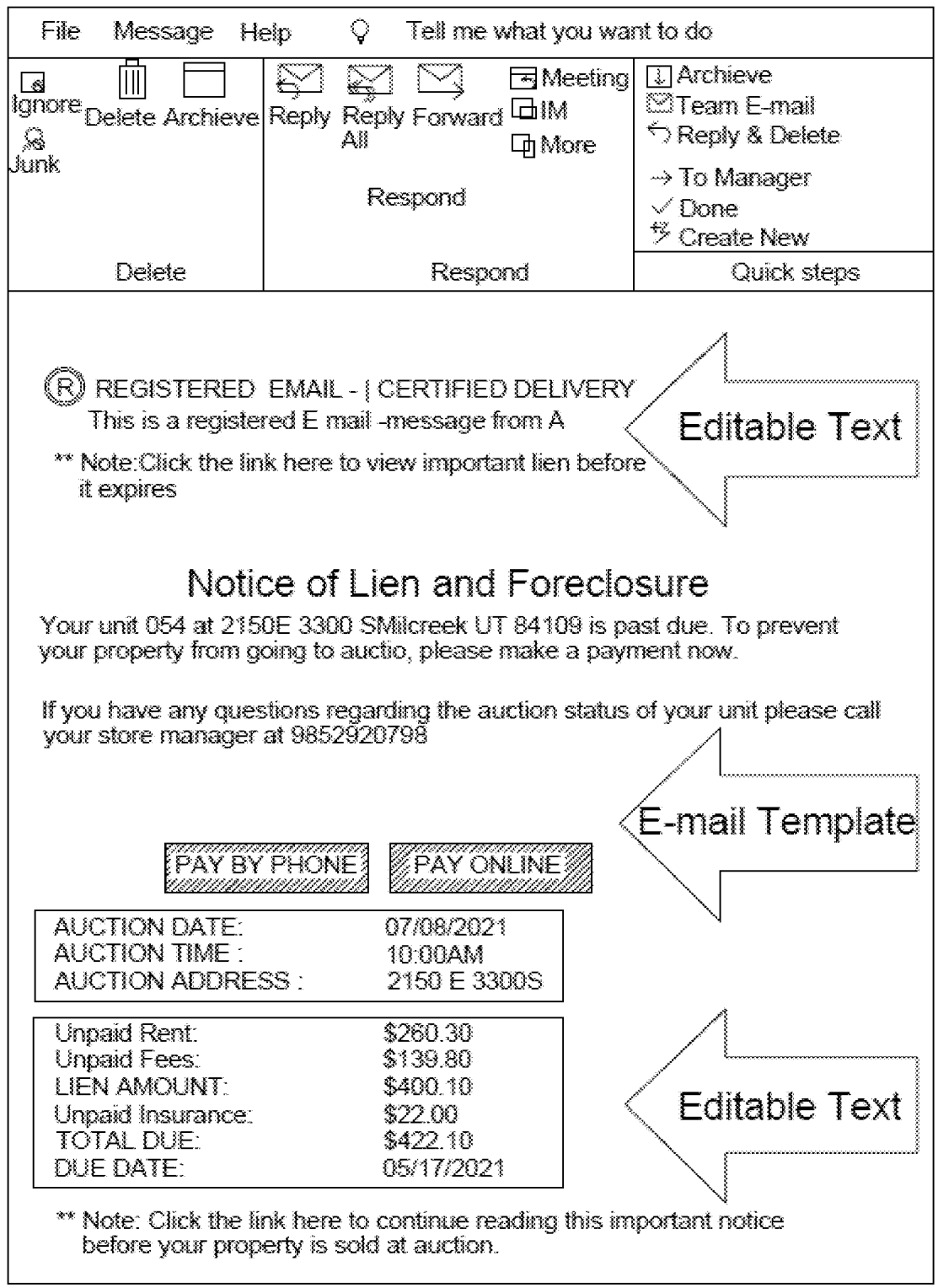
FIG. 47 illustrates an example of a message that has been constructed using the system shown in FIG. 2.

FIG. 47 illustrates an example of a message that has been constructed using the system shown in FIG. 2. As shown, the recipient can access the confidential information by clicking on the links shown, which process will be described in more detail below.

In accordance with various embodiments of disclosure, these links may expire after a selected time has elapsed since the message was first viewed by the original, intended recipient of the message or after a selected number of viewings by the intended recipient have occurred. Of course, the tagged text may also be prevented from being included in any BCC identified messages, Reply All messages, or Forwarded messages based on the original message, thus preventing transmission of the tagged information to persons other than the original intended TO recipient. Such tagging may also be arranged by the appropriate settings set by the original sender to prevent copy/paste operations by the intended recipient or to watermark the view of the information.

In option 2, the system inserts a link to the redacted reply text inside the email body. In one embodiment, the browser option, a new browser window is opened when the redacted reply text link is clicked or link-activated with the redacted reply text displaying when the link is activated. A number of options for this step are also set forth and it will be understood that these are exemplary and not limiting. For example, when a sender chooses to have a link open a browser window with the Redacted Reply text when the link is clicked, the sender may also configure various settings to control what happens when the link is clicked. For example, the sender may configure the link so that the Redacted Reply text is locked so it cannot be copied. Alternatively, the link may be configured to allow the text to be copied. In another embodiment, the sender may add a customer logo to the browser when it opens. The number of times the Redacted Reply text may be viewed by a recipient may also be configured by the sender, using either an enterable field or a drop-down list.

Figure 48:
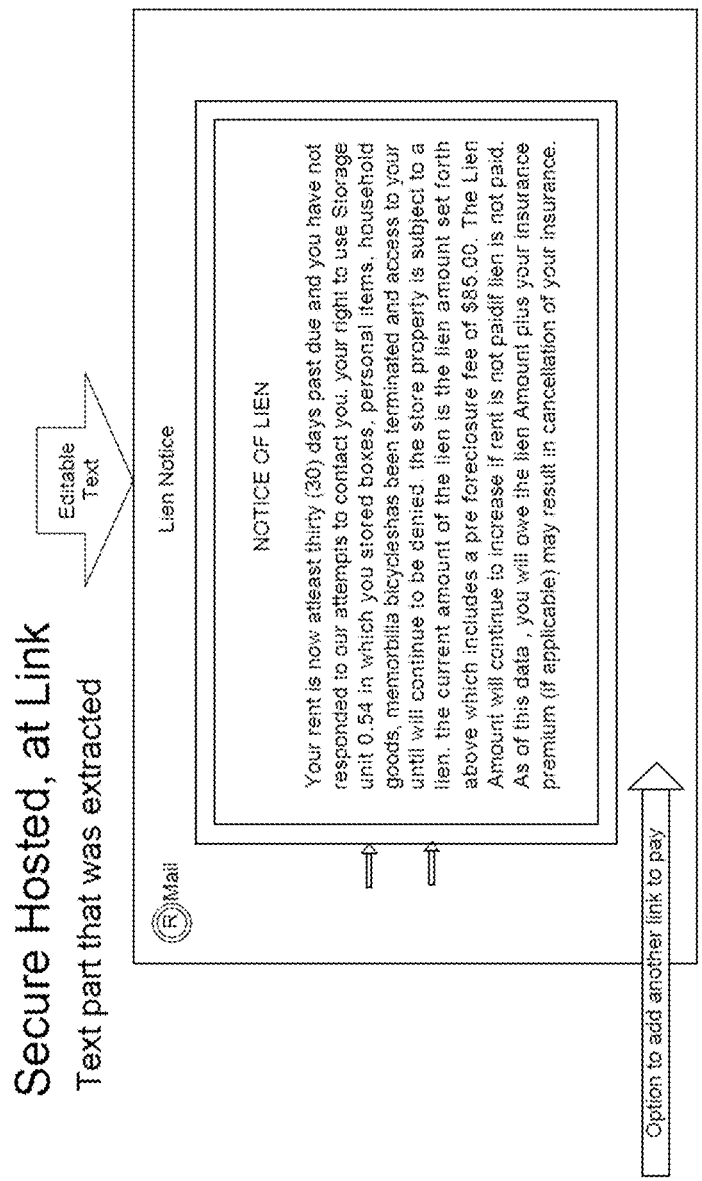
FIG. 48 illustrates a view of the tagged text that is viewed when the link in the message is activated.

FIG. 48 illustrates a view of the tagged text that is viewed when the link in the message is activated.

In still another embodiment, the sender may configure the link to limit the time Redacted Reply text may be viewed. Further, the sender may provide text that is shown in the browser windows when the link is clicked. For example, the browser window may display a message such as "The following information is private. If you are not an intended recipient of confidential and privileged information in this email, please delete it immediately. Do not disseminate this information."

In another option, the redacted content is removed and displayed as an image inside an email. The image file is stored in a temporary storage area associated with the web link, and a link is also stored. In an embodiment, the system may create a second image file of the same size that is black with white text labeled "redacted content". The system may then add alt-text to the image file, "redacted: click to that view". In an embodiment, viewing of the image file is only permitted when the viewer is using the original IP address of the first view, and/or, only for a certain number of displays and/or only for a specified time period which may be configured by the sender.

In one embodiment, the system removes content and displays an image inside an email, an image containing redacted content by, for example, implementing software instructions to convert the text marked for redaction to an image file; store the image file in a secure temporary storage area associated with a web link, and create a link of an image file. The sender may also configure the system to create a second image file of the same size (height, width) that is black with white text "Redacted Content"; Add Alt-Text to the image file such as, for example, "Redacted: Click to View"; record the IP address of the first view; permit viewing of an image file (i) only from original IP address, and/or (ii) only for a certain number of displays and/or (iii) only for a specified time period with (i), (ii) and (iii) being configurable by sender company.

Figure 7:
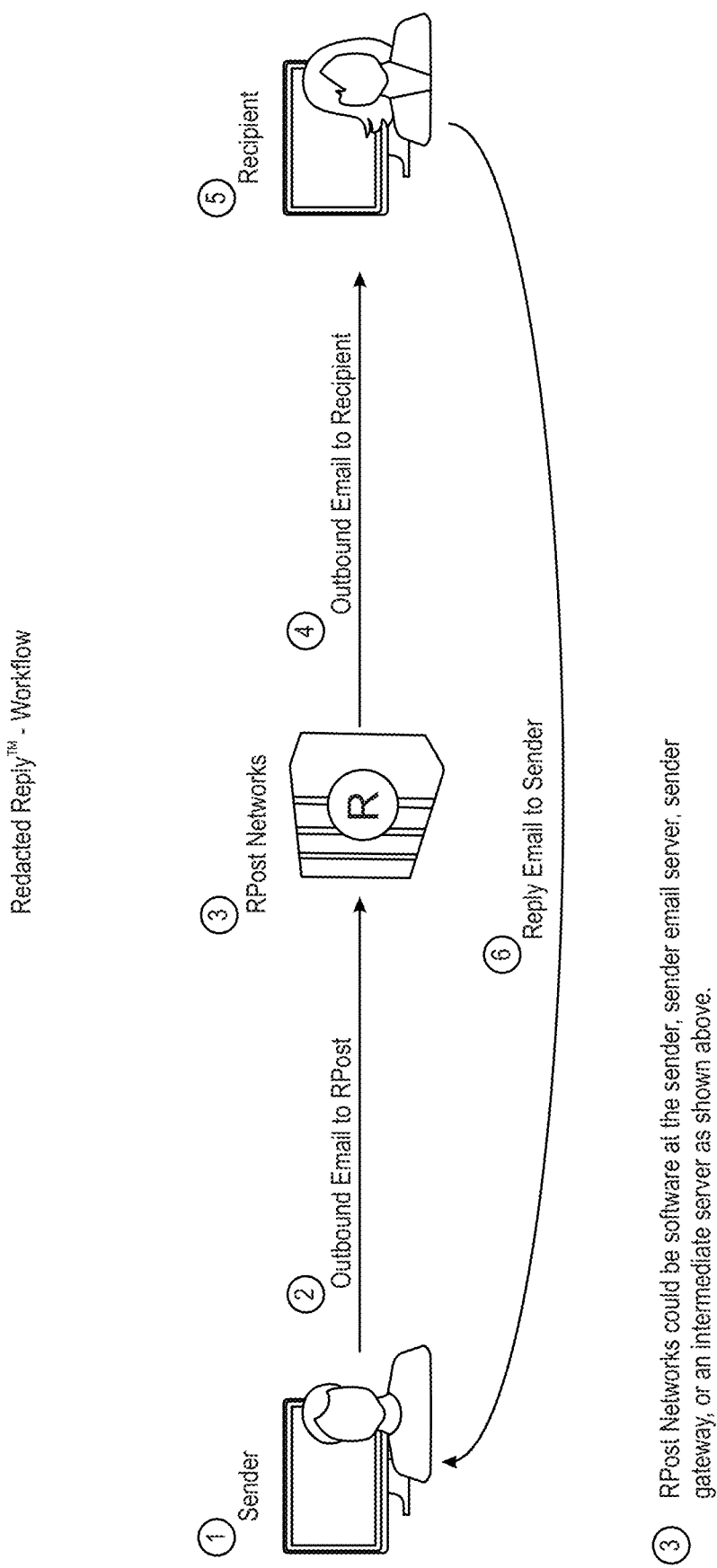
FIG. 7 is a schematic diagram of one embodiment of a system in accordance with the present disclosure.

FIG. 7 illustrates a workflow for the redacted reply embodiment. A sender in box 1 originates an outbound email (box 2) sent to the RPost server in box 3. After processing at the RPost-network, an outbound email is sent from RPost in box 4 to a recipient in box 5. In such an embodiment, RPost-networks, as identified in box 3, could be software at the sender, a sender email server, a sender gateway, or an intermediate server, as illustrated in FIG. 7.

Figure 8:
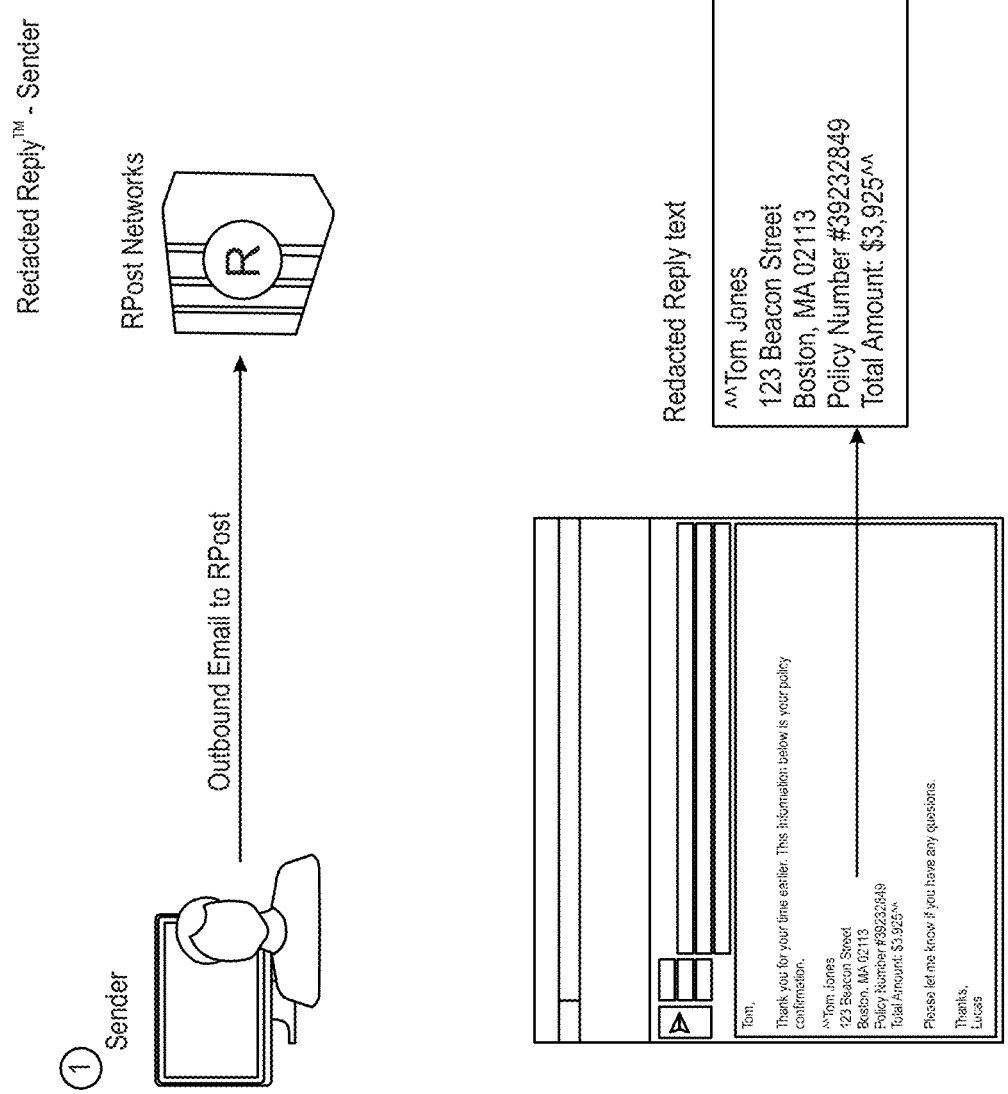
FIG. 8 is a schematic diagram of one aspect of the embodiment of FIG. 7.

FIG. 8 illustrates two options that are available to the sender when preparing an email message employing the redacted reply feature. In this exemplary illustration, in the first option, the sender inserts the redacted reply text inside up carrot symbols (shift 6). Various symbols can be used instead. Additionally, the redacted reply text can consist of many lines, spaces, and line breaks.

Figure 9:
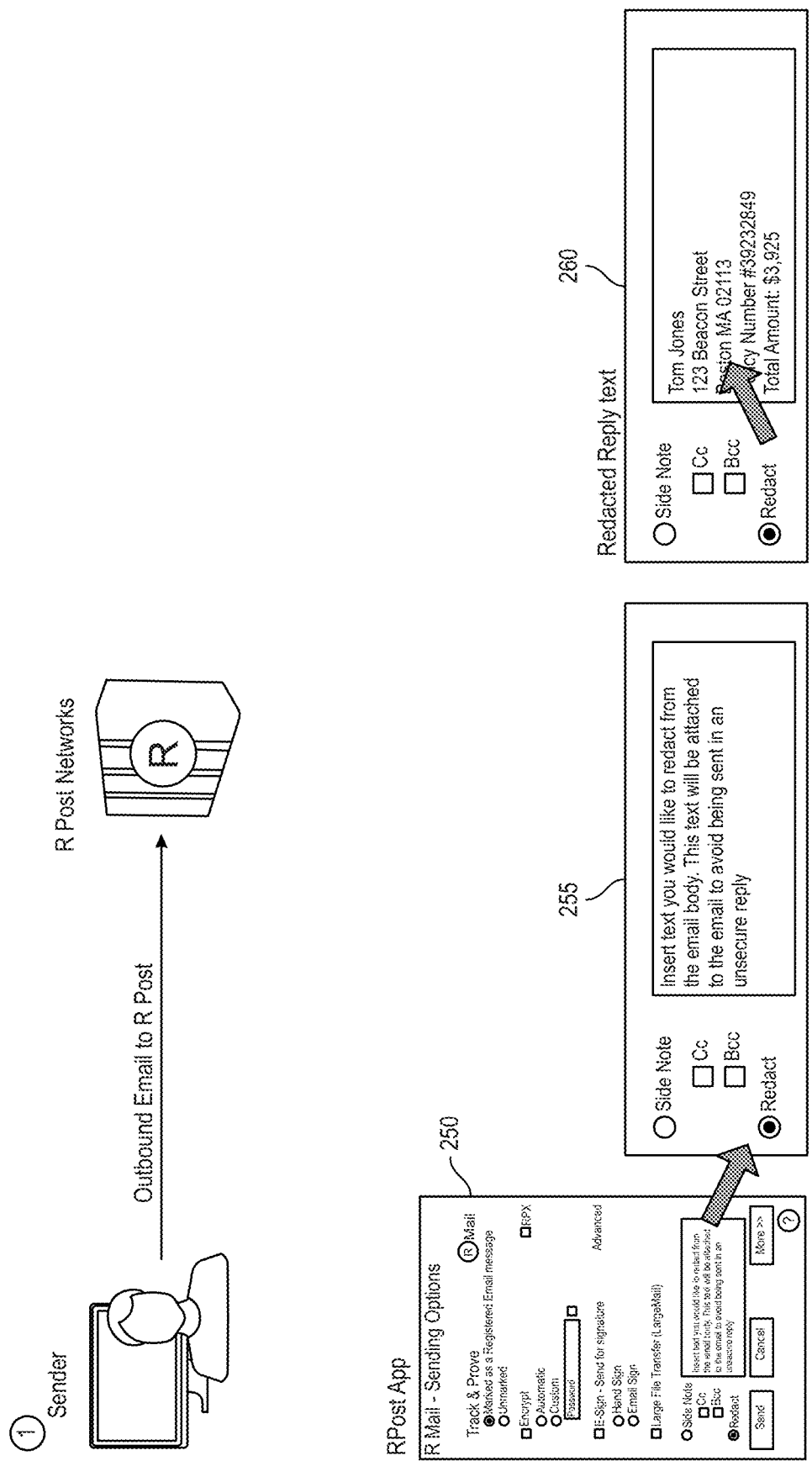
FIG. 9 is a schematic diagram of one aspect of the embodiment of FIG. 8.

FIG. 9 illustrates a second option available to the sender when preparing an email message employing the redacted reply feature. In this option, the user may insert the redacted reply text inside a Redacted Reply feature in a sending app used for the Rpost services. In one embodiment, as illustrated in FIG. 9, a user activates a menu from the RPost application 250 to activate a redact reply entry box 255 and inserts text to be redacted in the indicated box as shown in box 260.

Figure 10:
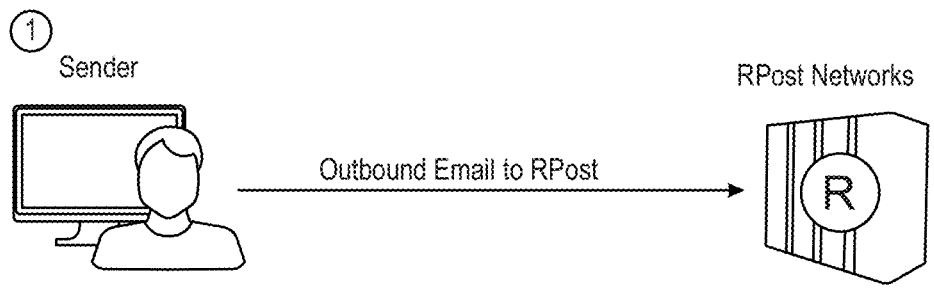
FIG. 10 is a schematic diagram of one aspect of the embodiment of FIG. 7.

FIG. 10 illustrates the path that email outbound from the sender (or the sender's server) to the RPost-networks for processing. The email is sent securely to the RPost-networks with the redacted reply text. The text will be included either in the body of the email inside the two up carrot symbols or, in the encrypted data file sent by the RPost-application.

As shown in FIG. 11, the RPost-networks service extracts the redacted reply text from inside the two up carrot symbols or the data file sent from the RPost-application and processes the email according to the customer or user settings. The sender can configure the Rpost system to send the redacted reply text either as a text file attached to the outbound file, or to add a link associated with the redacted reply text to the message. The system may be used to configure the link with the following options: 1) lock the redacted reply text so it cannot be copies (yes/no); 2) allow the redacted reply text to be copied (yes/no); 3) add customer logo to the browser window (browse); 4) the number of times the redacted reply text may be view, which may be set using a dropdown menu; 5) time allowed for viewing redacted reply text per view, which may be set using a dropdown menu; and 6) display selected text in a browser window, such as, for example: "The following information is private. If you are not an intended recipient of confidential and privileged information in this email, please delete it immediately. Do not disseminate this information."

Figure 12:
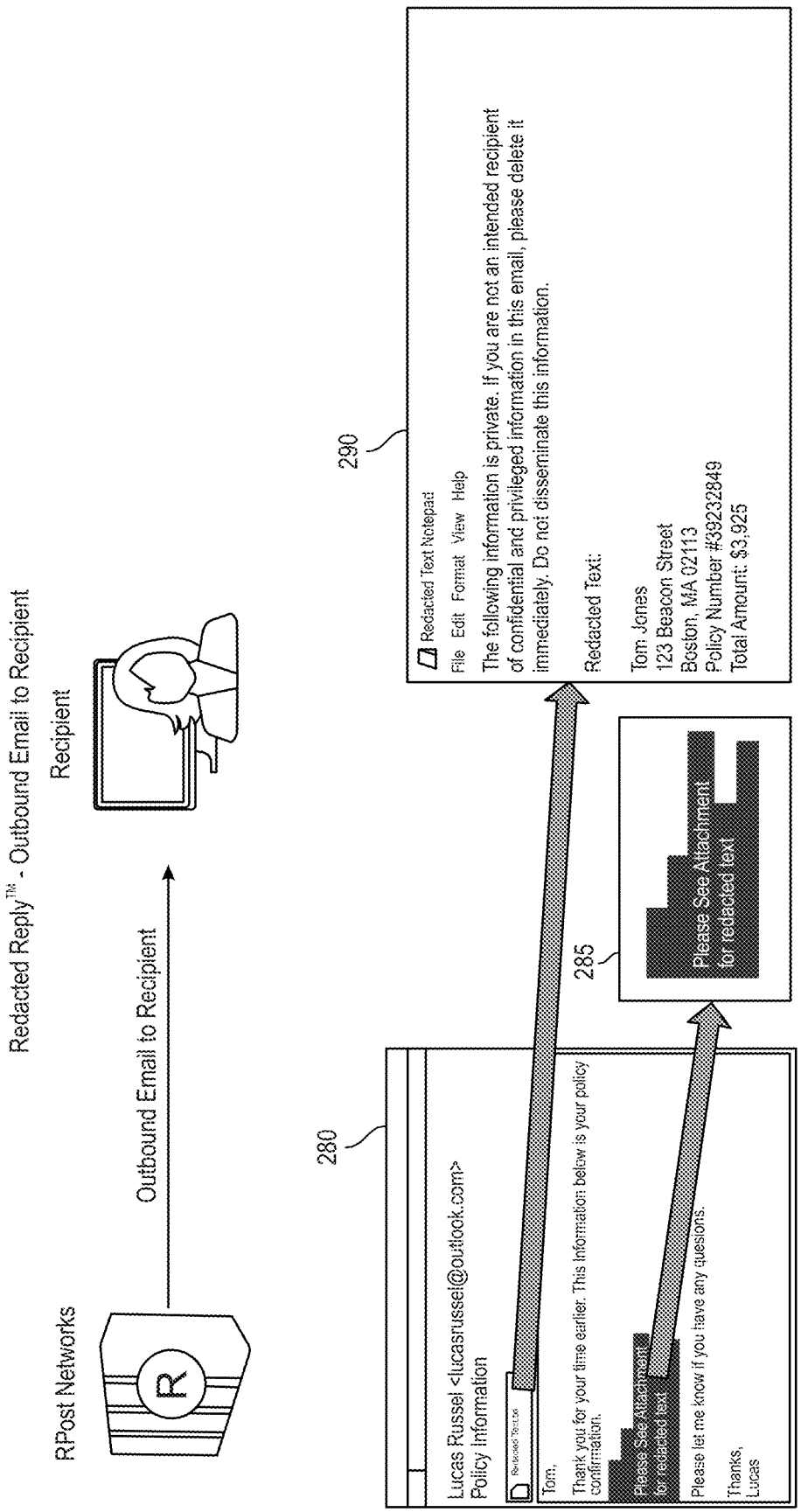
FIG. 12 is a schematic diagram of one aspect of the embodiment of FIG. 11.

FIG. 12 illustrates an exemplary outbound email path from the RPost-networks to the recipient. The RPost-networks sends the email to the recipient according to the customer or user settings. In one optional embodiment, the system attaches the redacted reply content to the outbound message as a text file, as shown in box 280. The text file may be in other formats such as, for example, HTML, PDF, encrypted PDF, TIFF, JPG, etc. The files may also be encrypted using various methods, or the file may be unencrypted. As shown in FIG. 12, the recipient is presented with an electronic message (email) containing redacted reply text attachment as shown in box 280, including a message in the email indicating that the attachment contains redacted text (box 285). Clicking on the attachment opens a window containing the redacted reply text, as shown in box 290.

Figure 13:
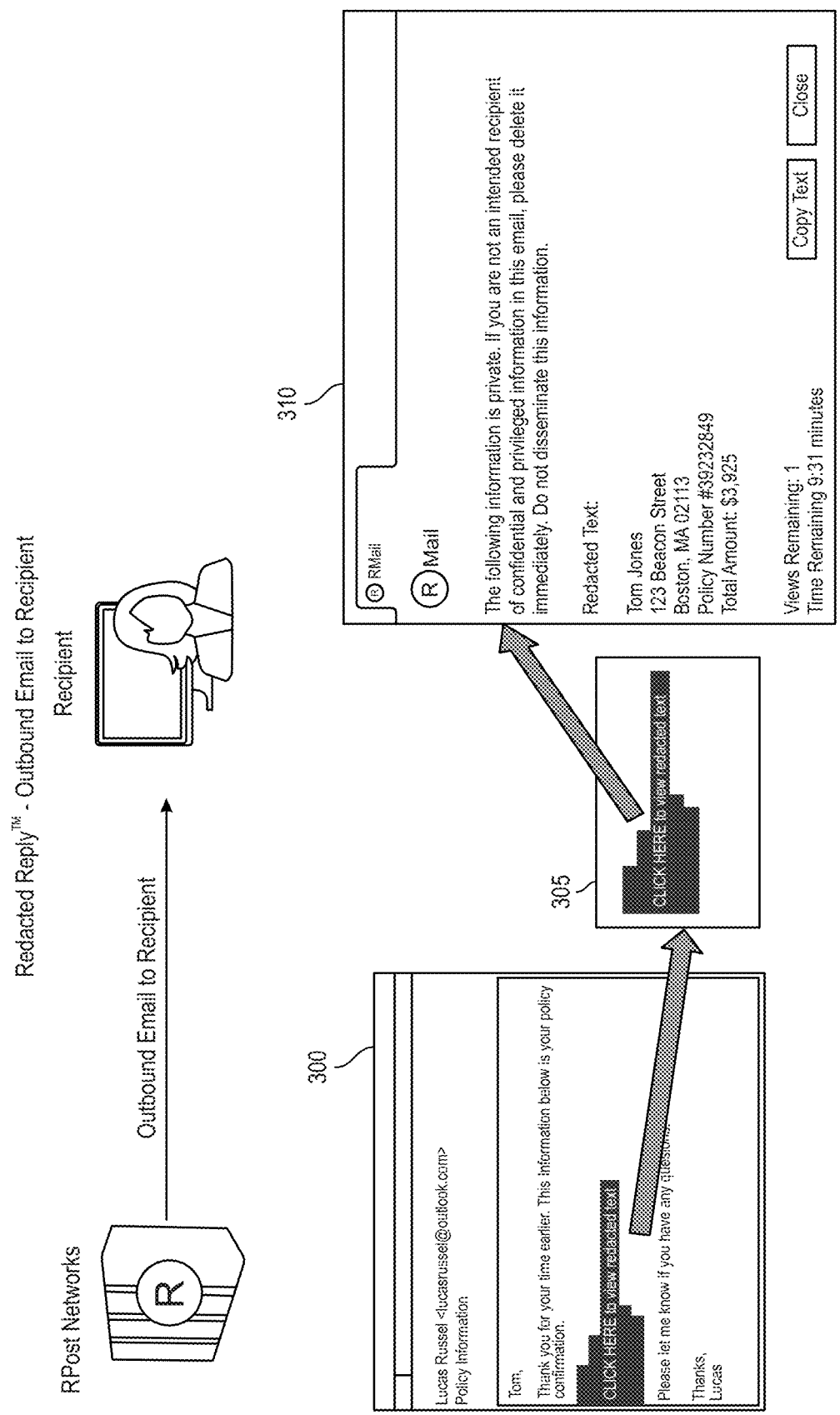
FIG. 13 is a schematic diagram of one aspect of the embodiment of FIG. 11.

In a second exemplary option, the system inserts a link to the redacted reply text inside the email body, as illustrated in FIG. 13. In this option, the user may open a browser window by clicking on the link to view the redacted reply text. The RPost networks system adds a link to the outgoing email being transmitted to the recipient. When the email is opened by the recipient in box 300, a message 305 is presented to the recipient containing text informing the recipient that the redacted reply text may be viewed by clicking on the link. Clicking on the link causes the redacted reply text to be displayed to the recipient, as shown in box 310.

Figure 14:
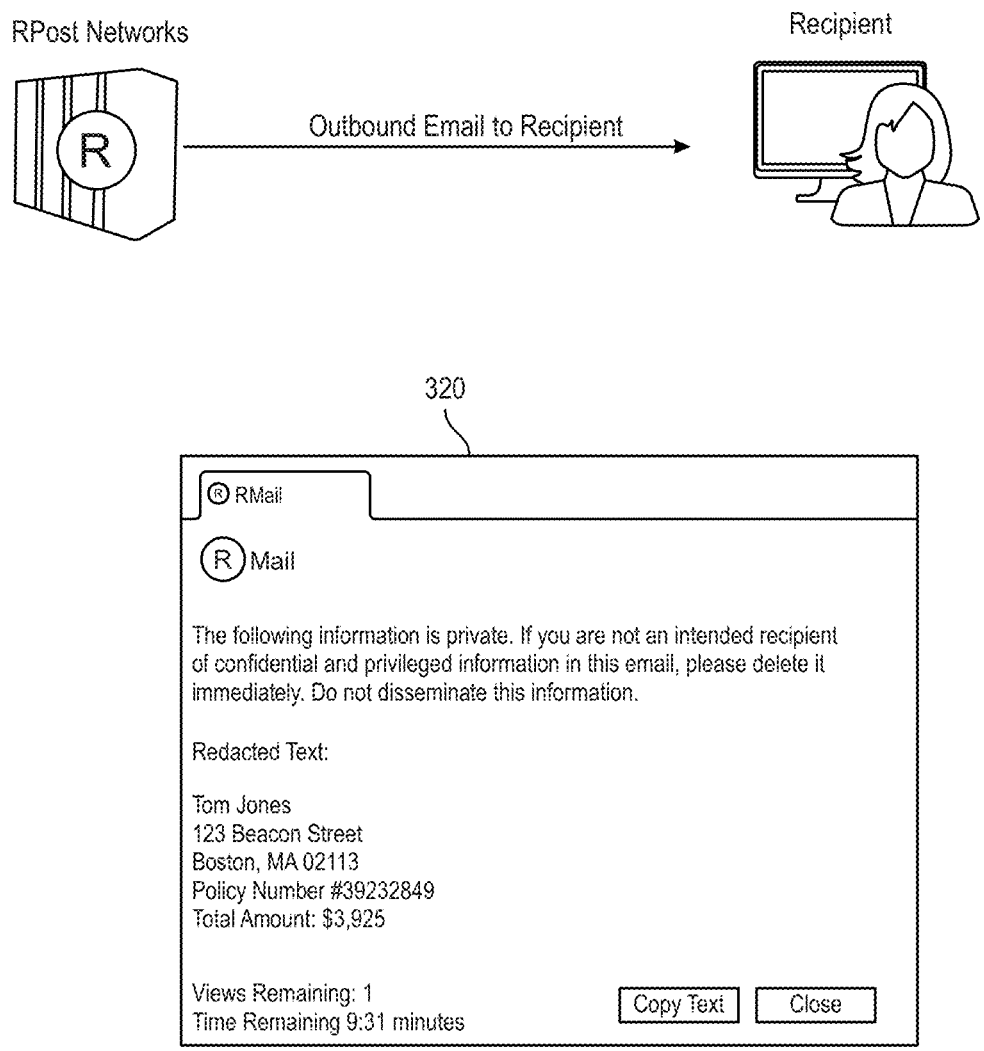
FIG. 14 is a schematic diagram of one aspect of the embodiment of FIG. 11.

FIG. 14 illustrates various browser window settings that can be configured by a sender to configure the action of the link (FIG. 13) when the recipient activates the link. For example, the link may be configured with the following options: 1) lock the redacted reply text so it cannot be copied (yes/no); 2) allow the redacted reply text to be copied (yes/no); 3) add customer logo to the browser window (browse); 4) the number of times the redacted reply text may be view, which may be set using a dropdown menu; 5) time allowed for viewing redacted reply text per view, which may be set using a dropdown menu; and 6) display selected text in a browser window, such as, for example: "The following information is private. If you are not an intended recipient of confidential and privileged information in this email, please delete it immediately. Do not disseminate this information" (box 320).

Figure 15:
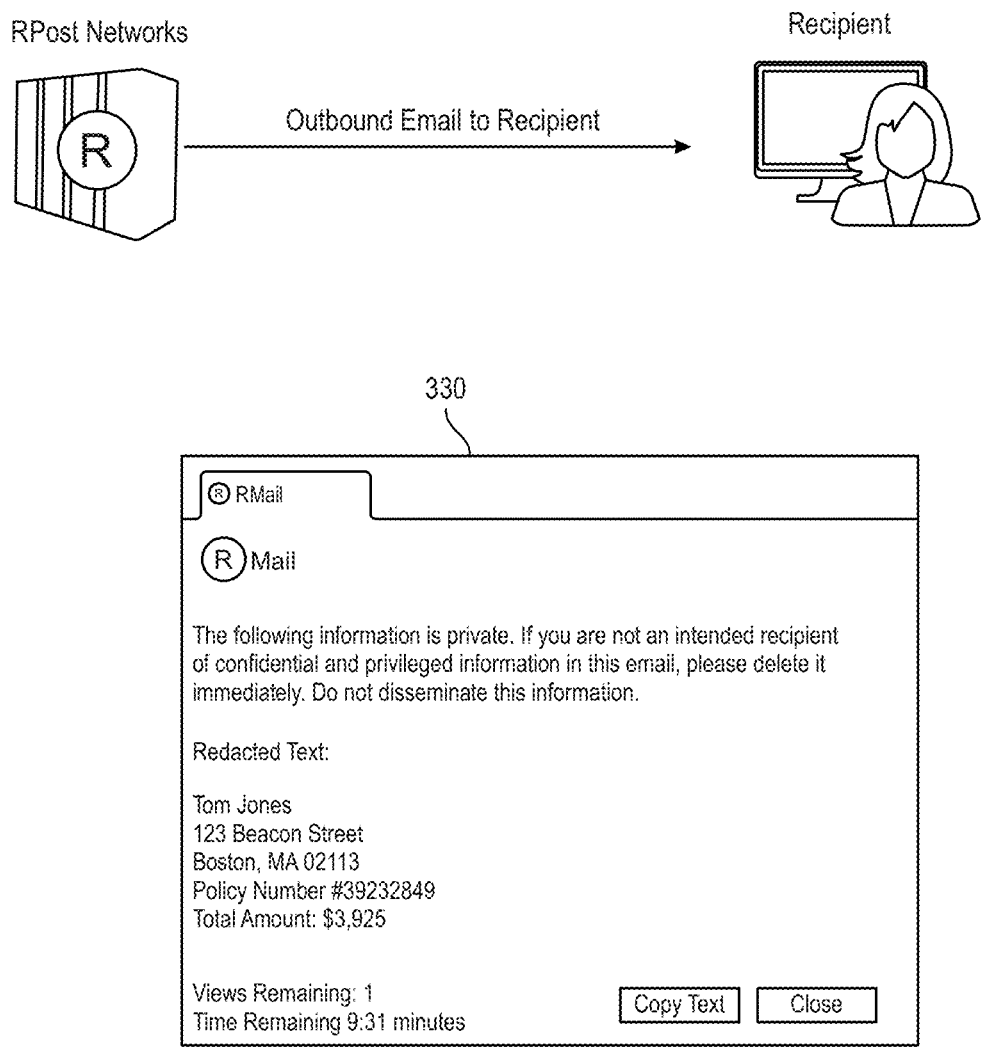
FIG. 15 is a schematic diagram of one aspect of the embodiment of FIG. 11.

FIG. 15 illustrates another embodiment of a redacted reply text window in accordance with the user settings. In this embodiment, the recipient receives the email containing the redacted reply text contained in the email, or in a browser window, as shown in box 330.

Figure 16:
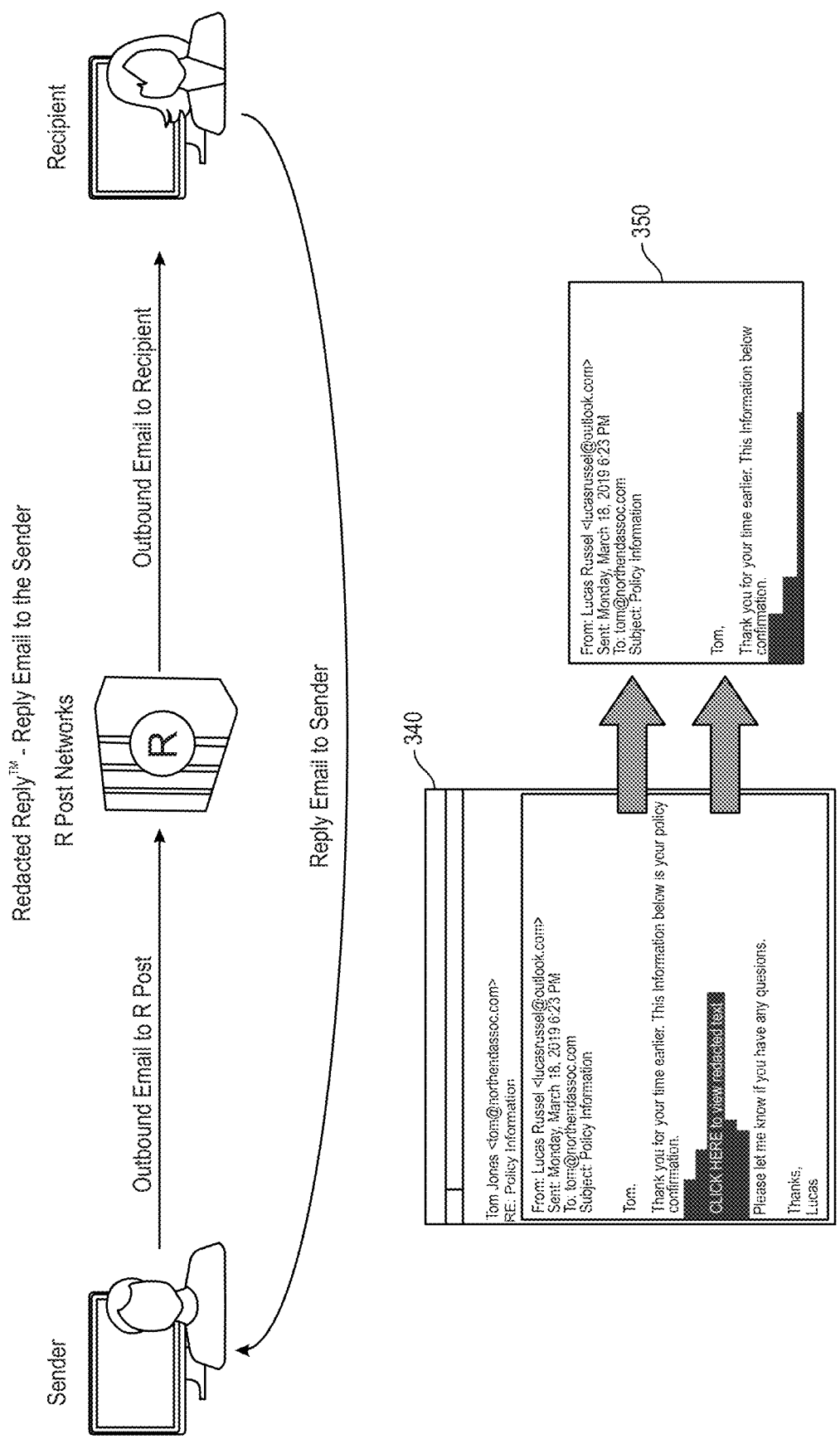
FIG. 16 is a schematic diagram of an embodiment of the present disclosure illustrating processing of a reply transmitted from the recipient of the message of the embodiment of FIG. 7.

FIG. 16 illustrates an exemplary embodiment of a process that takes place if a recipient replies back to the sender. When this occurs, the redacted text is not visible in the reply message because it is either not attached with the reply or is still redacted, as shown in boxes 340, 350. The link to view the redacted text may, as set forth above, be configured to have an IP and/or instance call limit so if the link is clicked in the future, the browser window will display, for example, the text "the redacted text has expired. Contact the sender for more information."

FIG. 17 illustrates exemplary setting menus of one embodiment of the invention that may be used to configure the system to serve the needs of the sender or the sender's organization. For example, the redact option may be set to pre-select an encryption option that will encrypt the redacted text. As shown in FIG. 18, the original text to be redacted may be extracted at the sender's system and encrypted and sent as an attachment, or alternatively, it may be sent in the header of the message and transmitted to the RPost networks.

Figure 19:
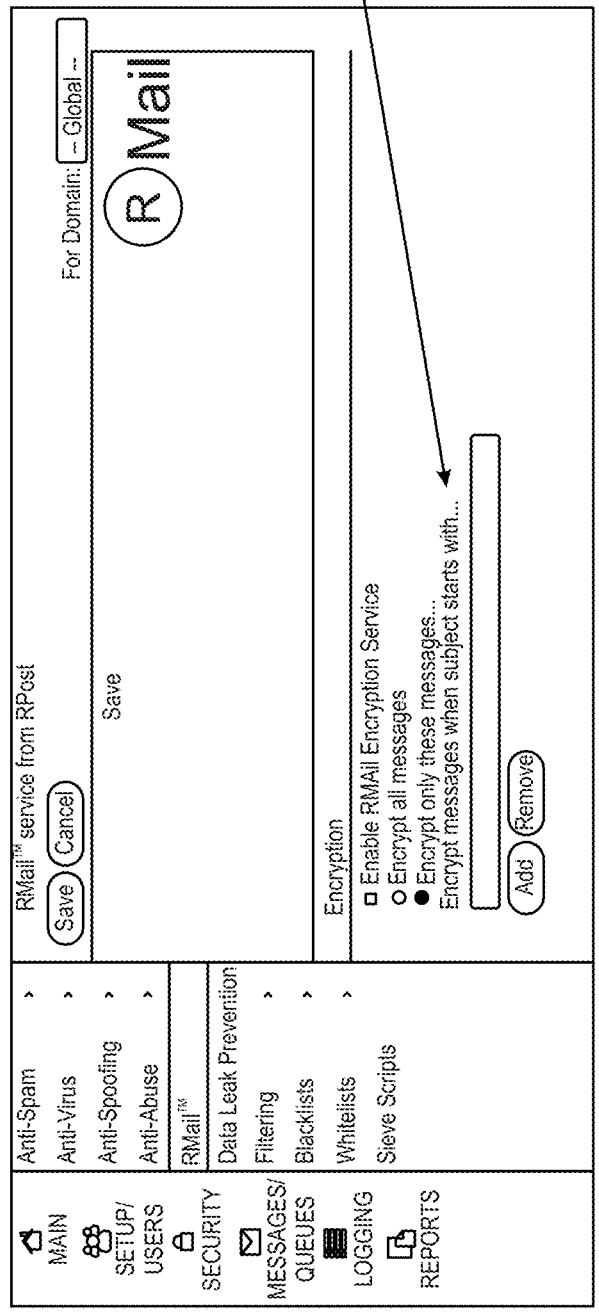
FIG. 19 is a graphical view of an exemplary screenshot showing features of the various embodiments of the present disclosure.
Figure 20:
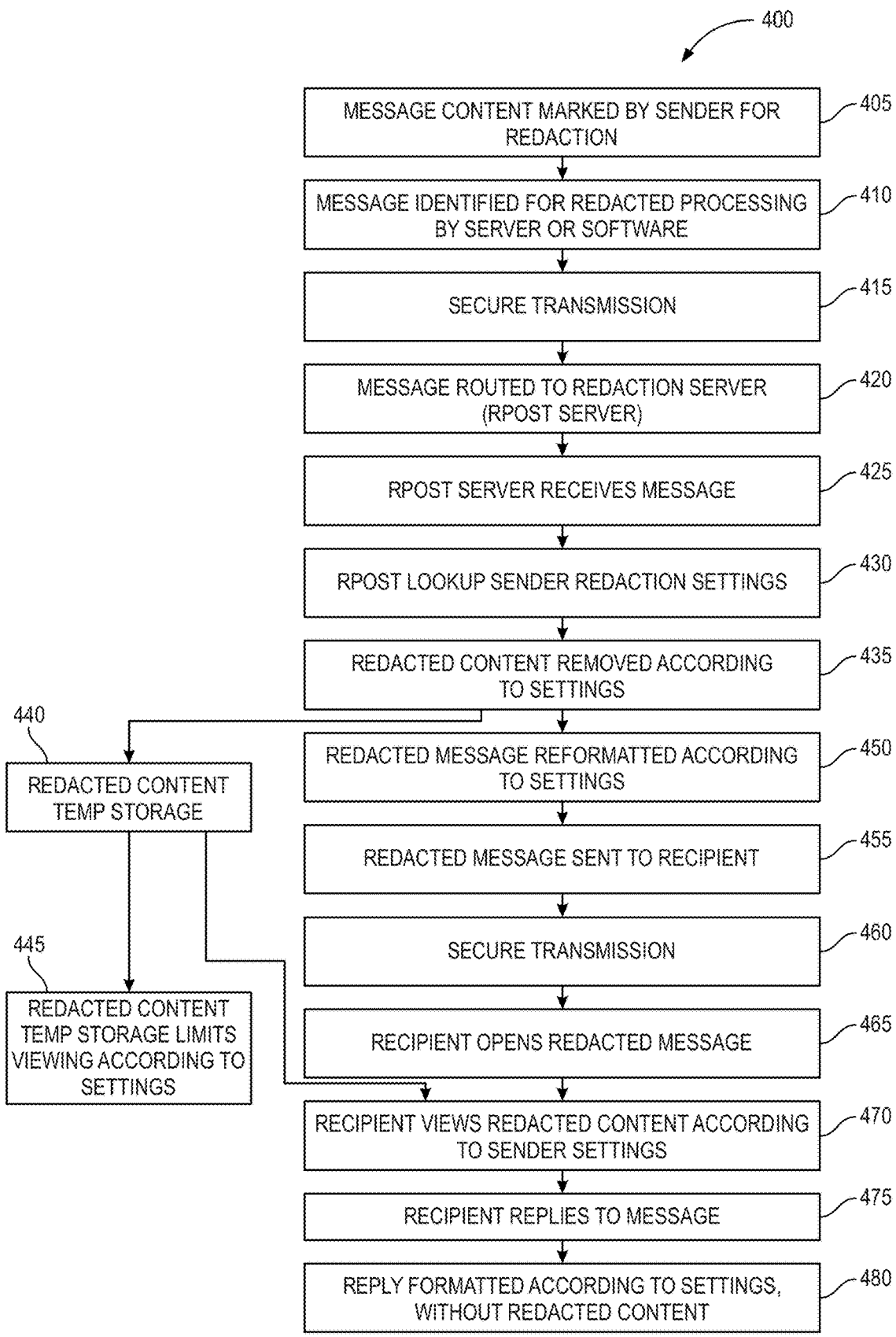
FIG. 20 is a flow chart illustrating the steps of a redacted reply embodiment of the present disclosure.

FIG. 19 illustrates another embodiment wherein the redact option may be set to pre-select text based on content indicators to process messages at an outbound email gateway server using DLP or filtering rules FIG. 20 is a flowchart illustrating one embodiment of a system incorporating the redacted reply system 400. This system is used by a sender that is registered and permitted to use services provided by a RPost server. Message content is marked by a sender for redaction in box 405. Inbox 410, the messages identified for redacted processing by the server or software, which software can be located at a server or at a user's client system. One option that can be selected, as illustrated in box 415, is that the message may then be transmitted to the RPost-server by secured transmission.

In box 420, the messages are routed to the redaction server. The messages received at the RPost-server are then processed by the processes running on the RPost-server which then look up to determine the redaction settings that were set up by the sender, in box 430. In box 435, the redacted content is removed from the message according to the settings determined in box 430. In one embodiment, the redacted content is stored temporarily in a memory in box 440. In another embodiment, storage of the redacted content may be configured to limit the viewing rights of a user or recipient desiring to view the redacted content in box 445.

In another embodiment, the redacted messages are reformatted in box 450 in accordance with format settings that were determined by the system in box 430. The redacted message is transmitted to the recipient in box 455, which transmission may be accomplished through a secured transmission route, as indicated in box 460. The recipient opens the redacted message in box 465, and views the redacted content according to the sender settings in box 470. As shown in FIG. 19, the recipient may alternatively view the redacted content in box 470 by clicking on a link stored in the message that activates the system to provide the redacted content temporarily stored in the memory to the recipient.

In another embodiment, the process may branch from box 440 directly to box 470, wherein the recipient may view the redacted content in accordance with the sender settings. As set forth above in other embodiments, the recipient may reply to the message in box 475, and the reply message may be configured and formatted in box 480 of FIG. 20 in accordance with the settings established above, without including the redacted content.

Figure 21:
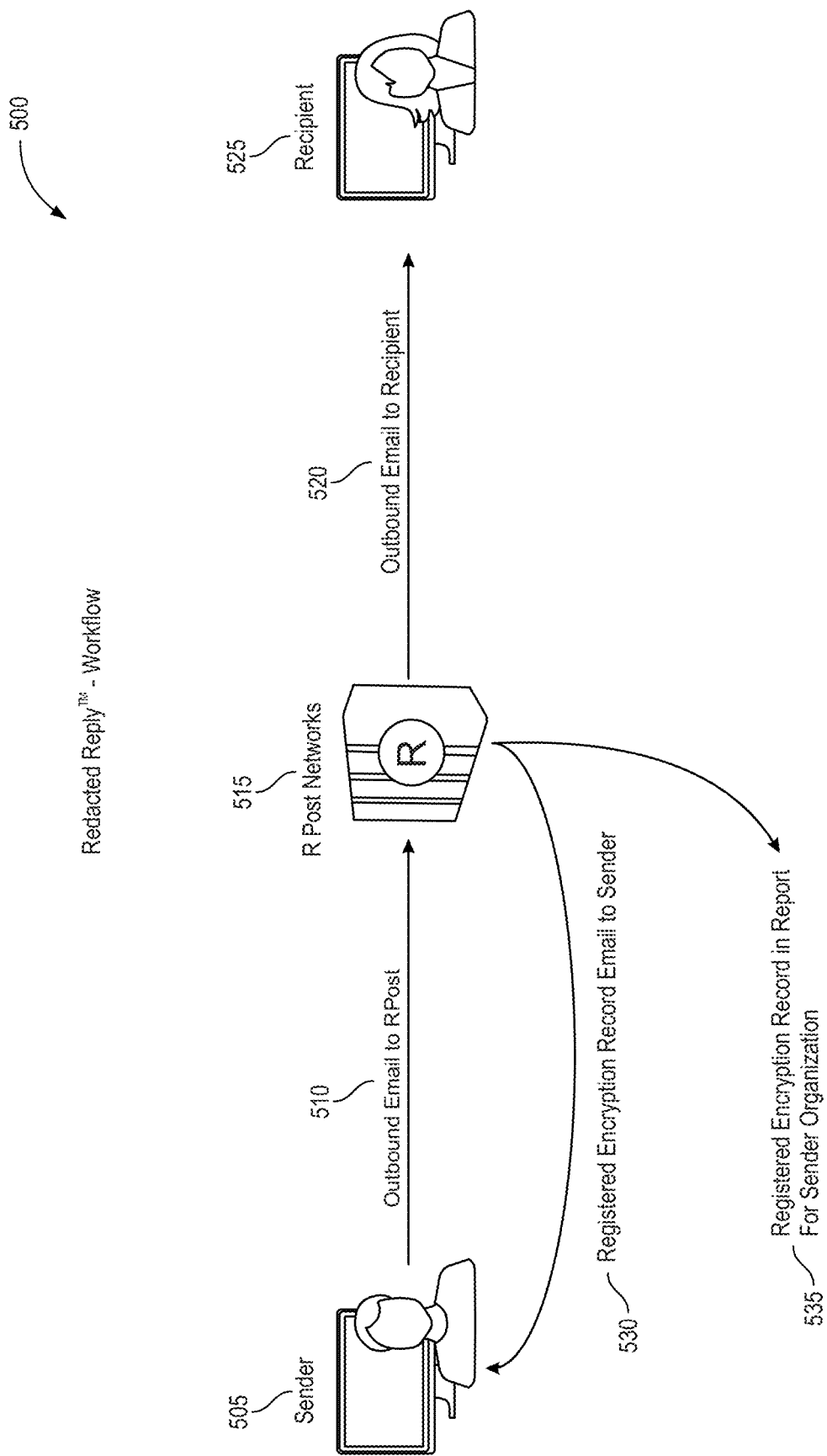
FIG. 21 is a schematic view of one registered encryption embodiment of the present disclosure.

FIG. 21 illustrates an exemplary embodiment of a workflow 400 utilized to carry out the disclosed registered encryption embodiments set forth above. In the exemplary embodiment, a sender 505 sends an outbound email 510 to a server 515 providing the registered encryption service. After processing, the outbound email 520 is then transmitted to a recipient 525. Prior, simultaneous to, or after transmitting the processed email to the recipient, the system transmits a registered encryption record email to the sender at 530, and may also send a registered encryption record in a report intended for the sender's organization 535.

When the sender 505 sends the message 510, and intends the email to be transmitted to recipient securely or encrypted, the server on the sender side (or the sender) is intended to transmit the message with a form of encryption, which may be either a secure transmission utilizing HTTPS, TLS, or other protocol, or a message secured at the message level utilizing PKI, PGP, or other encryption system. The RPost Networks server 515 may be embodied in software at the sender's system, the sender's email server, the sender's gateway, or an intermediate server.

When the sender's email 510 is received at the Rpost Networks server 515, the server identifies if the message has been encrypted with message level encryption. If so, the server 515 decrypts the message with an appropriate decryption method and logs the fact the decryption was carried out, and the method of decryption, along with time stamps and message ID and other identifiers, as programmed by the server operators. The server then processes the message for delivery to the recipient with the sender's desired level and method of encryption.

If the message is not message level encrypted, the server 515 processes the message for delivery to the recipient with the sender's desired level and method of encryption. At the time the message is received, or after the message continues to the recipient, server 515 parses the inbound message header data and identifiers from the message header data from the last hop and searches to secure transmission information (i.e. TLSv1.2), and records the fact of identification of secure transmission protocol information and places an identifier in a database in communication with the server along with message identifiers, and hop server identifiers and records secure transmission information hierarchical from the most recently received hop. FIG. 22 depicts the type of information that the server receives from the inbound message header from the sender that may be parsed and copied into a database.

On the email received inbound from the sender at the server, there will be a series of headers in the order of the last hop. (i.e. a sender to exchange server to gateway server to perimeter server service to the processing server gate—each may or may not have a TLS secure level of transmission and may have different TLS security levels. The processing server records this header and runs a program on it to parse out at least "Last Received From Server Name/Secure by TSL (protocol level)" with the option to see the previous hops, with the analysis moot (overridden) if the received message is message-level encrypted. In alternative embodiments, the sender organization may opt for a level of view (last hop, all hops) with security determination on last hop only or all hops. Since the parsing of the email headers on messages received inbound from a sender at the processing server may be processor intensive, this parsing may be done after the message moves onward in the process to the recipient. The parsed/copied content from the headers are placed in a database and categorized based on a hierarchy of what is important for sender security (i.e. Best, Acceptable, Fail).

After processing of the email 510 is completed by the server 515, server 515 transmits the processed message as an outbound email 520 to the recipient in accordance with the customer or user security settings. The message 520 is transmitted to the recipient 525 according to the sender's secure transmission preferences. If the message is processed for message level security, the fact of re-encrypting the message at the RPost server is recorded, associated with the message ID and method of encryption, timestamps, etc. If the message is processed for secure transmission (i.e. TLS), after transmission, the SMTP/ESMTP or message transport protocol information if other protocol (i.e. HTTP) is recorded and parsed for the portions that determine fact of secure transmission and details about the secure transmission protocol successfully used in the transmission (i.e. TLS1.2). This protocol information is stored in a database associated with the message ID and received security information. The parsed/copied message sending protocol parts placed in a database are categorized based on a hierarchy of what is important for sender security (i.e. Best, Acceptable, Fail).

Referring once again to FIG. 21 at boxes 530, 535, server 515 may be configured to provide a record of the encryption of the email, to the sender, and/or the sender's organization. In this process, the parsed/copied message sending protocol parts are placed in a database and are categorized based on a hierarchy of what is important for sender security (i.e. Best, Acceptable, Fail). The (received from sender) and (sent to recipient) categorizations are matched, with a chart to display the result (interpretation) and the protocol/method data, along with a sum of the security level, which may be set to be the higher of the sum of the (received from sender) and (sent to recipient) levels.

FIG. 23 illustrates various examples of one or more embodiments of processes for performing registered encryption analysis on an email provided by a sender or sender's server. For example, if the received from sender parameter is equal to "best", and the sent to recipient parameter is equal to "acceptable", then the overall result is "acceptable." In another example, where the received from sender parameter is "best", but the sent to recipient parameter is "fail", the overall result is "fail." In another example, where the received from sender parameter is "acceptable", and the sent to recipient parameter is "acceptable", the overall result is "acceptable."

FIG. 24 depicts table 600, including various parameters associated with a sender and showing a status 615 of messages sent from a sender to various recipients 610 that may be provided by a server to the sender in various embodiments of the present invention. In a first example, analysis of a message from Bob to Sue provides the results: [received from)=Best; (sent to recipient)=Best; resulting in an overall result of Best. In a second example, shown in row three of the table, the email from Bob to Jim results in the results: (received from sender)=Fail; (sent to recipient)= Best; resulting in an overall result of Fail. A report such as depicted in FIG. 28 may contain data that may later be submitted for authenticating.

FIG. 25 depicts a table including various parameters associated with a sender 605 and showing a status of messages sent from a sender to various recipients 610 that may be provided by a server to the sender, including a security report 650 related to the messages in various embodiments of the present invention.

Figure 26:
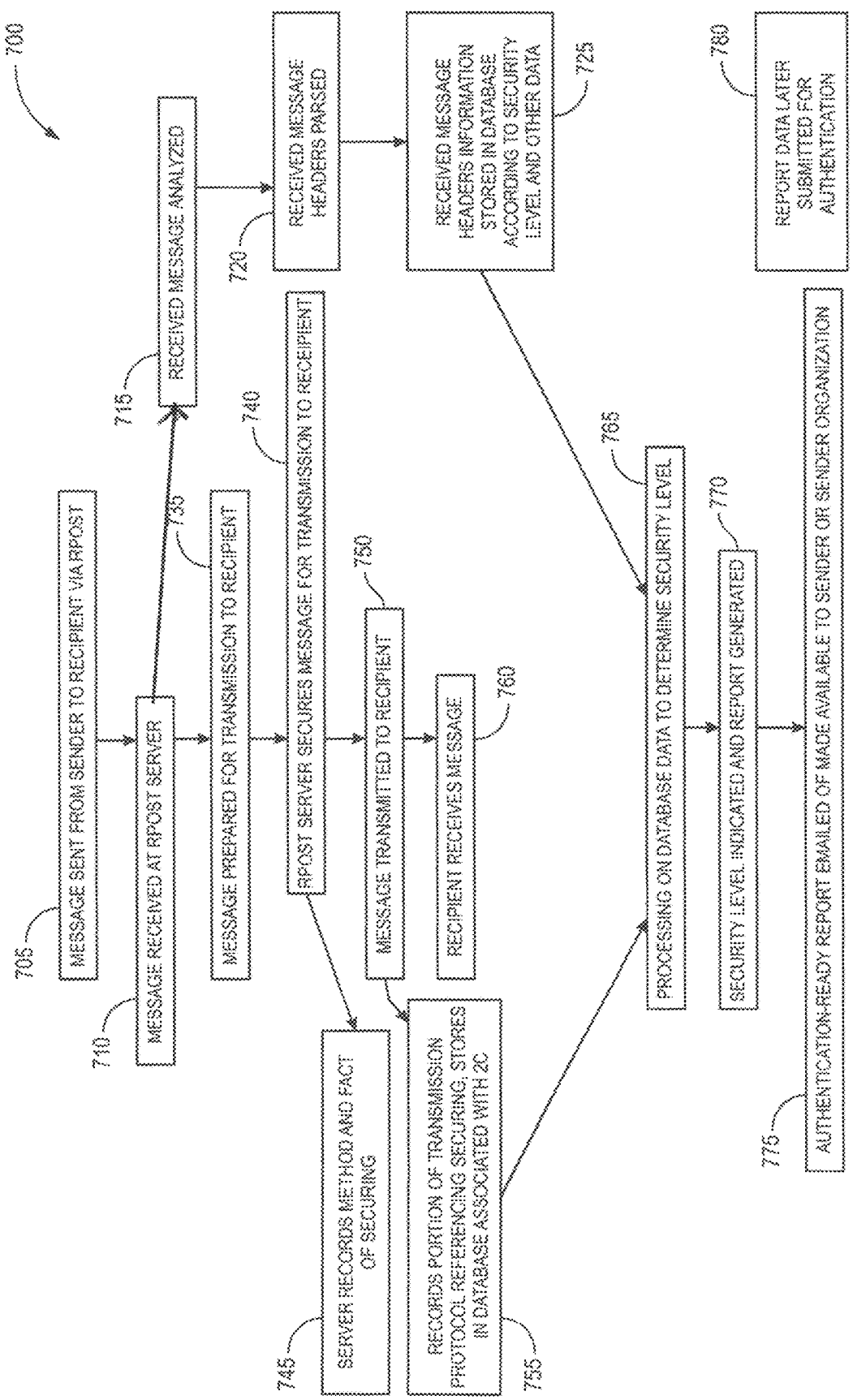
FIG. 26 is a flow chart illustrating various steps of an embodiment of a registered encryption process in accordance with the present disclosure.

FIG. 26 is a flow chart illustrating an embodiment of a process workflow 700 that may be carried out by the registered encryption process. In box 705, a message is sent from a sender to a recipient via a processing server. The message is received at the processing service at box 710. The process may then branch to box 715, wherein the received message is analyzed at the processing server, wherein the message headers are parsed in box 720, where the received message header's information is stored in a database in accordance with a security level and other parameters in box 725.

Returning to box 710, the message is further processed in box 735 where the processing server prepares the message for transmission to the recipient. At box 740, the processing server secures the message for transmission to the recipient. The process may branch to box 745, where the processing server records the method and fact of securing the message.

After the process of box 740, the message is transmitted to the recipient at box 750, who receives the message at box 760.

Returning to box 740, the system may also record at least a portion of the transmission protocol used to transmit the message to the recipient and store it in a database associated with the server in box 755.

Referring now to box 765, the database may process the database data to determine the security level of a message, and a report may be generated referencing the security level in box 770. In addition, an authentication-ready report may be emailed or otherwise made available to the sender or sender organization in box 775. In another embodiment, the report data may be submitted for authentication in box 780.

8. Redacted Reply with AMP HTML Email Format Embodiment

An alternative embodiment is to use AMP HTML Email Format in a manner that displays the content identified for redaction IN THE BODY of the message AMP version of the email, text/x-amp-html, with the text marked for redaction viewed FROM THE LINK/IMAGE in the HTML version and Plaintext versions of the MIME parts of the email.

Figure 27:
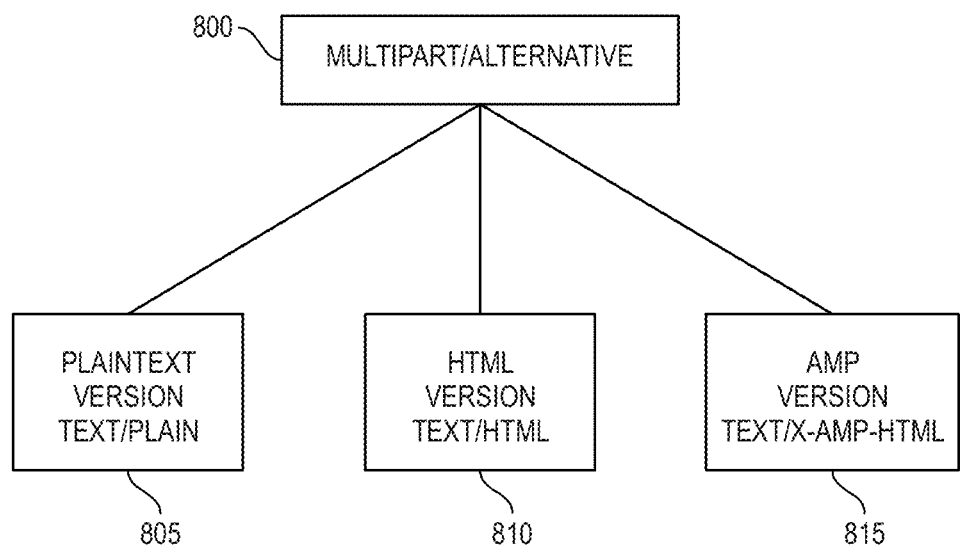
FIG. 27 is a block diagram depicting an arrangement of electronic message header portions.

As is depicted by the schematic representation in FIG. 27, an email is structured as a MIME tree that contains the message body and any attachments to the email. Embedding AMP within an email adds a new MIME part with a content type of text/x-amp-html 815 as a descendant of multipart/alternative 800. It is alongside the existing text/html 805 or text/plain parts 810. This ensures that the email message works on all clients. In this embodiment, the text/x-amp-html part must be under a multipart/alternative node and with the text/x-amp-html MIME part placed before the text/html MIME part. An example of this arrangement is shown in the code set forth below:

```
From: Person A <persona@gmail.com>
To: Person B <personb@gmail.com>
Subject: An AMP email!
Content-Type: multipart/alternative;
boundary="001a114634ac3555ae05525685ae"
--001a114634ac3555ae05525685ae
Content-Type: text/plain; charset="UTF-8"; format=flowed; delsp=yes
Hello World in plain text!
--001a114634ac3555ae05525685ae
Content-Type: text/x-amp-html; charset="UTF-8"
<!doctype html>
<html ⚡4email>
<head>
   <meta charset="utf-8">
   <style amp4email-boilerplate>body{visibility:hidden}</style>
   <script async src="https://cdn.ampproject.org/v0.js"></script>
</head>
<body>
Hello World in AMP!
</body>
</html>
--001a114634ac3555ae05525685ae--
Content-Type: text/html; charset="UTF-8"
<span>Hello World in HTML!</span>
--001a114634ac3555ae05525685ae
```

In this embodiment, because email clients that can read AMP email parts are required to strip out the text/x-amp-html part of the MIME tree when a user replies to or forwards an AMP email message, it would be safe to send the message with the content targeted for redaction visible in the message body of ONLY the AMP part of the email as this entire message content is redacted when replying (the AMP part of the message is not included in the reply) and the HTML and/or TEXT part of the message remains as described in earlier embodiments to redact text designated for redaction in the reply.

This is why it is important that an email in this embodiment provide alternative content in the HTML and TEXT parts that would contain the link to an image view of the content tagged for redaction, or the content tagged for redaction would additionally need to be placed in the attachment and not in the HTML and TEXT parts of the message (as per the other embodiments described).

Further, in this embodiment, in the AMP part of the message, the content that is marked for redaction can be set with dynamic properties, for example, view content once and replace it with alternative content upon message refresh, or view content and permit the user to indicate in the dynamic AMP content that the message content has been read or accepted, and then the dynamic content does not show for that recipient.

AMP is a technology known for developing superfast web pages on mobile clients. AMP is a set of HTML tags backed by JavaScript that easily enables functionality with an added focus on performance and security.

The AMP HTML Email format provides a subset of AMP components that you can use in email messages. Recipients of AMP emails can view and interact with the AMP components directly in the email.

An AMP email message must be formatted as |Rule|Description|||Start with the <!doctype html>doctype. |Standard for HTML.||Contain a top-level<html 4email> tag. (<html.amp4email> is accepted as well) |Identifies the document as AMPHTML Email.||Contain<head> and <body> tags.|Optional in HTML but not in AMPHTML Email.||Contain a <meta charset="utf-8"> tag as the first child of their <head> tag.|Identifies the encoding for the page.||Contain the amp4email boilerplate in the <head>: <style amp4email-boilerplate>body{visibility:hidden}</style><script async src="https://cdn.ampproject.org/v0.js"></script>|CSS boilerplate to initially hide the content until AMP JS is loaded.

9. Additional Embodiments with AMP Format

Further in this embodiment, there can be detection whether the recipient mail client can accept AMP viewing and, if so, use only the AMP version of the message and leave the redacted content entirely out of the Text and HTMP parts of the MIME message format.

This knowledge of recipient ability to view an AMP formatted message can be done by using the AMP open detection pixel tracking, and if the AMP content is calling the pixel/image, then the server can store in its database that this user has AMP viewing capabilities and display for future messages the content market for redaction in the AMP version of the message and leave the redacted content entirely out of the Text and HTMP parts of the MIME message format of the message.

10. Redacted Reply with View Proof

In another exemplary embodiment, the present disclosure provides a system and method for authenticating the email address of the original intended recipient before allowing the recipient to view the redacted information enclosed in the message attachment or which can be viewed by activating the link to the redacted information. Using appropriate programming commands, for example, when a link to the redacted information is activated by a recipient attempting to view the redacted information, the RPost Cloud server receives the request command sent to it by the recipient's system and analyzes the header information from that request to ensure that the request is coming from the system of an intended recipient. If the request does not come from the client's known system identifier, such as a known IP address, the Cloud Server will not allow the redacted information to be viewed by the requester. Additionally, if the request can be authenticated as coming from an intended recipient, the Cloud Server will allow the requestor to view the redacted information and may also make a record of the request and associate that request with the original content and message. In this manner, the date and time of the requestor's access to the redacted information is preserved and can be utilized as evidence that the requestor (who is the original intended recipient) has actually viewed the redacted information.

It will be understood that by keeping a record of each request to view the redacted information, the Cloud Server can also track the requests and limit accepted requests to a particular time period or number of times access is requested. In this manner, the redacted information will essentially disappear once the selected time period has elapsed or the number of requests to view the redacted information has been exceeded and will no longer be able to be accessed by the requestor. Moreover, since access to the redacted information is controlled by the Cloud Server, copy/paste actions affecting the redacted information may also be controlled or prevented.

Additional embodiments of the present disclosure also provide proof that a recipient or the intended original recipient viewed the redacted (extracted) content at a link can be accomplished. For example, the present disclosure also provides a method of verifying at the intermediate or Cloud server that is providing the display of content of the view of the extracted (redacted) content from the message that the extracted or redacted content from the message has been displayed by a browser, the system may be programmed using appropriate programming commands to record at the intermediate or Cloud server that it did so via a secure connection (e.g., HTTPS), as well as to determine and record the security level of the transmission (e.g., TLSv1.2), along with other metadata of the fact of display (viewing) of the redacted content, including other information, such as, for example, but not limited to, times of viewing, duration of view, aggregate duration of all views, aggregate number of times viewed, location and device IP address and other device identifying information at the viewing device and rendering the record of the redacted content having been viewed logically or cryptographically associated with the original content sent and the delivery status, timestamps, and server transmission metadata associated with the original message transmission. In another embodiment, the present disclosure provides a method for authenticating part or all of the information without storage by an intermediate server or through secure storage in an intermediate server database.

Figure 49:
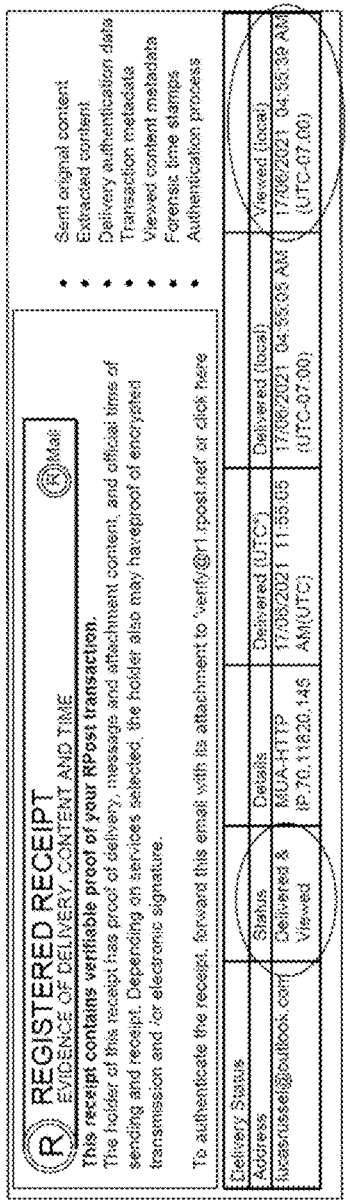
FIG. 49 is a graphical illustration of a record showing information in accordance with the embodiments of the disclosure.

An example of a record provided by the embodiments of the present disclosure is illustrated by the receipt shown in FIG. 49. As can be seen, the receipt provides a report that includes the address of the original recipient, the status of the extracted information, details of the request, the time and data the message was received by the recipient in either or both UTC and Local format, and the time and date the extracted data was viewed by the recipient. Other information related to the receipt of the original message and a request to view redacted information may also be included in such a report or receipt, such as, for example, but not limited to, the sent original content, the extracted data or content, delivery authentication information and data, transaction metadata, forensic time stamp data, and data related to the authentication process.

In another embodiment, the present disclosure includes a method of verifying at an intermediate server that is displaying the content of the view whether the extracted (redacted) content from the message has been displayed and viewed by the original intended recipient. This authentication may be determined by putting a web call out configured to automatically extract and request from the intermediate server and the delivery of a pixel sized image or other image, recording the IP address (and/or other recipient device identifying information) making such request (IP ADDRESS A) to the intermediate server, additionally recording the IP address at the recipient from when a recipient of the original message clicks the link to view the redacted (extracted) message content, recording the IP address (and/or other recipient device identifying information) making such request to the intermediate server to deliver the redacted (extracted) message part content (IP ADDRESS B), comparing the IP addresses A and B, and reporting to the sender or sender administrator in the Receipt of other report to the sender, a record of the comparison, including, but not limited to, whether the redacted information was received and viewed at the same location; whether the redacted information was received a viewed at the same device, and/or whether the receiver and viewer of the redacted information are the same.

In another embodiment, the present disclosure includes a method of verifying at an intermediate server that is displaying the content of the view whether the original message (with or without extracted content) has been displayed and viewed by the original intended recipient at different locations at similar times or different times. This authentication may be determined by putting a web call out configured to automatically extract in the message en route from the sender after it arrives at the intermediate server and then deliver to the recipient the message with a pixel sized image or other image, recording the IP address (and/or other recipient device identifying information) making such request (IP ADDRESS A) to the intermediate server, additionally recording the IP address at the recipient if the message is opened a subsequent time and recording the IP address (and/or other recipient device identifying information) making such request to the intermediate server at the subsequent time (IP ADDRESS B), comparing the IP addresses A and B, analyzing the IP addresses A and B in terms of time of request to delivery the pixel or location of the request, and reporting to the sender or sender administrator in the Receipt of other report to the sender, a record of the comparison, including, but not limited to, whether the message was received and viewed at the different locations in subsequent viewing, at different locations at approximately the same time as the original message viewing; whether the message was received a viewed at different devices at approximately the same time, and reporting to the sender if for example that there may be an unintended viewer having access to the original recipient's message by way for example, of unknown message forwarding rules set at the recipient email server for that original recipient that unknowingly to the recipient forwards a copy of its messages to an email eavesdropper or alternate system, device or person. This analysis can flag for certain types of email security data leaks.

In another embodiment, the present disclosure includes a method of verifying at an intermediate server, using the methods noted above, whether the original message was viewed at IP ADDRESS A and the extracted content made available at a link was viewed at IP ADDRESS B, with A and B being different, but the request to the intermediate servers being made at approximately the same denoting high likelihood of a security issue, or with A and B being different, but the request to the intermediate servers being made at different times denoting possible likelihood of a security issue. A purpose of this embodiment is to set a trap for eavesdroppers of the originally intended recipient email, to make it enticing for a third party eavesdropper to be lured based on message content, into wanting to click the link to see the extracted content, and then that extracted content would be recorded to have been viewed at a device location different from the original viewing, alerting the sender. In still another embodiment, the present disclosure includes a method of authenticating the receiving and viewing identity report information with the metadata and original content of the original transmission and recording such information in a database or otherwise displaying to a sender or sender administrator or original intended recipient or the originally intended recipient administrator.

Figure 50:
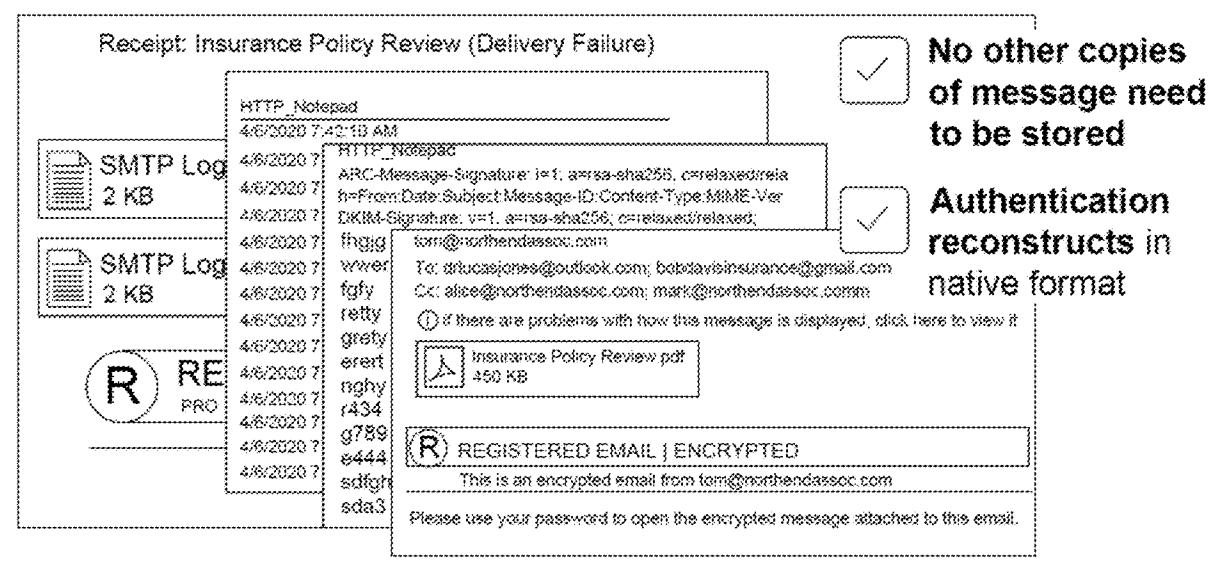

Yet another embodiment provides a system and method for reconstructing the original message using the information provided by the view proof process described above is illustrated in FIG. 50 This is possible if, as described above, the various data stored in the intermediate or Cloud server has been cryptographically associated with the original message using, for example, but not limited to, a hash or blockchain process. In this embodiment, all of the information related to the actions or event occurring during transmission of the original message and any subsequent replies, reply to all, and/or forwards of the message are recorded and cannot be altered or if altered, with a hash comparison process, altering detected. Thus, all of the information related to the message and the life of any thread based thereon can be reliably and trustingly reconstructed from the cryptographical record associated with the message.

Further to the Registered Encryption embodiment, the server can record in the database associated with the message whether the delivered private content was in the AMP message format and excluded from the HTML and Text MIME parts so that it may be recorded that the reply content would be automatically redacted.

Although the disclosed system has been described hereabove with reference to certain examples or embodiments, various additions, deletions, alterations, and modifications may be made to those described examples and embodiments without departing from the intended spirit and scope of the disclosed system and method for verification of encrypted electronic message delivery and preventing accidental disclosure of sensitive message parts in replies. For example, any elements, steps, members, components, compositions, reactants, parts, or portions of one embodiment or example may be incorporated into or used with another embodiment or example unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any embodiment or example described herein may optionally exist or be utilized in the absence or substantial absence of any other element, step, member, component, composition, reactant, part or portion unless otherwise noted. All reasonable additions, deletions, modifications, and alterations are to be considered equivalents of the described examples and embodiments and are to be included within the scope of the following claims. The disclosure is limited only by the scope of the appended claims.

I claim:

1. A system for verifying at an intermediate server whether extracted or redacted content from a message received from a sender has been displayed for viewing by an original intended recipient, comprising:
   a processor in communication with at least one memory;
   an intermediate server configured in accordance with the processor and memory, the processor and intermediate server programmed using software commands to determine at the intermediate server whether extracted or redacted content from an original message received at the intermediate server from a sender and transmitted by the intermediate server to an original intended recipient has been displayed for viewing by the original intended recipient of the original message by
   receiving a web call out from a recipient of the message transmitted to the original intended recipient, the received web call out configured to command the intermediate server to deliver the extracted or redacted content from the intermediate server to an originator of the web call out formatted as a pixel sized image or other content or image,
   recording at the intermediate server in the memory at least a first IP address of the originator of the web call out to the intermediate server,
   recording in the memory at least a second IP address associated with the extracted or redacted content from the received web call out or an action by the original intended recipient or other recipients taken to click on a link in the message to view the redacted or extracted content,
   comparing the at least first and at least second IP addresses, and
   transmitting a report to the sender or sender administrator a receipt or other report, a record or representation of the comparison.

2. The system of claim 1, wherein the report indicates that the message was received and the extracted or redacted information was viewed at a same location.

3. The system of claim 1, wherein the report indicates that the message was received and viewed at same device.

4. The system of claim 1, wherein the report indicates that the recipient viewing the message is at a different IP address from another recipient IP address viewing the extracted or redacted content.

5. The system of claim 1, wherein the report indicates that the recipient viewing the message is at a different IP address from a different recipient IP address viewing the extracted or redacted content and is an unexpected recipient.

6. The system of claim 5, wherein the report includes timestamps of the recipient viewing the message at the different IP address, the timestamps being displayed or reported as similar in time.

* * * * *